(12) United States Patent
Tabata et al.

(10) Patent No.: US 7,252,619 B2
(45) Date of Patent: Aug. 7, 2007

(54) CONTROL DEVICE FOR VEHICULAR DRIVE SYSTEM

(75) Inventors: Atsushi Tabata, Okazaki (JP); Yutaka Taga, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 200 days.

(21) Appl. No.: 11/062,880

(22) Filed: Feb. 23, 2005

(65) Prior Publication Data

US 2005/0245350 A1    Nov. 3, 2005

(30) Foreign Application Priority Data

Feb. 25, 2004   (JP) .............................. 2004-050532
Nov. 26, 2004   (JP) .............................. 2004-342882

(51) Int. Cl.
*B60W 10/08* (2006.01)

(52) U.S. Cl. .................................. 477/3; 477/4; 477/5

(58) Field of Classification Search ................ 477/3–5; 475/2, 5
See application file for complete search history.

(56) References Cited

U.S. PATENT DOCUMENTS

| | | | | |
|---|---|---|---|---|
| 5,730,676 | A | * | 3/1998 | Schmidt ......................... 475/5 |
| 5,904,631 | A | * | 5/1999 | Morisawa et al. .............. 475/5 |
| 6,527,658 | B2 | * | 3/2003 | Holmes et al. ................. 475/5 |
| 6,579,201 | B2 | * | 6/2003 | Bowen ........................... 475/5 |
| 6,886,648 | B1 | | 5/2005 | Hata et al. |
| 6,966,866 | B2 | * | 11/2005 | Ando et al. ..................... 477/4 |
| 7,108,630 | B2 | * | 9/2006 | Ozeki et al. .................... 477/3 |

FOREIGN PATENT DOCUMENTS

| | | |
|---|---|---|
| JP | 50-30223 | 3/1975 |
| JP | 2-236049 | 9/1990 |
| JP | 5-164205 | 6/1993 |
| JP | 7-336810 | 12/1995 |
| JP | 9-158997 | 6/1997 |
| JP | 9-193676 | 7/1997 |
| JP | 11-198668 | 7/1999 |
| JP | 11-198668 A | 7/1999 |
| JP | 11-198670 | 7/1999 |
| JP | 11-198670 A | 7/1999 |
| JP | 11-217025 | 8/1999 |
| JP | 11-217025 A | 8/1999 |
| JP | 00-209706 | 7/2000 |
| JP | 2000-341804 | 12/2000 |
| JP | 2000-346187 | 12/2000 |

(Continued)

OTHER PUBLICATIONS

International Search Report for Appln. No. JP2005/003425 mailed Sep. 1, 2005.

*Primary Examiner*—Ha D. Ho
(74) *Attorney, Agent, or Firm*—Kenyon & Kenyon LLP

(57) ABSTRACT

A vehicular transmission mechanism, switchable between a continuously-variable shifting state and a step-variable shifting state, and a control device for controlling an operation of switching of the shifting state of the transmission mechanism so as to reduce its switching shock and improve the durability of coupling devices. The transmission mechanism 10 is switchable between the electrically established continuously-variable shifting state and the step-variable shifting state, by selective releasing and engaging actions of a switching clutch and brake.

49 Claims, 28 Drawing Sheets

FOREIGN PATENT DOCUMENTS

| | | |
|---|---|---|
| JP | 03-016749 | 2/2003 |
| JP | 03-127681 | 5/2003 |
| JP | 03-130202 | 5/2003 |
| JP | 03-130203 | 5/2003 |
| JP | 2003-127679 | 5/2003 |
| JP | 2003-127681 A | 5/2003 |
| JP | 2003-130202 A | 5/2003 |
| JP | 2003-130203 A | 5/2003 |
| JP | 04-236406 | 8/2004 |
| WO | WO 03/016749 A1 | 2/2003 |

* cited by examiner

|      | C0 | C1 | C2 | B0 | B1 | B2 | B3 | SPEED RATIO | STEPPING RATIO |
|------|----|----|----|----|----|----|----|-------------|----------------|
| 1st  | ◎  | ○  |    |    |    |    | ○  | 3.357       | 1.54           |
| 2nd  | ◎  | ○  |    |    |    | ○  |    | 2.180       | 1.53           |
| 3rd  | ◎  | ○  |    |    | ○  |    |    | 1.424       | 1.42           |
| 4th  | ◎  | ○  | ○  |    |    |    |    | 1.000       | 1.42           |
| 5th  |    | ○  | ○  | ◎  |    |    |    | 0.705       | SPREAD 4.76    |
| R    |    |    | ○  |    |    |    | ○  | 3.209       |                |
| N    | ○  |    |    |    |    |    |    |             |                |

○ ENGAGED
◎ ENGAGED FOR STEP-VARIABLE SHIFTING, AND RELEASED FOR CONTINUOUSLY-VARIABLE SHIFTING

|   | C0 | C1 | C2 | B0 | B1 | B2 | SPEED RATIO | STEPPING RATIO |
|---|---|---|---|---|---|---|---|---|
| 1st | ◎ | ○ |   |   |   | ○ | 2.804 | 1.54 |
| 2nd | ◎ | ○ |   |   | ○ |   | 1.531 | 1.53 |
| 3rd | ◎ | ○ | ○ |   |   |   | 1.000 | 1.42 |
| 4th |   | ○ | ○ | ◎ |   |   | 0.705 | SPREAD 3.977 |
| R |   |   | ○ |   |   | ○ | 2.393 |  |
| N | ○ |   |   |   |   |   |   |  |

○ ENGAGED
◎ ENGAGED FOR STEP-VARIABLE SHIFTING, AND RELEASED FOR CONTINUOUSLY-VARIABLE SHIFTING

CONTROL DEVICE FOR VEHICULAR DRIVE SYSTEM

TECHNICAL FIELD

The present invention relates to a control device for a vehicular drive system, and more particularly to control techniques for switching the drive system between an electrically established continuously-variable shifting state and a step-variable shifting state.

BACKGROUND ART

There is known a vehicle provided with a control device for controlling a drive system including a power distributing mechanism arranged to distribute an output of an engine to a first electric motor and an output shaft, and a second electric motor disposed between the output shaft of the power distributing mechanism and drive wheels of the vehicle. Examples of this control device include a control device for a hybrid vehicle as disclosed in Patent Document 1. In the hybrid vehicle drive systems disclosed in this document, the power distributing mechanism is constituted by three rotary elements, the first element being connected to the engine, the second element being connected to the first electric motor, and the third element being connected to the second electric motor, such that a major portion of the drive force generated by the engine is mechanically transmitted directly to the drive wheels, while the rest of the drive force is electrically transmitted from the first electric motor to the second electric motor through an electric path therebetween, and the drive systems are controlled such that the engine is kept in an optimum operating state, permitting the vehicle to run with an improved fuel economy.

Patent Document 1: JP-2003-130202A
Patent Document 2: JP-2003-130203A
Patent Document 3: JP-2003-127681A
Patent Document 4: JP-11-19868A
Patent Document 5: JP-11-198670A
Patent Document 6: JP-11-217025A
Patent Document 7: WO 03/016749A1

PROBLEM SOLVED BY THE INVENTION

Generally, a continuously-variable transmission is known as a device for improving the fuel economy of a vehicle, while on the other hand a planetary gear type power transmitting device such as a step-variable transmission is known as a device having a high power transmitting efficiency. However, there is not known any power transmitting mechanism that is suitable for improving both of the fuel economy and the power transmitting efficiency. The conventional hybrid vehicle drive systems as disclosed in the above-identified documents, for example, have an electric path through which an electric energy is transmitted from the first electric motor to the second electric motor, that is, a power transmitting path through which a portion of the vehicle drive force is transmitted as an electric energy. These drive systems require the first electric motor to be large-sized with an increase of the required output of the engine, so that the second electric motor operated with the electric energy generated from the first electric motor is also required to be large-sized, whereby the drive systems tend to be unfavorably large-sized. Alternatively, the conventional vehicular drive systems, wherein a portion of the output of the engine is once converted into an electric energy and then transmitted to the drive wheels, have a risk of deterioration of the fuel economy in some running condition of the vehicle, for instance, during running of the vehicle at a relatively high speed.

As a result of extensive studies in an effort to solve the problems described above, the present inventors found that the first and second electric motors are not required to have large sizes where the engine is operated in a normal or comparatively low output range, but the required sizes of the electric motors are increased depending upon the required capacity or output where the engine is operated in a high output range, for example, to provide a maximum output, for high output running of the vehicle. Based on this fact, the inventors further found that the required sizes of the first and second electric motors can be reduced to make the drive system compact, by controlling the drive system such that the output of the engine is transmitted to the drive wheels primarily through a mechanical power transmitting path when the engine is operated in a high output range. The inventors also found that the transmission of the engine output to the drive wheels primarily through the mechanical power transmitting path makes it possible to further improve the fuel economy by reducing a loss of energy conversion by the first electric motor from a portion of the engine output into an electric energy which is supplied to the second electric motor through the electric path and which is converted by the second electric motor into a mechanical energy to be transmitted to the drive wheels, during high-speed running of the vehicle. Thus, the drive system can be small-sized and the fuel economy can be improved by suitably switching the drive system between a continuously-variable shifting state and a step-variable shifting state, depending upon the specific condition of the vehicle. The drive system includes a coupling device operable to connect any two of the first through third elements of the power distributing mechanism, and/or a coupling device operable to fix the second element to a stationary member. The power distributing mechanism is operable as an electrically controlled continuously variable transmission, in the continuously-variable shifting state established by releasing the coupling device or devices, and as a step-variable transmission in the step-variable shifting state established by engaging the coupling device or one of the coupling devices.

The drive system is switched between the continuously-variable and step-variable shifting states by releasing or engaging the coupling device. For example, the drive system is switched from the step-variable shifting state to the continuously-variable shifting state, by releasing the coupling device. In this case, the reaction torque of the coupling device in question is gradually reduced in the process of its releasing action while the reaction torque of the electric motor is gradually increased. The drive system suffers from a risk of occurrence of a switching shock upon a switching action of the power distributing mechanism, depending upon timings of changes of the reaction torques of the coupling device and the electric motor, or the magnitude of the reaction torque upon the switching action. That is, the drive system has a risk of occurrence of the switching shock if the timings of changes of the reaction torques or the magnitude of the reaction torque of the electric motor upon the switching action is/are not adequately controlled. In other words, the reaction torque of the coupling device is a torque of the engine transmitted through the coupling device in the process of its releasing action, so that if the engine torque transmitted through the coupling device is not rapidly replaced by the reaction torque of the electric motor, the drive system may suffer from a switching shock due to a temporary change of the engine torque transmitted to the drive wheels. Further, a large difference between input and output speeds of the coupling device in the process of its releasing action, that is, during a partially slipping action of the coupling device, may result in an overload on the coupling device, giving rise to a risk of deterioration of the durability of the coupling device.

When the drive system is switched from the continuously-variable shifting state to the step-variable shifting state by engaging the coupling device, the coupling device may suffer from an engaging shock due to a large speed difference between the two rotary elements to be connected to each other by the engaging action of the coupling device, which speed difference is zeroed upon completion of the engaging action to establish the step-variable shifting state. Further, a large difference between the input and output speeds of the coupling device in the process of its engaging action, that is, during a partially slipping action of the coupling device, may result in an overload on the coupling device, also giving rise to a risk of deterioration of the durability of this coupling device.

The present invention was made in view of the background art described above. It is therefore an object of the present invention to provide a control device for a vehicular drive system, which is arranged to reduce the switching shock of the drive system upon switching between a continuously-variable shifting state in which the drive system is operable as an electrically controlled continuously variable transmission, and a step-variable shifting state in which the drive system is operable as a step-variable transmission, or to provide a control device for the drive system, which is arranged to improve the durability of a coupling device provided for switching the drive system between the two shifting states.

MEANS FOR SOLVING THE PROBLEM

According to a $1^{st}$ form of this invention, there is provided a control device for a vehicular drive system arranged to transmit an output of an engine to a drive wheel of a vehicle, comprising (a) a switchable type transmission mechanism including a power distributing mechanism which has a first element fixed to said engine, a second element fixed to a first electric motor, and a third element fixed to a second electric motor and a power transmitting member, and a coupling device operable to connect any two of the first through third elements to each other and/or fix the second element to a stationary member, the switchable type transmission mechanism being switchable between a continuously-variable shifting state in which the switchable type transmission mechanism is operable as an electrically controlled continuously variable transmission, and a step-variable shifting state in which the switchable type transmission mechanism is operable as a step-variable transmission; (b) switching control means for switching the coupling device between a released state and an engaged state, on the basis of a predetermined condition of the vehicle, to place the switchable type transmission mechanism selectively in one of the continuously-variable shifting state and the step-variable shifting state; and (c) electric motor control means for controlling the first electric motor so as to generate a reaction torque upon releasing of the coupling device, and/or so as to reduce speed differences among the first element, the second element and the third element or a speed difference between the second element and the stationary member, upon engaging of the coupling device.

In the present control device, the electric motor control means is arranged to control the first electric motor of the switchable type transmission mechanism including the power distributing mechanism which has the first element fixed to the engine, the second element fixed to the first electric motor, and the third element fixed to the second electric motor and the power transmitting member, and the coupling device operable to connect any two of the first through third elements to each other and/or fix the second element to the stationary member. The switchable type transmission mechanism is switchable between the continuously-variable shifting state in which the switchable type transmission mechanism is operable as the electrically controlled continuously variable transmission, and a step-variable shifting state in which the switchable type transmission mechanism is operable as the step-variable transmission. The electric motor control means controls the first electric motor so as to generate a reaction torque upon releasing of the coupling device, and/or so as to reduce the speed differences among the first, second and third element or the speed difference between the second element and the stationary member upon engaging of the coupling device. Accordingly, the reaction torque of the coupling device is adequately replaced by the reaction torque of the first electric motor, so that the switching shock upon switching of the switchable type transmission mechanism is reduced. Further, the reduction of the reaction torque of the coupling device is compensated for by the reaction torque of the first electric motor, as if the coupling device were kept in the engaged state, so that the difference between the input and output speeds of the coupling device is reduced, whereby the load on the coupling device in its partially engaged state is reduced, with a result of an improvement in the durability of the coupling device. Alternatively, the speeds of the rotary elements are changed to the value that is to be established after completion of switching to the step-variable shifting state, so that the switching shock due to the speed differences upon engagement of the coupling device is reduced, and the difference between the input and output speeds of the coupling device in its partially engaged state is reduced, so that the load on the coupling device is reduced, with a result of an improvement of the coupling device. It is also noted that the power distributing mechanism is simply constituted by the three elements and the coupling device, and the switchable type transmission mechanism is easily switched by the coupling device under the control of the switching control means, between the continuously-variable shifting state and the step-variable shifting state.

In a preferred $2^{nd}$ form of this invention according to the $1^{st}$ form, the switching control means is operable to release the coupling device to place the switchable type transmission mechanism in the continuously-variable shifting state in which the first, second element and third element are rotatable relative to each other, and operable to engage the coupling device to place the switchable type transmission mechanism in the step-variable shifting state in which any two of the first, second and third elements are connected to each other or the second element is held stationary. This arrangement of the switching control means permits easy switching of the switchable type transmission mechanism between the continuously-variable shifting state and the step-variable shifting state.

In a preferred $3^{rd}$ form of this invention according to the $1^{st}$ or $2^{nd}$ form, the switching control means is operable upon switching of the switchable type transmission mechanism from the step-variable shifting state to the continuously-variable shifting state, to initiate a releasing action of the coupling device after generation of the reaction torque by the first electric motor under the control of the electric motor control means. According to this arrangement, the reaction torque of the coupling device is adequately replaced by the reaction torque of the first electric motor, so that the switching shock upon switching of the switchable type transmission mechanism is reduced. Further, the reaction torque generated by the first electric motor permits the speed of the second element to be adequately controlled in spite of the reduction of the reaction torque of the coupling device, so that the durability of the coupling device is improved.

In a preferred $4^{th}$ form of this invention according to the $1^{st}$ or $2^{nd}$ form, the switching control means is operable upon switching of the switchable type transmission mechanism from the step-variable shifting state to the continuously-variable shifting state, and the electric motor control means controls the first electric motor in the process of a releasing action of the coupling device under the control of the switching control means such that the reaction torque of the first electric motor is increased as the coupling device is released. According to this arrangement, the reaction torque of the coupling device is adequately replaced by the reaction torque of the first electric motor, so that the switching shock upon switching of the switchable type transmission mechanism is reduced. Further, the reaction torque generated by the first electric motor permits the speed of the second element to be adequately controlled in spite of the reduction of the reaction torque of the coupling device, so that the durability of the coupling device is improved.

In a preferred $5^{th}$ form of this invention according to the $4^{th}$ form, the electric motor control means feedback-controls a speed of the first electric motor, so as to reduce the speed differences among the first, second and third elements or the speed difference between the second element and the stationary member. According to this arrangement, the speed difference among the first, second and third elements or the speed difference between the second element and the stationary member is reduced in the process of the releasing action of the coupling device, so that the reaction torque of the coupling device is rapidly replaced by the reaction torque of the first electric motor.

In a preferred $6^{th}$ form of this invention according to any one of the $3^{rd}$ through $5^{th}$ forms, the electric control means controls a speed of the first electric motor such that the speed differences among the first, second and third elements or the speed difference between the second element and the stationary member is maintained at a value before initiation of the releasing action of the coupling device, until the releasing action controlled by the switching control means is completed. According to this arrangement, the difference between the input and output speeds of the coupling device in its partially engaged state is reduced until the releasing action is completed, so that the load on the coupling device due to the dragging phenomenon is reduced, with a result of an improvement in the durability of the coupling device.

In a preferred $7^{th}$ form of this invention according to any one of the $1^{st}$ through $6^{th}$ forms, the switching control means is operable upon switching of the switchable type transmission mechanism from the continuously-variable shifting state to the step-variable shifting state, to initiate an engaging action of the coupling device after a speed of the first electric motor has been controlled by the electric motor control means so as to reduce the speed differences among the first, second and third elements or the speed difference between the second element and the stationary member. According to this arrangement, the speed of each rotary element is controlled to be changed to the value that is to be established after the switching to the step-variable shifting state, so that the switching shock due to the speed difference upon engagement of the coupling device is reduced, and the difference between the input and output speeds of the coupling device in its partially engaged state is reduced, whereby the load on the coupling is reduced, with a result of an improvement in the durability of the coupling device.

In a preferred $8^{th}$ form of this invention according to any one of the $1^{st}$ through $6^{th}$ forms, the switching control means is operable upon switching of the switchable type transmission mechanism from the continuously-variable shifting state to the step-variable shifting state, to effect an engaging action of the coupling device in the process of control of a speed of the first electric motor by the electric motor control means so as to reduce the speed differences among the first, second and third elements or the speed difference between the second element and the stationary member. According to this arrangement, the speed of each rotary element is controlled to be changed to the value that is to be established after the switching to the step-variable shifting state, so that the switching shock due to the speed difference upon engagement of the coupling device is reduced, and the difference between the input and output speeds of the coupling device in its partially engaged state is reduced, whereby the load on the coupling is reduced, with a result of an improvement in the durability of the coupling device.

In a preferred $9^{th}$ form of this invention according to the $7^{th}$ or $8^{th}$ form, the control device further comprises engine output control means for controlling a torque or output of the engine, and the engine output control means limits the torque or output of the engine, so as to prevent the torque or output of the engine from exceeding an upper limit determined by a nominal rating of the first electric motor, until the engaging action of the coupling device controlled by the switching control means is completed. According to this arrangement, upon switching of the switchable type transmission mechanism from the continuously-variable shifting state to the step-variable shifting state in response to a requirement for high-output running of the vehicle, for example, the switchable type transmission mechanism is adequately kept in its continuously-variable shifting state before switching to the step-variable shifting state, even where the first electric motor does not have a capacity or output corresponding to a high-output range of the engine.

In a preferred $10^{th}$ form of this invention according to any one of the $1^{st}$ through $9^{th}$ forms, the predetermined condition of the vehicle is determined on the basis of a predetermined upper limit value of a running speed of the vehicle, and the switching control means places the switchable type transmission mechanism in the step-variable shifting state when an actual value of the running speed of the vehicle is higher than the predetermined upper limit value. In the high-speed running state of the vehicle in which the actual vehicle speed is higher than the upper limit value, therefore, the output of the engine is transmitted to the drive wheel primarily through a mechanical power transmitting path, so that the fuel economy is improved owing to reduction of a loss of conversion between mechanical and electric energies in the step-variable shifting state as compared with that in the continuously-variable shifting state. The predetermined upper limit value is determined to determine whether the vehicle is in the high-speed running state.

Preferably, the predetermined condition of the vehicle is determined on the basis of a predetermined upper limit value of a running speed of the vehicle, and the switching control means inhibits the switchable type transmission mechanism from being placed in the continuously-variable shifting state when an actual value of the running speed of the vehicle is higher than the predetermined upper limit value. In the high-speed running state of the vehicle in which the actual vehicle speed is higher than the upper limit value, therefore, the switchable type transmission mechanism is prevented from being placed in the continuously-variable shifting state, so that the output of the engine is transmitted to the drive wheel of the vehicle primarily through a mechanical power transmitting path, and the fuel economy is improved owing to reduction of a loss of conversion between mechanical and electric energies in the step-variable shifting state as compared with that in the continuously-variable shifting state.

In a predetermined $11^{th}$ form of this invention according to any one of the $1^{st}$ through $10^{th}$ forms, the predetermined condition of the vehicle is determined on the basis of a predetermined upper limit value of a drive-force-related value of the vehicle, and the switching control means places the switchable type transmission mechanism in the step-variable shifting state when the drive-force-related value of the vehicle is higher than the predetermined upper limit value. According to this arrangement, the output of the engine is transmitted to the drive wheel primarily through a mechanical power transmitting path, when the drive-force-related value such as the vehicle-operator's desired vehicle drive force or the actual vehicle drive force is higher than a predetermined upper limit. Accordingly, the required maximum amount of electric energy that should be generated by the first electric motor can be reduced, so that the required size of the first electric motor can be reduced, whereby the required size of the vehicular drive system including the first electric motor can be reduced. The drive-force-related value is a parameter directly or indirectly relating to a drive force of the vehicle, such as the output torque of the engine, output torque of the switchable type transmission mechanism, drive torque of the drive wheel, any other torque or rotary drive force in the power transmitting path, and the angle of opening of a throttle valve of the engine which represents such torque values. The above-described predetermined upper limit value of the vehicle output is determined to determine whether the vehicle is in the high-output running state.

Preferably, the predetermined condition of the vehicle is determined on the basis of a predetermined upper limit value of a drive-force-related value of the vehicle, and the switching control means inhibits the switchable type transmission mechanism from being placed in the step-variable shifting state when the drive-force-related value of the vehicle is higher than the predetermined upper limit value. According to this arrangement, the switchable type transmission mechanism is prevented from being placed in the continuously-variable shifting state when the drive-force-related value of the vehicle such as the vehicle-operator' desired vehicle drive force or the actual vehicle drive force is higher than the predetermined upper limit value, the required maximum amount of electric energy that should be generated by the first electric motor can be reduced, and the output of the engine is transmitted to the drive wheel primarily through a mechanical power transmitting path, so that the required size of the first electric motor can be reduced, whereby the required size of the vehicular drive system including the first electric motor can be reduced.

In a preferred $12^{th}$ form of this invention according to any one of the $16^{st}$ through $11^{th}$ forms, the predetermined condition of the vehicle is determined on the basis of an actual value of a running speed of the vehicle and an actual value of a drive-force-related value of the vehicle and according to a stored switching boundary line map including a high-speed-running boundary line and a high-output-running boundary-line which are defined by parameters in the form of the running speed of the vehicle and the drive-force-related value. According to this arrangement, the determination as to whether the vehicle is in the high-speed running state or in the high-output running state can be facilitated.

In a preferred $13^{th}$ form of this invention according to any one of the $1^{st}$ through $12^{th}$ forms, the predetermined condition of the vehicle is a functional-deterioration determining condition which is satisfied when a function of any one of control components for placing the switchable type transmission mechanism in the electrically established continuously-variable shifting state is deteriorated, and the switching control means places the switchable type transmission mechanism in the step-variable shifting state when the functional-deterioration determining condition is satisfied. According to this arrangement, in the event of determination of the functional deterioration which disables the switchable type transmission mechanism to be placed in the continuously-variable shifting state, the transmission mechanism is placed in the step-variable shifting state, so that the vehicle can be run in the step-variable shifting state, even in the presence of the functional deterioration.

Preferably, the predetermined condition of the vehicle is a functional-deterioration determining condition which is satisfied when a function of any one of control components for placing the switchable type transmission mechanism in the electrically established continuously-variable shifting state is deteriorated, and the switching control means inhibits the switchable type transmission mechanism from being placed in the step-variable shifting state when the functional-deterioration determining condition is satisfied. According to this arrangement, in the event of determination of the functional deterioration of any control component for placing the switchable transmission mechanism in the electrically established continuously-variable shifting state, the switchable type transmission mechanism is prevented from being placed in the continuously-variable shifting state, so that the transmission mechanism is placed in the step-variable shifting state to permit the vehicle to run in the step-variable shifting state, even in the presence of the functional deterioration which disables the switchable type transmission mechanism to be placed in the continuously-variable shifting state.

In a preferred $14^{th}$ form of this invention according to any one of the $1^{st}$ through $13^{th}$ forms, the power distributing mechanism is a planetary gear set, and the first element is a carrier of the planetary gear set, and the second element is a sun gear of the planetary gear set, while the third element is a ring gear of the planetary gear set, and wherein the coupling device includes a clutch operable to connect any two of the carrier, sun gear and ring gear to each other, and/or a brake operable to fix the sun gear to the stationary member. According to this arrangement, the axial dimension of the power distributing mechanism can be reduced, and the power distributing mechanism is simply constituted by one planetary gear set.

In a preferred $15^{th}$ form of this invention according to the $14^{th}$ form, the planetary gear set is of a single-pinion type. According to this arrangement, the axial dimension of the power distributing mechanism can be reduced, and the power distributing mechanism is simply constituted by one planetary gear set.

In a preferred $16^{th}$ form of this invention according to any one of the $1^{st}$ through $13^{th}$ forms, the power distributing mechanism is a differential gear device, and the coupling device includes a clutch operable to connect any two of the first, second and third elements, and/or a brake operable to fix the second element to the stationary member. According to this arrangement, the axial dimension of the power distributing mechanism can be reduced, and the power distributing mechanism is simply constituted by one differential gear device.

In a preferred 17th form of this invention according to the 16th form, the differential gear device is of a bevel-gear type. According to this arrangement, the axial dimension of the power distributing mechanism can be reduced, and the power distributing mechanism is simply constituted by one differential gear device of bevel-gear type.

In a preferred 18th form of this invention according to any one of the 14th through 17th forms, the switching control means engages the clutch to enable the power distributing mechanism to operate as a transmission having a speed ratio of 1, or engages the brake to enable the power distributing mechanism to operate as a speed-increasing transmission having a speed ratio lower than 1. According tot his arrangement, the power distributing mechanism is easily controlled by the switching control means, so as to be selectively operated as a transmission having a single fixed speed ratio or a transmission having a plurality of fixed speed ratios.

In a preferred 19th form of this invention according to any one of the 1st through 18th forms, the switchable type transmission mechanism includes an automatic transmission disposed between the power transmitting member and the drive wheel and connected in series to the power distributing mechanism, and has a speed ratio determined by a speed ratio of the automatic transmission. According to this arrangement, the vehicle drive force can be obtained over a wide range of the speed ratio, by utilizing the speed ratio of the automatic transmission.

In a preferred 20th form of this invention according to the 19th form, the switchable type transmission mechanism has an overall speed ratio defined by a speed ratio of the power distributing mechanism and the speed ratio of the automatic transmission. According to this arrangement, the vehicle drive force can be obtained over a wide range of the speed ratio, by utilizing the speed ratio of the automatic transmission, so that the efficiency of the continuously-variable shifting control of the power distributing mechanism can be improved. Preferably, the automatic transmission is a step-variable automatic transmission. In this case, the power distributing mechanism and the step-variable automatic transmission cooperate to establish the continuously-variable shifting state in which the switchable type transmission mechanism is operable as a continuously-variable transmission, and the step-variable shifting state in which the transmission mechanism is operable as a step-variable automatic transmission.

In a preferred 21st form of this invention according to the 19th or 20th form, the automatic transmission is a step-variable automatic transmission which is shifted according to a stored shifting boundary line map. According to this arrangement, the shifting of the step-variable automatic transmission is easily performed.

The switching control means is preferably arranged to place the switchable type transmission mechanism selectively in one of the continuously-variable shifting state and the step-variable shifting state, on the basis of the predetermined condition of the vehicle. Namely, the switching control means controls the coupling device which is incorporated in the power distributing mechanism of the switchable type transmission mechanism and which is arranged to connect any two of the first through third elements of the power distributing mechanism and/or fix the second element to the stationary member, for selectively switching the switchable type transmission mechanism between the continuously-variable shifting state and the step-variable shifting state, on the basis of the vehicle condition. Therefore, the drive system has not only an advantage of an improvement in the fuel economy owing to the function of the electrically controlled continuously variable transmission, but also an advantage of high power transmitting efficiency owing to the function of the step-variable transmission capable of mechanically transmitting a vehicle drive force. When the vehicle is in a low- or medium-speed running state, or in a low- or medium-output running state, for example, the switchable type transmission mechanism is placed in the continuously-variable shifting state, so that the fuel economy of the vehicle is improved. When the vehicle is in a high-speed running state, on the other hand, the switchable type transmission mechanism is placed in the step-variable shifting state in which the transmission mechanism is operable as the step-variable transmission, and the output of the engine is transmitted to the drive wheel primarily through a mechanical power transmitting path, so that the fuel economy is improved owing to reduction of a loss of energy conversion between mechanical and electric energies, which would take place when the transmission mechanism is operated as the electrically controlled continuously variable transmission. When the vehicle is in a high-output running state, the switchable type transmission mechanism is placed in the step-variable shifting state. Thus, the transmission mechanism is operated as the electrically controlled continuously variable transmission, only when the vehicle is in the low- or medium-speed running state or in the low- or medium-output running state, so that the required amount of electric energy generated by the electric motor, that is, the maximum amount of electric energy that must be transmitted from the electric motor can be reduced, making it possible to minimize the required size of the electric motor, and the required size of the drive system including the electric motor.

Preferably, the switchable type transmission mechanism is arranged such that the second electric motor is directly connected to the power transmitting member. According to this arrangement, the required output torque of the power distributing mechanism can be reduced with respect to the torque of the output shaft of the above-described automatic transmission, so that the required size of the second electric motor can be reduced.

According to a 22nd form of the present invention, there is provided a control device for a vehicular drive system including a differential portion which is operable as an electrically controlled differential device and which includes a differential mechanism operable to distribute an output of an engine to a first electric motor and a power transmitting member and having a plurality of rotary elements, and a second electric motor disposed in a power transmitting path between the power transmitting member and a drive wheel of a vehicle, the control device being characterized by comprising: (a) a coupling device provided in the differential mechanism and operable to switch the differential portion between a differential state in which the differential portion is operable as the electrically controlled differential device and is capable of performing a differential function, and a locked state in which the differential portion is not capable of performing the differential function, (b) switching control means for switching the coupling device between a released state and an engaged state, on the basis of a predetermined condition of the vehicle, to place the differential portion selectively in one of the differential state and the locked state, and (c) electric motor control means for controlling the first electric motor so as to generate a reaction torque upon releasing of the coupling device, and/or so as to reduce speed differences among the plurality of rotary elements or a speed difference between one of the plurality of rotary elements to which the first electric motor is fixed, and a stationary member, upon engaging of the coupling device.

According to the present control device, the switching control means is provided to switch the coupling device between the released and engaged states on the basis of the predetermined condition of the vehicle, for placing the differential portion selectively in one of the differential state in which the differential portion is operable as the electrically controlled differential device and is capable of performing the differential function, and the lock state in which the differential portion is not capable of performing the differential function.

Since the differential portion is selectively placed in one of the differential state and the locked state on the basis of the predetermined condition of the vehicle under the control of the switching control means, the drive system has not only an advantage of an improvement in the fuel economy owing to the function of a transmission whose speed ratio is electrically changed, but also an advantage of high power transmitting efficiency owing to the function of a gear type power transmitting device capable of mechanically transmitting a vehicle drive force. When the vehicle is in a low- or medium-speed running state, or in a low- or medium-output running state, with the engine operated in a normal output range, for example, the differential portion is placed in the differential state, so that the fuel economy of the vehicle is improved. When the vehicle is in a high-speed running state, on the other hand, the differential portion is placed in the locked state in which the output of the engine is transmitted to the drive wheel primarily through a mechanical power transmitting path, so that the fuel economy is improved owing to reduction of a loss of energy conversion between mechanical and electric energies, which would take place when the differential portion is operated as the transmission whose speed ratio is electrically changed. When the vehicle is in a high-output running state, the differential portion is placed in the locked state. Thus, the differential portion is operated as the transmission whose speed ratio is electrically changed, only when the vehicle is in the low- or medium-speed running state or in the low- or medium-output running state, so that the required amount of electric energy generated by the electric motor, that is, the maximum amount of electric energy that must be transmitted from the electric motor can be reduced, making it possible to minimize the required size of the electric motor, and the required size of the drive system including the electric motor.

In the present control device for controlling the drive system including the differential portion switchable between the differential state and the locked state, the electric motor control means is arranged to control the first electric motor so as to generate a reaction torque upon releasing of the coupling device, and/or so as to reduce the speed differences among the first, second and third element or the speed difference between the second element and the stationary member upon engaging of the coupling device. Accordingly, the reaction torque of the coupling device is adequately replaced by the reaction torque of the first electric motor when the coupling device is released, so that the switching shock upon switching of the differential portion under the control of the switching control means is reduced. Further, the reduction of the reaction torque of the coupling device is compensated for by the reaction torque of the first electric motor, as if the coupling device were kept in the engaged state, so that the difference between the input and output speeds of the coupling device is reduced, whereby the load on the coupling device in its partially engaged state is reduced, with a result of an improvement in the durability of the coupling device. When the coupling device is engaged, the speeds of the plurality of rotary elements are changed to the value that is to be established after completion of the engaging action of the coupling device, that is, after switching of the differential portion to the locked state, so that the switching shock due to the speed differences upon engagement of the coupling device is reduced, and the difference between the input and output speeds of the coupling device in its partially engaged state is reduced, whereby the load on the coupling device is reduced, with a result of an improvement of the coupling device.

In a preferred $23^{rd}$ form of this invention according to the $22^{nd}$ form, the plurality of rotary elements of the differential mechanism consist of a first element fixed to the engine, a second element fixed to the first electric motor, and a third element fixed to the power transmitting member, and the coupling device is operable to connect any two of the first through third elements, and/or fix the second element to the stationary member. According to this arrangement, the differential mechanism which enables the differential portion to be switched between the differential state and the locked state is simply constituted by the three elements and the coupling device.

In a preferred $24^{th}$ form of this invention according to the $23^{rd}$ form, the switching control means is operable to release the coupling device to place the differential portion in the differential state in which the first, second and third elements are rotatable relative to each other, and operable to engage the coupling device to place the differential portion in the locked state in which the first, second and third elements are rotated as a unit or the second element is held stationary. According to this arrangement, the differential portion is easily switchable between the differential state and the locked state, by the coupling device controlled by the switching control means.

Preferably, the switching control means is operable to switch the coupling device between the released and engaged state, on the basis of the predetermined condition of the Vehicle, to place the differential mechanism selectively in one of a differential state and a locked state, so that the differential portion is placed in the differential state when the differential mechanism is placed in the differential state, and in the locked state when the differential mechanism is placed in the locked state. In this case, the differential portion is easily switched between the differential state and the locked state.

In a preferred $25^{th}$ form of this invention according to the $23^{rd}$ or $24^{th}$ form, the switching control means is operable upon switching of said differential portion from said locked state to said differential state, to initiate a releasing action of said coupling device after generation of the reaction torque by said first electric motor under the control of said electric motor control means. According to this arrangement, the reaction torque of the coupling device is adequately replaced by the reaction torque of the first electric motor, so that the switching shock upon switching of the differential portion is reduced. Further, the reaction torque generated by the first electric motor permits the speed of the second element to be adequately controlled in spite of the reduction of the reaction torque of the coupling device, so that the durability of the coupling device is improved.

In a preferred 26th form of this invention according to the 23rd or 24th form, the switching control means is operable upon switching of the differential portion from the locked state to the differential state, and the electric motor control means controls the first electric motor in the process of a releasing action of the coupling device under the control of the switching control means such that the reaction torque of the first electric motor is increased as the coupling device is released. According to this arrangement, the reaction torque of the coupling device is adequately replaced by the reaction torque of the first electric motor, so that the switching shock upon switching of the differential portion is reduced. Further, the reaction torque generated by the first electric motor permits the speed of the second element to be adequately controlled in spite of the reduction of the reaction torque of the coupling device, so that the durability of the coupling device is improved.

In a preferred 27th form of this invention according to the 26th form, the electric motor control means feedback-controls a speed of the first electric motor, so as to reduce the speed differences among the first, second and third elements or the speed difference between the second element and the stationary member. According to this arrangement, the speed difference among the first, second and third elements or the speed difference between the second element and the stationary member is reduced in the process of the releasing action of the coupling device, so that the reaction torque of the coupling device is rapidly replaced by the reaction torque of the first electric motor.

In a preferred 28th form of this invention according to any one of the 23rd through 28th forms, the switching control means controls a speed of the first electric motor such that the speed difference among the first, second and third elements or the speed difference between the second element and the stationary member is maintained at a value before initiation of the releasing action of the coupling device, until the releasing action controlled by the switching control means is completed. According to this arrangement, the difference between the input and output speeds of the coupling device in its partially engaged state is reduced until the releasing action is completed, so that the load on the coupling device due to the dragging phenomenon is reduced, with a result of an improvement in the durability of the coupling device.

In a preferred 29th form of this invention according to any one of the 23rd through 28th forms, the switching control means is operable upon switching of said differential portion from said differential state to said locked state, to initiate an engaging action of said coupling device after a speed of said first electric motor has been controlled by said electric motor control means so as to reduce the speed differences among said first, second and third elements or the speed difference between said second element and said stationary member. According to this arrangement, the speed of each rotary element is controlled to be changed to the value that is to be established after the switching to the locked state, so that the switching shock due to the speed difference upon engagement of the coupling device is reduced, and the difference between the input and output speeds of the coupling device in its partially engaged state is reduced, whereby the load on the coupling is reduced, with a result of an improvement in the durability of the coupling device.

In a preferred 30th form of this invention according to any one of the 23rd through 28th forms, the switching control means is operable upon switching of the differential portion from said differential state to said locked state, to effect an engaging action of the coupling device in the process of control of a speed of the first electric motor by the electric motor control means so as to reduce the speed differences among the first, second and third elements or the speed difference between the second element and the stationary member. According to this arrangement, the speed of each rotary element is controlled to be changed to the value that is to be established after the switching to the locked state, so that the switching shock due to the speed difference upon engagement of the coupling device is reduced, and the difference between the input and output speeds of the coupling device in its partially engaged state is reduced, whereby the load on the coupling is reduced, with a result of an improvement in the durability of the coupling device.

In a preferred 31st form of this invention according to the 29th or 30th form, the control device further comprises engine output control means for controlling a torque or output of the engine, and wherein the engine output control means limits the torque or output of the engine, so as to prevent the torque or output of the engine from exceeding an upper limit determined by a nominal rating of the first electric motor, until the engaging action of the coupling device controlled by the switching control means is completed. According to this arrangement, upon switching of the differential portion from the differential state to the locked state in response to a requirement for high-output running of the vehicle, for example, the differential portion is adequately kept in its differential state before switching to the locked state, even where the first electric motor does not have a capacity or output corresponding to a high-output range of the engine.

In a preferred 32nd form of this invention according to any one of: the 23rd through 31st forms, the predetermined condition of the vehicle is determined on the basis of a predetermined upper limit value of a running speed of the vehicle, and the switching control means places the differential portion in the locked state when an actual value of the running speed of the vehicle is higher than the predetermined upper limit value. In the high-speed running state of the vehicle in which the actual vehicle speed is higher than the upper limit value, therefore, the output of the engine is transmitted to the drive wheel primarily through a mechanical power transmitting path, so that the fuel economy is improved owing to reduction of a loss of conversion between mechanical and electric energies in the step-variable shifting state as compared with that in the continuously-variable shifting state. The predetermined upper limit value is determined to determine whether the vehicle is in the high-speed running state.

Preferably, the predetermined condition of the vehicle is determined on the basis of a predetermined upper limit value of a running speed of the vehicle, and the switching control means inhibits the differential portion from being placed in the differential state when an actual value of the running speed of the vehicle is higher than the predetermined upper limit value. In the high-speed running state of the vehicle in which the actual vehicle speed is higher than the upper limit value, therefore, the differential portion is prevented from being placed in the differential state, so that the output of the engine is transmitted to the drive wheel of the vehicle primarily through a mechanical power transmitting path, and the fuel economy is improved owing to reduction of a loss of conversion between mechanical and electric energies in the locked state as compared with that in the differential state.

In a preferred 33rd form of this invention according to any one of the 23rd through 32nd forms, the predetermined condition of the vehicle is determined on the basis of a predetermined upper limit value of a drive-force-related value of the vehicle, and the switching control means places the differential portion in the locked state when the drive-force-related value of the vehicle is higher than the predetermined upper limit value. According to this arrangement, the output of the engine is transmitted to the drive wheel primarily through a mechanical power transmitting path, when the drive-force-related value such as the vehicle-operator's desired vehicle drive force or the actual vehicle drive force is higher than a predetermined upper limit. Accordingly, the required maximum amount of electric energy that should be generated by the first electric motor can be reduced, so that the required size of the first electric motor can be reduced, whereby the required size of the vehicular drive system including the first electric motor can be reduced. The drive-force-related value is a parameter directly or indirectly relating to a drive force of the vehicle, such as the output torque of the engine, output torque of the switchable type transmission mechanism, drive torque of the drive wheel, any other torque or rotary drive force in the power transmitting path, and the angle of opening of a throttle valve of the engine which represents such torque values. The above-described predetermined upper limit value of the vehicle output is determined to determine whether the vehicle is in the high-output running state.

Preferably, the predetermined condition of the vehicle is determined on the basis of a predetermined upper limit value of a drive-force-related value of the vehicle, and the switching control means inhibits the differential portion from being placed in the locked state when the drive-force-related value of the vehicle is higher than the predetermined upper limit value. According to this arrangement, the differential portion is prevented from being placed in the differential state when the drive-force-related value of the vehicle such as the vehicle-operator' desired vehicle drive force or the actual vehicle drive force is higher than the predetermined upper limit value, the required maximum amount of electric energy that should be generated by the first electric motor can be reduced, and the output of the engine is transmitted to the drive wheel primarily through a mechanical power transmitting path, so that the required size of the first electric motor can be reduced, whereby the required size of the vehicular drive system including the first electric motor can be reduced.

In a preferred $34^{th}$ form of this invention according to any one of the $23^{rd}$ through $33^{rd}$ forms, the predetermined condition of the vehicle is determined on the basis of an actual value of a running speed of the vehicle and an actual value of a drive-force-related value of the vehicle and according to a stored switching boundary line map including a high-speed-running boundary line and a high-output-running boundary line which are defined by parameters in the form of the running speed of the vehicle and the drive-force-related value. According to this arrangement, the determination as to whether the vehicle is in the high-speed running state or in the high-output running state can be facilitated.

In a preferred $35^{th}$ form of this invention according to any one of the $23^{rd}$ through $34^{th}$ forms, wherein the predetermined condition of the vehicle is a functional-deterioration determining condition which is satisfied when a function of any one of control components for enabling the differential portion to operate as the electrically controlled differential device is deteriorated, and the switching control means places the differential portion in the locked state when the functional-deterioration determining condition is satisfied. According to this arrangement, in the event of determination of the functional deterioration which disables the differential portion to be placed in the differential state, the transmission mechanism is placed in the locked state, so that the vehicle can be run in the locked state, even in the presence of the functional deterioration.

Preferably, the predetermined condition of the vehicle is a functional-deterioration determining condition which is satisfied when a function of any one of control components for placing the switchable type transmission mechanism in the electrically established continuously-variable shifting state is deteriorated, and the switching control means inhibits the differential portion from being placed in the step-variable shifting state when the functional-deterioration determining condition is satisfied. According to this arrangement, in the event of determination of the functional deterioration of any control component for placing the differential portion in the differential state, the differential portion is prevented from being placed in the differential state, so that the differential portion is placed in the locked state to permit the vehicle to run in the locked state, even in the presence of the functional deterioration which disables the differential portion to be placed in the differential state.

In a preferred $36^{th}$ form of this invention according to any one of the $23^{rd}$ through $35^{th}$ forms, the differential mechanism is a planetary gear set, and the first element is a carrier of the planetary gear set, and the second element is a sun gear of the planetary gear set, while the third element is a ring gear of the planetary gear set, and the coupling device includes a clutch operable to connect any two of the carrier, sun gear and ring gear to each other, and/or a brake operable to fix the sun gear to the stationary member. According to this arrangement, the axial dimension of the differential mechanism can be reduced, and the differential mechanism is simply constituted by one planetary gear set.

In a preferred $37^{th}$ form of this invention according to the $36^{th}$ form, the planetary gear set is of a single-pinion type. According to this arrangement, the axial dimension of the differential mechanism can be reduced, and the differential mechanism is simply constituted by one planetary gear set.

In a preferred $38^{th}$ form of this invention according to any one of the $23^{rd}$ through $35^{th}$ forms, the differential mechanism is a differential gear device, and the coupling device includes a clutch operable to connect any two of the first, second and third elements, and/or a brake operable to fix the second element to the stationary member distributing mechanism can be reduced, and the power distributing mechanism is simply constituted by one differential gear device.

In a preferred $39^{th}$ form of this invention according to the $38^{th}$ form, the differential gear device is of a bevel-gear type. According to this arrangement, the axial dimension of the differential mechanism can be reduced, and the differential mechanism is simply constituted by one differential gear device of bevel-gear type.

In a preferred $40^{th}$ form of this invention according to any one of the $36^{th}$ through $39^{th}$ forms, the switching control means engages the clutch to enable the differential mechanism to operate as a transmission having a speed ratio of 1, or engages the brake to enable the differential mechanism to operate as a speed-increasing transmission having a speed ratio lower than 1. According tot his arrangement, the differential mechanism is easily controlled by the switching control means, so as to be selectively operated as a transmission having a single fixed speed ratio or a transmission having a plurality of fixed speed ratios.

In a preferred $41^{st}$ form of this invention according to any one of the $23^{rd}$ through $40^{th}$ forms, the power transmitting path includes an automatic transmission portion, and the vehicular drive system has an overall speed ratio defined by a speed ratio of the automatic transmission portion and a speed ratio of the differential portion. According to this arrangement, the vehicle drive force can be obtained over a wide range of the speed ratio, by utilizing the speed ratio of the automatic transmission portion.

In a preferred $42^{nd}$ form of this invention according to the $41^{st}$ form, the automatic transmission portion is a step-variable automatic transmission which is shifted according to a stored shifting boundary line map. According to this arrangement, the shifting of the step-variable automatic transmission is easily performed.

Preferably, the second electric motor is directly operatively connected to the power transmitting member. According to this arrangement, the required output torque of the differential portion can be reduced with respect to the torque of the output shaft of the automatic transmission portion, so that the required size of the second electric motor can be reduced.

NOMENCLATURE OF ELEMENTS

Figures 1, 2:
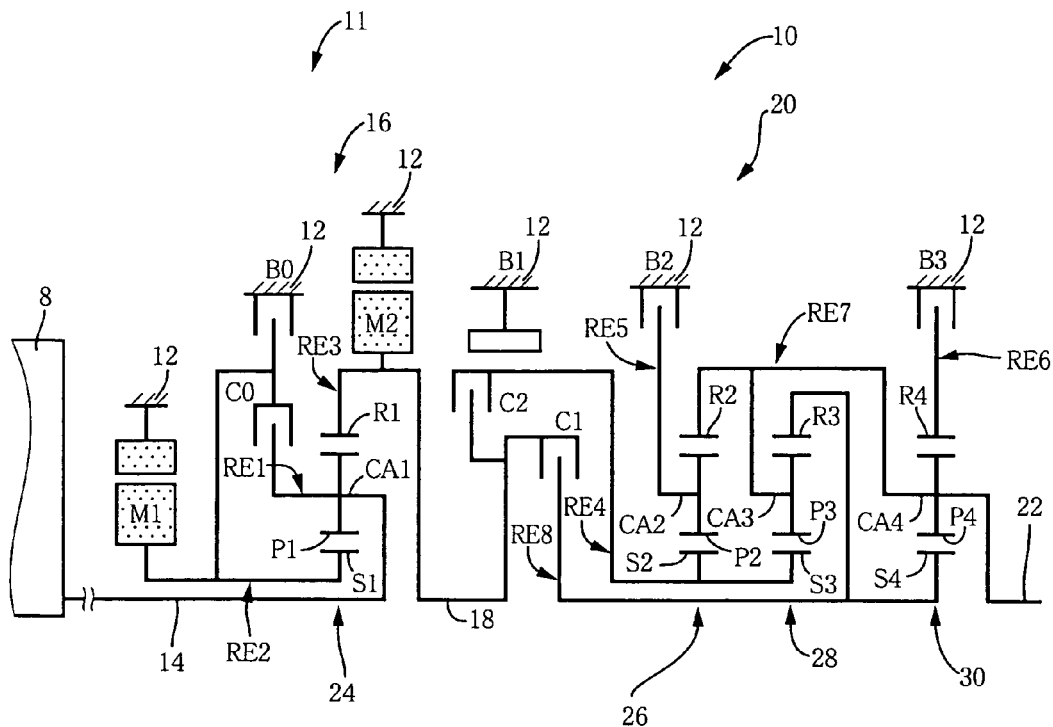
[FIG. 1] This figure is a schematic view for explaining an arrangement of a hybrid vehicle drive system according to one embodiment of the present invention.
[FIG. 2] This figure is a table indicating shifting actions of the hybrid vehicle drive system of the embodiment of FIG. 1, which is operable in a continuously-variable shifting state and a step-variable shifting state, in relation to different combinations of operating states of hydraulically operated frictional coupling devices to effect the respective shifting actions.

8: Engine
10, 70: Switchable type transmission mechanism
11: Switchable type transmission portion (differential portion)
12: Transmission casing (stationary member)
16, 92: Power distributing mechanism (differential mechanism)
18: Power transmitting member
20, 72: Automatic transmission portion (step-variable automatic transmission)
24: First planetary gear set (single-pinion type)
38: Drive wheels
50: Switching control means
82: Electric motor control means
88: Engine-output control means
94: Bevel-gear type differential gear device
M1: First electric motor
M2: Second electric motor
C0: Switching clutch (coupling device)
B0: Switching brake (coupling device)

BEST MODE FOR CARRYING OUT THE INVENTION

Referring to the drawings, there will be described in detail the embodiments of the present invention.

EMBODIMENT 1

Figure 5:
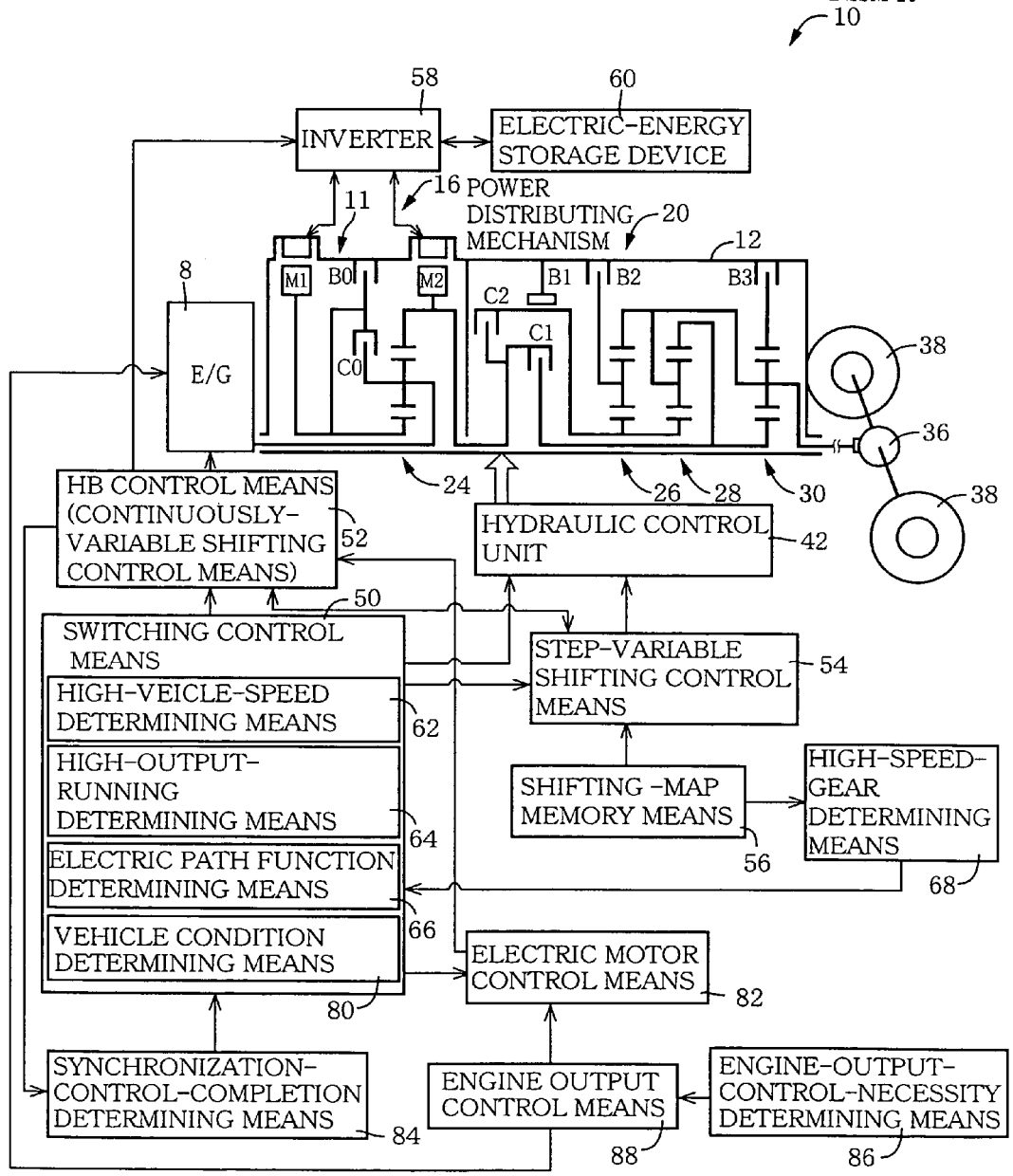
[FIG. 5] This figure is a functional block diagram illustrating major control functions performed by the electronic control device of FIG. 4.

FIG. 1 is a schematic view explaining a switchable type transmission mechanism 10 (hereinafter referred to as "transmission mechanism 10") provided as a drive system for a hybrid vehicle, which is controlled by a control device according to one embodiment of this invention. As shown in FIG. 1, the transmission mechanism 10 includes: an input rotary member in the form of an input shaft 14 disposed on a common axis in a transmission casing 12 functioning as a stationary member attached to a body of the vehicle; a differential portion in the form of a switchable type transmission portion 11 connected to the input shaft 14 either directly, or indirectly via a pulsation absorbing damper (vibration damping device) not shown; an automatic transmission portion 20 functioning as a step-variable automatic transmission interposed between and connected in series via a power transmitting member 18 (power transmitting shaft) to the switchable type transmission portion 11 and drive wheels 38 (shown in FIG. 5) of the vehicle; and an output rotary member in the form of an output shaft 22 connected to the automatic transmission portion 20. The input shaft 12, switchable type transmission portion 11, automatic transmission portion 20 and output shaft 22 are connected in series with each other. This transmission mechanism 10 is suitably used for a transverse FR vehicle (front-engine, rear-drive vehicle), and is disposed between a drive power source in the form of an engine 8 and the pair of drive wheels 38, to transmit a vehicle drive force from the engine 8 to the pair of drive wheels 38 through a differential gear device 36 (final speed reduction gear) and a pair of drive axles, as shown in FIG. 5. It is noted that a lower half of the transmission mechanism 10, which is constructed symmetrically with respect to its axis, is omitted in FIG. 1. This is also true in the other embodiments described below.

The switchable type transmission portion 11 includes: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 the output shaft of which is rotated with the power transmitting member 18. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio ρ1 of about 0.418, for example, a switching clutch C0 and a switching brake B1. The first planetary gear set 24 has rotary elements consisting of: a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio ρ1 is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the transmission casing 12, and the switching clutch C0 is disposed between the first sun gear S1 and the first carrier CA1. When the switching clutch C0 and brake B0 are both released, the power distributing mechanism 16 is placed in a differential state in which the first sun gear S1, first carrier CA1 and first ring gear R1 which are the three rotary elements (three elements) of the first planetary gear set 24 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the switchable type transmission portion 11 is placed in a continuously-variable shifting state (electrically established CVT state) in which the transmission portion 11 functions as an electrically controlled differential device and in which the rotating speed of the power transmitting member 18 is continuously variable, irrespective of the rotating speed of the engine 8. Namely, when the power distributing mechanism 16 is placed in the differential state, the switchable type transmission portion 11 is also placed in the differential state, that is, in the continuously-variable shifting state in which the transmission portion 11 functions as an electrically controlled continuously variable transmission the speed ratio γ0 of which (rotating speed of the input shaft 14/rotating speed of the power transmitting member 18) is continuously changed from a minimum value γ0min to a maximum value γ0max When the switching clutch C0 or brake B0 is engaged during running of the vehicle with an output of the engine while the switchable type transmission portion 11 is placed in the continuously-variable shifting state, the power distributing mechanism 16 is brought into non-differential state or a locked state in which the differential function is not available. Described in detail, when the switching clutch C0 is engaged, the first sun gear S1 and the first carrier CA1 are connected together, so that the power distributing mechanism 16 is placed in the locked state or non-differential state in which the three rotary elements of the first planetary gear set 24 consisting of the first sun gear S1, first carrier CA1 and first ring gear R1 are rotatable as a unit, so that the switchable type transmission portion 11 is also placed in a non-differential state. In this non-differential state, the rotating speed of the engine 8 and the rotating speed of the power transmitting member 18 are made equal to each other, so that the switchable type transmission portion 11 is placed in a fixed-speed-ratio shifting state or step-variable shifting state in which the transmission portion 11 functions as a transmission having a fixed speed ratio γ0 equal to 1. When the switching brake B0 is engaged in place of the switching clutch C0, the first sun gear S1 is fixed to the transmission casing 12, so that the power distributing mechanism 16 is placed in the locked or non-differential state in which the first sun gear S1 is not rotatable, and the switchable type transmission portion 11 is also placed in the non-differential state. Since the rotating speed of the first ring gear R1 is made higher than that of the first carrier CA1, the power distributing mechanism 16 functions as a speed-increasing mechanism, and the switchable type transmission portion 11 is placed in the fixed-speed-ratio shifting state or step-variable shifting state in which the transmission portion 11 functions as a speed-increasing transmission having a fixed speed ratio γ0 smaller than 1, for example, about 0.7.

Thus, the switching clutch C0 and the switching brake B0 function as coupling devices serving as a differential-state switching device operable to selectively place the power distributing mechanism 16 selectively in the differential state (non-locked state) and the locked state (non-differential state). Namely, the switching clutch C0 and the switching brake B0 function as coupling devices operable to selectively switch the switchable type transmission portion 11 between the differential state (non-locked state) in which the transmission portion 11 is operable as an electrically controlled differential device having a differential function, and the locked state (non-differential state) in which the differential function is not available. For example, the coupling devices in the form of the switching clutch C0 and brake B0 are arranged to selectively switch the switchable transmission portion 11 between the differential state in which the transmission portion 11 is operable as a continuously variable transmission the speed ratio of which is continuously variable, and the locked state in which the transmission portion 11 is not operable as the electrically controlled continuously variable transmission and the speed ratio is held constant at a fixed value. In other words, the switching clutch C0 and brake B0 are arranged to selectively switch the transmission portion 11 between the continuously-variable shifting state in which the speed ratio is electrically continuously variable, and the fixed-speed-ratio shifting state in which the transmission portion 11 is operable as a transmission having a single gear position with one speed ratio or a plurality of gear positions with respective speed ratios.

The automatic transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio ρ2 of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the transmission casing 12 through a first brake B1. The second carrier CA2 is selectively fixed to the transmission casing 12 through a second brake B2, and the fourth ring gear R4 is selectively fixed to the transmission casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, one of a first gear position (first speed position) through a fifth gear position (fifth speed position), a reverse gear position (rear drive position) and a neural position is selectively established by engaging actions of a corresponding combination of the frictional coupling devices selected from the above-described switching clutch C0, first clutch C1, second clutch C2, switching brake B0, first brake B1, second brake B2 and third brake B3, as indicated in the table of FIG. 2. Those positions have respective speed ratios γ (input shaft speed $N_{IN}$/output shaft speed $N_{OUT}$) which change as geometric series. In particular, it is noted that the power distributing mechanism 16 is provided with the switching clutch C0 and brake B0 so that the switchable transmission portion 11 can be selectively placed by engagement of the switching clutch C0 or switching brake B0, in the fixed-speed-ratio shifting state in which the mechanism 16 is operable as a transmission the speed ratio of which is held constant, as well as in the continuously-variable shifting state in which the mechanism 16 is operable as a continuously variable transmission, as described above. In the present transmission mechanism 10, therefore, a step-variable transmission is constituted by the automatic transmission portion 20, and the continuously-variable transmission portion 11 which is placed in the fixed-speed-ratio shifting state by engagement of the switching clutch C0 or switching brake B0. Further, a continuously variable transmission is constituted by the automatic transmission portion 20, and the continuously-variable transmission portion 11 which is placed in the continuously-variable shifting state, with none of the switching clutch C0 and brake B0 being engaged. In other words, the transmission mechanism 10 is switched to the step-variable shifting state by engaging one of the switching clutch C0 and switching brake B0, and switched to the continuously-variable shifting state by releasing both of the switching clutch C0 and brake B0. The switchable transmission portion 11 is also considered to be a transmission switchable between the step-variable shifting state and the continuously-variable shifting state.

Where the transmission mechanism 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0.

Where the transmission mechanism 10 functions as the continuously-variable transmission, on the other hand, the switching clutch C0 and the switching brake B0 indicated in FIG. 2 are both released, so that the continuously-variable transmission portion 11 functions as the continuously variable transmission, while the automatic transmission portion 20 connected in series to the switchable transmission portion 11 functions as the step-variable transmission, whereby the speed of the rotary motion transmitted to the automatic transmission portion 20 placed in one of the first through fourth gear positions, namely, the rotating speed of the power transmitting member 18 is continuously changed, so that the speed ratio of the drive system when the automatic transmission portion 20 is placed in one of those gear positions is continuously variable over a predetermined range. Accordingly, the speed ratio of the automatic transmission portion 20 is continuously variable across the adjacent gear positions, whereby the overall speed ratio γT of the transmission mechanism 10 is continuously variable.

Figure 3:
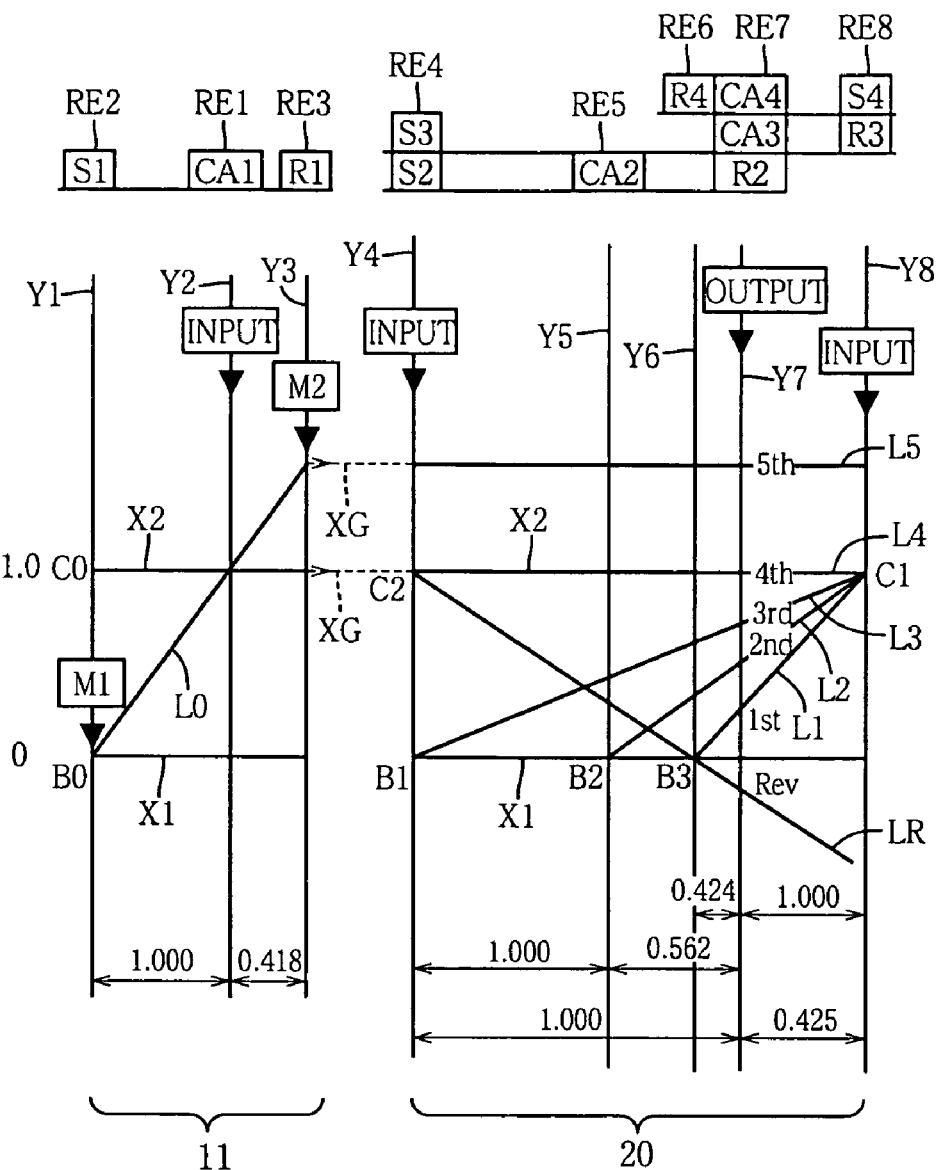
[FIG. 3] This figure is a collinear chart showing relative rotating speeds of rotary elements of the hybrid vehicle drive system of the embodiment of FIG. 1 operated in the step-variable shifting state, in different gear positions of the drive system.

The collinear chart of FIG. 3 indicates, by straight lines, a relationship among the rotating speeds of the rotary elements in each of the gear positions of the transmission mechanism 10, which is constituted by the switchable transmission portion 11 functioning as the continuously-variable shifting portion or first shifting portion, and the automatic transmission portion 20 functioning as the step-variable shifting portion or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines X1, X2, XG, that is, the horizontal line X1 indicates the rotating speed of 0, while an upper one of the three horizontal lines, that is, the horizontal line X2 indicates the rotating speed of 1.0, that is, an operating speed NE of the engine 8 connected to the input shaft 14. The horizontal line XG indicates the rotating speed of the power transmitting member 18. Three vertical lines Y1, Y2 and Y3 corresponding to the power distributing mechanism 16 of the switchable transmission portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the automatic transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines Y4-Y8 are determined by the gear ratios ρ2, ρ3 and ρ4 of the second, third and fourth planetary gear sets 26, 28, 30. That is, the distances between the sun gear and carrier of each of the second, third and fourth planetary gear sets 26, 28, 30 corresponds to "1", while the distances between the carrier and ring gear of each of those planetary gear sets 26 28, 30 corresponds to the gear ratio ρ.

Referring to the collinear chart of FIG. 3, the power distributing mechanism 16 of the transmission mechanism 10 is arranged such that the first carrier CA1 which is one of the three rotary elements of the first planetary gear set 24 is integrally fixed to the input shaft 14 and selectively connected to another rotary element in the form of the first sun gear S1 through the switching clutch C0, and this rotary element in the form of the first sun gear S1 is fixed to the first electric motor M1 and selectively fixed to the transmission casing 12 through the switching brake B0, while the third rotary element in the form of the first ring gear R1 is fixed to the power transmitting member 18 and the second electric motor M2, so that a rotary motion of the input shaft 14 is transmitted to the automatic transmission 20 (step-variable transmission portion) through the power transmitting member 18. A relationship between the rotating speeds of the first sun gear S1 and the first ring gear R1 is represented by an inclined straight line L0 which passes a point of intersection between the lines Y2 and X2. When the power distributing mechanism 16 is brought into the continuously-variable shifting state by releasing actions of the switching clutch C0 and brake B0, for instance, the rotating speed of the first sun gear S1 represented by a point of intersection between the line L0 and the vertical line Y1 is raised or lowered by controlling the reaction force generated by an operation of the first electric motor M1 to generate an electric energy, so that the rotating speed of the first ring gear R1 represented by a point of intersection between the line L0 and the vertical line Y3 is lowered or raised. When the switching clutch C0 is engaged, the first sun gear S1 and the first carrier CA1 are connected to each other, and the power distributing mechanism 16 is placed in the non-differential state in which the above-indicated three rotary elements are rotated as a unit, so that the line L0 is aligned with the horizontal line X2, so that the power transmitting member 18 is rotated at a speed equal to the engine speed NE. When the switching brake B0 is engaged, on the other hand, the rotation of the first sun gear S1 is stopped, and the power distributing mechanism 16 is placed in the non-differential state and functions as the speed-increasing mechanism, so that the line L0 is inclined in the state indicated in FIG. 3, whereby the rotating speed of the first ring gear R1, that is, the rotation of the power transmitting member 18 represented by a point of intersection between the lines L0 and Y3 is made higher than the engine speed NE and transmitted to the automatic transmission portion 20.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of: the sixth rotary element RE6 and the horizontal line X1, as shown in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed NE, with the drive force received from the power distributing mechanism 16. When the switching brake B0 is engaged in place of the switching clutch C0, the eighth rotary element RE8 is rotated at a speed higher than the engine speed NE, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
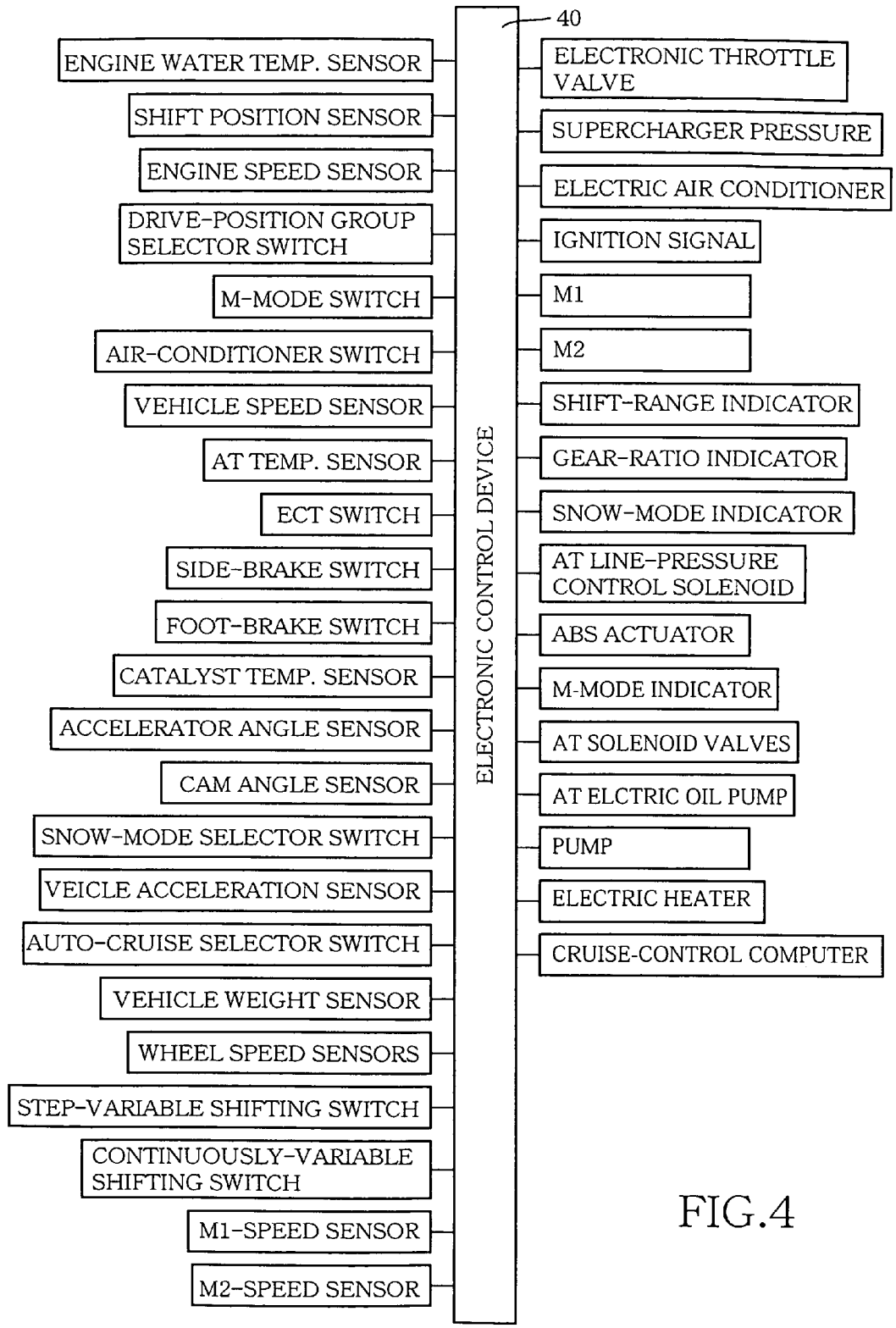
[FIG. 4] This figure is a view indicating input and output signals of an electronic control device provided to control the drive system of the embodiment of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the automatic transmission portion 20.

The electronic control device 40 is arranged to receive, from various sensors and switches shown in FIG. 4, various signals such as: a signal indicative of a temperature of cooling water of the engine; an output signal indicative of a presently selected operating position of a shift lever; a signal indicative of the operating speed $N_E$ of the engine 8; a signal indicative of a value indicating a selected group of forward-drive positions of the transmission mechanism 10; a signal indicative of an M mode (motor drive mode); a signal indicative of an operated state of an air conditioner; a signal indicative of a vehicle speed corresponding to the rotating speed of the output shaft 22; a signal indicative of a temperature of a working oil of the automatic transmission portion 20; a signal indicative of an operated state of a side brake; a signal indicative of an operated state of a foot brake; a signal indicative of a temperature of a catalyst; a signal indicative of an angle of operation of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the transmission mechanism 10 in the fixed-speed-ratio shifting state in which the transmission mechanism 10 functions as a step-variable transmission; a signal indicative of a continuously-variable shifting switch provided to place the transmission mechanism 50 in the continuously variable-shifting state in which the transmission mechanism 10 functions as the continuously variable transmission; a signal indicative of a rotating speed NM1 of the first electric motor M1; and a signal indicative of a rotating speed $N_{M2}$ of the second electric motor M2. The electronic control device 40 is further arranged to generate various signals such as: a signal to drive a throttle actuator for controlling an angle of opening of a throttle valve; a signal to adjust a pressure of a supercharger; a signal to operate the electric air conditioner; a signal to control an ignition device for controlling a timing of ignition of the engine 8; signals to operate the electric motors M1 and M2; a signal to operate a shift-range indicator for indicating the selected operating position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 provided to control the hydraulic actuators of the hydraulically operated frictional coupling devices of the power distributing mechanism 16 and the automatic transmission portion 20; a signal to operate an electric oil pump used as a hydraulic pressure source for the hydraulic control unit 42; a signal to drive an electric heater; and a signal to be applied to a cruise-control computer.

Figure 6:
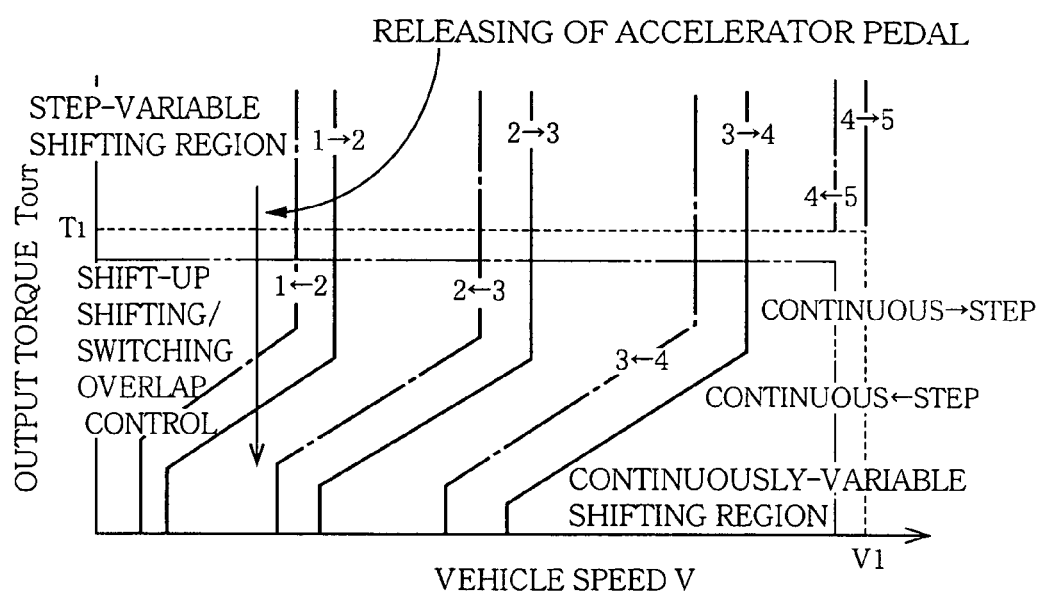
[FIG. 6] This figure is a view illustrating a switching operation performed by switching control means of the electronic control device in the embodiment of FIG. 5.

FIG. 5 is a functional block diagram for explaining major control functions performed by the electronic control device 40. As shown in FIG. 5, switching control means 50 includes high-speed-running determining means 62, high-output-running determining means 64, and electric-path-function diagnosing means 66, and is arranged to switch the switchable transmission portion 11, that is, the power distributing mechanism 16 between the differential state and the locked state, on the basis of the condition of the vehicle. Namely, the switching control means 50 is arranged to switch the transmission mechanism 10 between the continuously-variable shifting state and the step-variable shifting state, on the basis of the condition of the vehicle. Hybrid control means 52 is arranged to control the engine 8 to be operated with high efficiency, and control the first electric motor M1 and/or the second electric motor M2, so as to optimize a proportion of drive forces generated by the engine 8 and the second electric motor M2, for thereby controlling the speed ratio γ0 of the switchable transmission portion 11 operating as the electrically controlled continuously variable transmission, while the transmission mechanism 10 is placed in the continuously-variable shifting state, that is, while the switchable transmission portion 11 is placed in the differential state. Step-variable shifting control means 54 is arranged to determine whether a shifting action of the automatic transmission portion 20 should take place, on the basis of the vehicle condition represented by the vehicle speed V and an output $T_{OUT}$ of the automatic transmission portion 20, and according to a shifting boundary line map which is stored in shifting-map memory means 56 and which is indicated in FIG. 6. The step-variable shifting control means 54 commands the automatic transmission portion 20 to be automatically shifted according to the above-indicated determination.

The high-speed-running determining means 62 indicated above is arranged to determine whether the actual vehicle speed V has reached a predetermined speed value V1, which is an upper limit value above which it is determined that the vehicle is in a high-speed running state. The high-output-running determining means 64 indicated above is arranged to determine whether a drive-force-related value such as the output torque $T_{OUT}$ of the automatic transmission 20, relating to the drive force of the hybrid vehicle, has reached a predetermined output torque value T1, which is an upper limit value above which it is determined that the vehicle is in a high-output running state. The electric-path-function diagnosing means 66 indicated above is arranged to determine whether the components of the transmission mechanism 10 that are operable to establish the continuously-variable shifting state have a deteriorated function. This determination by the diagnosing means 66 is based on the functional deterioration of the components associated with the electric path through which an electric energy generated by the first electric motor M1 is converted into a mechanical energy. For example, the determination is made on the basis of a failure, or a functional deterioration or defect due to a failure or low temperature, of any one of the first electric motor M1, second electric motor M2, inverter 58, electric-energy storage device 60 and electric conductors connecting those components.

The drive-force-related value indicated above is a parameter corresponding to the drive force of the vehicle, which may be the output torque $T_{OUT}$ of the automatic transmission portion 20, an output torque $T_E$ of the engine 8 or an acceleration value of the vehicle, as well as a drive torque or drive force of drive wheels 38. The engine torque Te may be an actual value calculated on the basis of the operating amount of the accelerator pedal or the opening angle of the throttle valve (or intake air quantity, air/fuel ratio or amount of fuel injection) and the engine speed NE, or an estimated value of the engine torque Te or required vehicle drive force which is calculated on the basis of the operating amount of the accelerator pedal by the vehicle operator or the operating angle of the throttle valve. The vehicle drive torque may be calculated on the basis of not only the output torque $T_{OUT}$, etc., but also the ratio of the differential gear device 36 and the radius of the drive wheels 38, or may be directly detected by a torque sensor or the like. Namely, the high-output-running determining means 64 detects the high-output running state of the vehicle, on the basis of the drive-force-related parameters directly or indirectly indicating the vehicle drive force.

The high-speed-gear determining means 68 is arranged to determine whether the gear position to which the transmission mechanism 10 should be shifted on the detected condition of the vehicle and according to the shifting boundary line map stored in the shifting-map memory means 56 and indicated in FIG. 6 is a high-speed-gear position, for example, the fifth gear position. This determination is made to determine which one of the switching clutch C0 and brake B0 should be engaged to place the transmission mechanism 10 in the step-variable shifting state. While the transmission mechanism 10 as a whole is placed in the step-variable shifting state, the switching clutch C0 is engaged to place the transmission mechanism 10 in any of the first-gear position through the fourth-gear position, while the switching brake B0 is engaged to place the transmission mechanism 10 in the fifth-gear position.

The switching control means 50 determines that the vehicle condition is in the step-variable shifting region, in any one of the following predetermined conditions or cases: where the high-speed-running determining means 62 has determined that the vehicle is in the high-speed running state; where the high-output-running determining means 64 has determined that the vehicle is in the high-output running state; and where the electric-path-function diagnosing means 66 has determined that the electric path function is deteriorated. In this case, the switching control means 50 disables the hybrid control means 52 to operate, that is, inhibits the hybrid control means 52 from effecting the hybrid control or continuously-variable shifting control, and commands the step-variable shifting control means 54 to perform predetermined step-variable shifting control operations, for example, an operation to command the automatic transmission 20 to be automatically shifted to the gear position selected according to the shifting boundary line map stored in the shifting-map memory means 56 and indicated in FIG. 6. The table of FIG. 2 indicates the combinations of the operating states of the hydraulically operated frictional coupling devices, namely, C0, C1, C2, B0, B1, B2 and B3, which correspond to the respective gear positions. In this case, therefore, the transmission mechanism 10 as a whole consisting of the switchable transmission portion 11 and the automatic transmission 20 functions as the so-called step-variable automatic transmission, and performs the automatic shifting actions as indicated in the table of FIG. 2.

Where the high-speed-gear determining means 68 determines that the selected speed is the fifth-gear position, while the high-speed-running determines means 62 determines that the vehicle is in the high-speed running state or while the high-output-running determining means 64 determines that the vehicle is in the high-output running state, the switching control means 50 commands the hydraulic control unit 42 to release the switching clutch C0 and engage the switching brake B0 to enable the switchable transmission portion 11 to function as an auxiliary transmission having a fixed speed ratio γ0 of 0.7, for example, so that the transmission mechanism 10 as a whole is placed in the high-speed gear position, so-called "overdrive gear position" having a speed ratio lower than 1.0. Where the high-output-running determining means 64 determines that the vehicle is in the high-output running state, and where the high-speed-gear determining means 68 does not determine that the selected gear position is the fifth-gear position, the switching control means 50 commands the hydraulic control unit 42 to engage the switching clutch C0 and release the switching brake B0 to enable the switchable transmission portion 11 to function as an auxiliary transmission having a fixed speed ratio γ0 of 1, for example, so that the transmission mechanism 10 as a whole is placed in a low-gear position having a speed ratio not lower than 1.0. Thus, the switching control means 50 places the transmission mechanism 10 in the step-variable shifting state in any one of the predetermined conditions described above, and selectively places the switchable transmission portion 11 functioning as the auxiliary transmission in the high-gear or low-gear position, while the automatic transmission portion 20 connected in series to the switchable transmission portion 11 is enabled to function as the step-variable transmission, so that the transmission mechanism 10 as a whole functions as the so-called step-variable automatic transmission.

Figure 8:
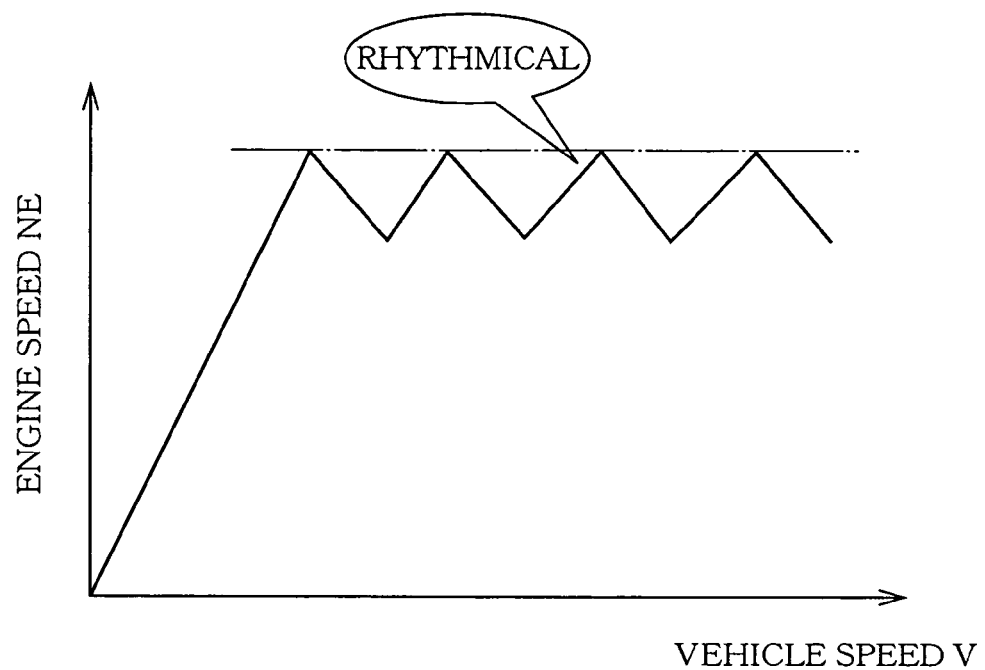
[FIG. 8] This figure is a view indicating an example of a change of the engine speed as a result of a shift-up action of the step-variable transmission.

For instance, the upper vehicle-speed limit V1 of the vehicle speed is determined so that the transmission mechanism 10 is placed in the step-variable shifting state while the vehicle speed V is higher than the limit V1. This determination is effective to minimize a possibility of deterioration of the fuel economy of the vehicle if the transmission mechanism 10 were placed in the continuously-variable shifting state at a relatively high running speed of the vehicle. The upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle. Alternatively, when the vehicle is in the high-output running state, the transmission mechanism 10 is placed in the step-variable shifting state (fixed-speed-ratio shifting state) rather than the continuously-variable shifting state, so that the engine speed NE changes with a shift-up action of the automatic transmission portion 20, assuring a comfortable rhythmic change of the engine speed NE as the automatic transmission portion 20 is shifted up, as indicated in FIG. 8. In this respect, it is noted that when the engine is in the high-output running state, it is more important to satisfy a vehicle operator's desire to improve the drivability of the vehicle, than a vehicle operator's desire to improve the fuel economy.

However, the switching control means 50 commands the hydraulic control unit 42 to release both of the switching clutch C0 and brake B0 to place the switchable transmission portion 11 in the continuously-variable shifting state, while the transmission mechanism 10 as a whole is normally operable in its continuously-variable shifting state, that is, when the high-speed-running determining means 62 does not determine that the vehicle is in the high-speed running state, when the high-output-running determining means 64 does not determine that the vehicle is in the high-output running state, and when the electric-path-function diagnosing means 66 does not determine that the electric path function is deteriorated. In this case, the switching control means 50 enables the hybrid control means 52 to effect the hybrid control, and commands the step-variable shifting control means 54 to hold the automatic transmission portion 20 in the predetermined gear position selected for the continuously-variable shifting control, or to permit the automatic transmission portion 20 to be automatically shifted to the gear position selected according to the shifting boundary line map stored in the shifting-map memory means 56 and indicated in FIG. 6. In this case, the automatic transmission portion 20 is automatically shifted under the control of the step-variable shifting control means 50, according to the appropriate one of the combinations of the engaged states of the frictional coupling devices indicated in the table of FIG. 2, except the combination of the engaged states of the switching clutch C0 and brake B0. Thus, in the predetermined condition of the vehicle, the switching control means 50 enables the switchable transmission portion 11 to operate in the continuously-variable shifting state, functioning as the continuously variable transmission, while the automatic transmission portion 20 connected in series to the switchable transmission portion 11 functions as the step-variable transmission, so that the drive system provides a sufficient vehicle drive force, such that the speed of the rotary motion transmitted to the automatic transmission portion 20 placed in one of the first-speed, second-speed, third-speed and fourth-gear positions, namely, the rotating speed of the power transmitting member 18 is continuously changed, so that the speed ratio of the drive system when the automatic transmission portion 20 is placed in one of those gear positions is continuously variable over a predetermined range. Accordingly, the speed ratio of the automatic transmission portion 20 is continuously variable across the adjacent gear positions, whereby the overall speed ratio γT of the transmission mechanism 10 is continuously variable.

The hybrid control means 52 controls the engine 8 to be operated with high efficiency, and control the first electric motor M1 and/or second electric motor M2, so as to optimize the proportion of the drive forces generated by the engine 8 and the first electric motor M1 and/or second electric motor M2. For instance, the hybrid control means 52 calculates the output as required by the vehicle operator at the present running speed of the vehicle, on the basis of the operating amount of the accelerator pedal and the vehicle running speed, and calculate a required vehicle drive force on the basis of the calculated required output and a required amount of generation of an electric energy by the electric motor. On the basis of the calculated required vehicle drive force, the hybrid control means 52 calculates desired speed NE and total output of the engine 8, and controls the actual output of the engine 8 and the amount of generation of the electric energy by the electric motor, according to the calculated desired speed $N_E$ and total output of the engine 8. The hybrid control means 52 is arranged to effect the above-described hybrid control while taking account of the presently selected gear position of the automatic transmission portion 20, so as to improve the drivability of the vehicle and the fuel economy of the engine 8. In the hybrid control, the switchable transmission portion 11 is controlled to function as the electrically controlled continuously-variable transmission, for optimum coordination of the engine speed NE and vehicle speed V for efficient operation of the engine 8, and the rotating speed of the power transmitting member 18 determined by the selected gear position of the automatic transmission portion 20. That is, the hybrid control means 52 determines a target value of the overall speed ratio γT of the transmission mechanism 10, so that the engine 8 is operated according to a stored highest-fuel-economy curve. The stored highest-fuel-economy curve satisfies both of the desired operating efficiency and the highest fuel economy of the engine 8. The hybrid control means 52 controls the speed ratio γ0 of the switchable transmission portion 11, so as to obtain the target value of the overall speed ratio γT, so that the overall speed ratio γT can be controlled within a predetermined range, for example, between 13 and 0.5.

In the hybrid control, the hybrid control means 52 controls an inverter 58 such that the electric energy generated by the first electric motor M1 is supplied to the electric-energy storage device 60 and the second electric motor M2 through the inverter 58, so that a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2 or the first electric motor M1, so that the second electric motor M2 or first electric motor M1 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy. This electric path includes components associated with the generation of the electric energy and the consumption of the generated electric energy by the second electric motor M2.

It is also noted that the hybrid control means 52 is capable of establishing a so-called "motor starting and drive" mode in which the vehicle is started and driven by only the electric motor (e.g., second electric motor M2) used as the drive power source, by utilizing the electric CVT function (differential function) of the switchable transmission portion 11, irrespective of whether the engine 8 is in the non-operated state or in the idling state. The motor-starting and drive mode is generally selected when the output torque $T_{OUT}$ is in a comparatively low range in which the engine efficiency is comparatively low, or when the engine is in a low load range in which the vehicle speed V is comparatively low.

FIG. 6 shows an example of the shifting boundary line map (relationship) which is stored in the shifting-map memory means 56 and which is used for determining whether the automatic transmission portion 20 should be shifted. This shifting boundary line map is defined in a rectangular two-dimensional coordinate system having two axes corresponding to respective parameters, namely, the vehicle speed V and a drive-force-related value in the form of the output torque $T_{OUT}$ of the automatic transmission portion 20. In FIG. 6, solid lines are shift-up boundary lines, and one-dot chain lines are shift-down boundary lines. Broken lines in FIG. 6 are boundary lines defining a step-variable shifting region and a continuously-variable shifting region which are used by the switching control means 50. These boundary lines represent the upper vehicle-speed limit V1 and the upper output-torque limit T1, and respectively serve as a high-speed-running boundary line for determining whether the vehicle condition is in a high-speed running state, and a high-output-running boundary line for determining whether the vehicle condition is in a high-output running state. FIG. 6 also shows two-dot chain lines which are boundary line offset with respect to the broken lines, by a suitable amount of control hysteresis, so that the broken lines and the two-dot chain lines are selectively used as the boundary lines. Thus, FIG. 6 also shows a stored switching boundary line map (relationship) used by the switching control means 50 to determine whether the vehicle is in the step-variable shifting state or the continuously-variable shifting state, depending upon whether the vehicle speed V and the output torque $T_{OUT}$ are higher than the predetermined upper limit values V1, T1. Therefore, the vehicle condition may be determined according to this switching boundary line map and on the basis of the actual values of the vehicle speed V and output torque $T_{OUT}$. This switching boundary line map as well as the shifting boundary line map may be stored in the shifting-map memory means 56. The switching boundary line map may include at least one of the boundary lines representative of the upper vehicle-speed limit V1 and the upper output-torque limit T1, and may use only one of the two parameters V and $T_{OUT}$. The shifting boundary line map and the switching boundary line may be replaced by stored equations for comparison of the actual vehicle speed V with the limit value V1 and comparison of the actual output torque $T_{OUT}$ with the limit value T1.

Figure 7:
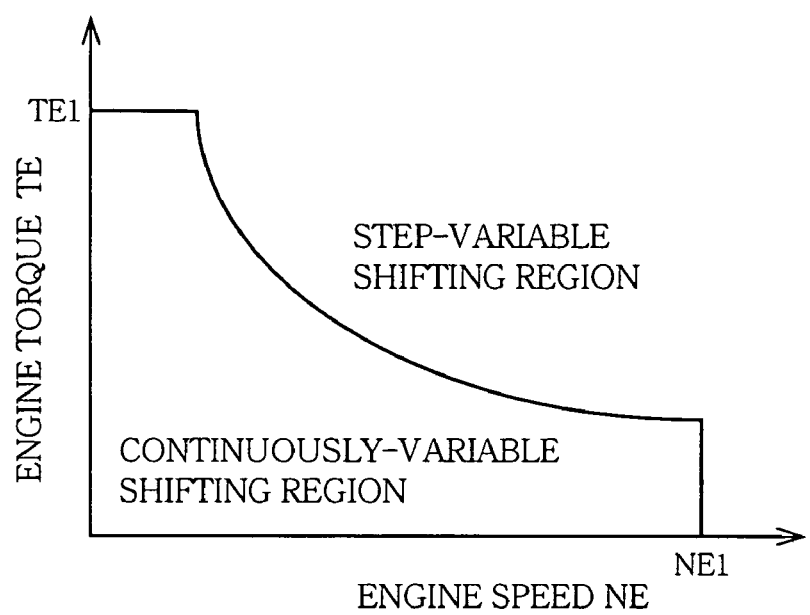
[FIG. 7] This figure is a view indicating a stored map representing boundary lines defining a continuously-variable shifting region and a step-variable shifting region, which is used for mapping boundary lines which are indicated by broke lines in FIG. 6 and which define the continuously-variable shifting region and the step-variable shifting region.

The switching boundary lines indicated by the broken lines in FIG. 6, which are superimposed on the shifting boundary line map for the automatic transmission portion 20, are based on a stored shifting-region switching map (relationship) indicated in FIG. 7, which represents boundary lines defining the step-variable shifting region and continuously-variable shifting region in a two-dimensional coordinate system having two axes corresponding to respective parameters in the form of the engine speed NE and the engine torque Te. In other words, the switching boundary line map of FIG. 6 is obtained on the basis of the shifting-region switching map of FIG. 7. The switching control means 50 may use the shifting-region switching map of FIG. 7 in place of the switching boundary line map of FIG. 6, to determine whether the detected vehicle condition is in the continuously-variable or step-variable shifting region.

The step-variable shifting region defined by the switching boundary line map of FIG. 6 is defined as a high-torque region in which the output torque $T_{OUT}$ is not lower than the predetermined upper limit $T_1$, or a high-speed region in which the vehicle speed V is not lower than the predetermined upper limit $V_1$. Accordingly, the step-variable shifting control is effected when the torque $T_E$ of the engine 8 is comparatively high or when the vehicle speed V is comparatively high, while the continuously-variable shifting control is effected when the torque $T_E$ of the engine 8 is comparatively low or when the vehicle speed V is comparatively low, that is, when the engine 8 is in a normal output state. Similarly, the step-variable shifting region defined by the shifting-region switching map of FIG. 7 is defined as a high-torque region in which the engine torque Te is not lower than the predetermined upper limit $T_{E1}$, or a high-speed region in which the engine speed NE is not lower than the predetermined upper limit $N_{E1}$, or alternatively defined as a high-output region in which the output of the engine 8 calculated on the basis of the engine torque $T_E$ and speed $N_E$ is not lower than a predetermined limit. Accordingly, the step-variable shifting control is effected when the torque $T_E$, speed $N_E$ or output of the engine 8 is comparatively high, while the continuously-variable shifting control is effected when the torque $T_E$, speed $N_E$ or output of the engine 8 is comparatively low, that is, when the engine 8 is in the normal output state. The boundary lines of the shifting-region switching map of FIG. 7 may be considered as high-speed threshold lines or high-engine-output threshold lines, which define upper limit of the vehicle speed V or engine output above The switching control means 50 further includes vehicle condition determining means 88. This vehicle condition determining means 88 is arranged to determine whether the vehicle condition as represented by the actual vehicle speed V and output torque $T_{OUT}$ or the vehicle condition as represented by the engine speed NE and engine torque Te requires the switching control means 50 to switch the shifting state of the transmission mechanism 10, or requires the step-variable shifting control means 54 to shift the automatic transmission portion 20. This determination is made, for example, on the basis of a change of the vehicle condition and according to the switching boundary line map and shifting boundary line map of FIG. 6. In other words, the vehicle condition determining means 88 can be considered to function as means for determining whether the transmission mechanism 10 should be selectively switched from one of the continuously-variable and step-variable shifting states to the other shifting state. In the present embodiment, the switching control means 50 and the step-variable shifting control means 54 may perform overlapping switching and shifting controls in which the switching control by the switching control means 50 and the shifting control by the step-variable shifting control means 54 substantially overlap each other. The overlapping switching and shifting controls may be initiated substantially concurrently, or at least partially overlap each such that a portion of a process of the switching control and a portion of a process of the shifting control take place substantially concurrently.

Figure 18:
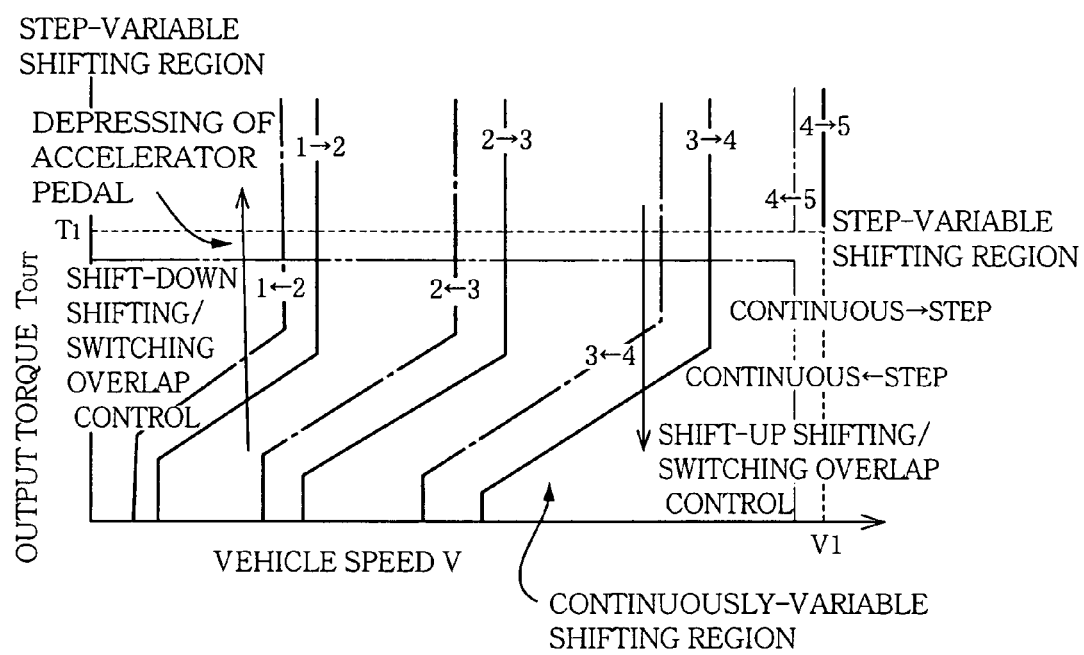
[FIG. 18] This figure is a view for explaining a switching operation which is performed by switching control means of the electronic control device of the embodiment FIG. 5, in place of the switching operation illustrated in FIG. 6.

A downward arrow-headed line in FIG. 6 indicates an example of a shift-up action and a switching operation which take place substantially concurrently, while an upward arrow-headed line in FIG. 18 indicates a shift-down action and a switching operation which take place substantially concurrently. In these examples, the output torque $T_{OUT}$ is a required output torque $T_{OUT}$ as calculated on the basis of an amount of operation of the accelerator pedal by the vehicle operator. Described more specifically, a releasing operation of the accelerator pedal as indicated by the downward arrow-headed line in FIG. 6 is performed while the transmission mechanism 10 is placed in the step-variable shifting state. In this case, a switching operation to switch the transmission mechanism 10 from the step-variable shifting state to the continuously-variable shifting state and a shift-up action of the automatic transmission portion 20 from the first gear position to the second gear position take place substantially concurrently. Namely, it is determined that the transmission mechanism 10 should be switched from the step-variable shifting state to the continuously-variable shifting state, with none of the affirmative determinations or decisions being obtained by the high-speed-running determining means 62, high-output-running determining means 64 and electric-path-function diagnosing means 66, while it is determined substantially concurrently that the automatic transmission portion 20 should be shifted up by the variable-shifting control means 54, from the first gear position to the second gear position, since the vehicle condition has been changed so as to move across the $1^{st}$-to-$2^{nd}$ shift-up boundary line. On the other hand, a depressing operation of the accelerator pedal as indicated by the upward arrow-headed line in FIG. 18 is performed while the transmission mechanism 10 is placed in the continuously-variable shifting state. In this case, a switching operation to switch the transmission mechanism 10 from the continuously-variable shifting state to the step-variable shifting state and a shift-down action of the automatic transmission portion 20 from the second gear position to the first gear position take place substantially concurrently. Namely, it is determined that the transmission mechanism 10 should be switched from the continuously-variable shifting state to the step-variable shifting state, with the affirmative decision being obtained by the high-output-running determining means 64, while it is determined substantially concurrently that the automatic transmission portion 20 should be shifted down by the variable-shifting control means 54, from the second gear position to the first gear position, since the vehicle condition has been changed so as to move across the $2^{nd}$-to-$1^{st}$ shift-down boundary line. In the present embodiment, the switching control by the switching control means 50 and the shift-down control by the step-variable shifting control means 54 which take place substantially concurrently are collectively referred to as "shift-down shifting/switching overlap control", and the switching control by the switching control means 50 and the shift-up control by the step-variable shifting control means 54 which take place substantially concurrently are collectively referred to as "shift-up shifting/switching overlap control".

It will be understood from FIGS. 6 and 18 that a change of the amount of operation of the accelerator pedal, that is, a change of the required output torque $T_{OUT}$ as calculated on the basis of the amount of operation of the accelerator pedal will trigger the switching control for switching the shifting state of the transmission mechanism 10. The vehicle condition determining means 80 determines the vehicle condition, on the basis of the releasing and depressing operations of the accelerator pedal. In this respect, it is noted that the vehicle condition may be determined on the basis of any drive-force-related value other than the operating amount of the accelerator pedal, such as an angle of opening of the throttle valve.

The transmission mechanism 10 is switchable between the continuously-variable shifting state and the step-variable shifting state. Where the step-variable shifting state is established by engaging the switching clutch C0, for example, the first sun gear S1 and the first ring gear R1 of the first planetary gear set 24 are rotated together as a unit at a speed equal to the engine speed NE. In this state, the speed of the first electric motor M1 fixed to the first sun gear S1 and the speed of the second electric motor M2 fixed to the first ring gear R1 are synchronized with the engine speed NE, but the first electric motor M1 does not necessarily produce an output torque. When the transmission mechanism 10 is switched to the continuously-variable shifting state by releasing the switching clutch C0, the reaction torque of the switching clutch C0 in the process of its releasing action is gradually reduced while the reaction torque of the first electric motor M1 is gradually increased. If the timings at which the reaction torques of the switching clutch C0 and first electric motor M1 are reduced and increased are not adequately controlled, the transmission mechanism 11 suffers from a risk of occurrence of a switching shock. In other words, the reaction torque of the coupling device is a torque of the engine transmitted through the coupling device in the process of its releasing action, so that if the engine torque transmitted through the coupling device is not rapidly reduced, the drive system may suffer from a switching shock due to a temporary change of the engine torque transmitted to the drive wheels.

For reducing the risk of occurrence of the switching shock described above, electric motor control means 82 is provided to control the first electric motor M1, so that at least the first electric motor M1 of the first and second electric motors M1, M2 generates a reaction torque, so as to maintain the transmission mechanism 10 in a state substantially identical with the step-variable shifting state as established by the engaging action of the switching clutch C0 or brake B0, namely, so as to maintain the first element RE1, second element RE2 and third element RE3 at the same rotating speed, upon releasing of the switching clutch C0 or brake B0, that is, upon switching of the transmission mechanism 10 from the step-variable shifting state to the continuously-variable shifting state under the control of the switching control means 50. This control of the first electric motor M1 reduces the switching shock upon switching of the transmission mechanism 10 from the step-variable shifting state to the continuously-variable shifting state. After the reaction torque of the first electric motor M1 has been generated under the control of the electric motor control means 82 upon determination that the transmission mechanism 10 should be switched from the step-variable shifting state to the continuously-variable shifting state, the switching control means 50 initiates the releasing action of the switching clutch C0 or brake B0.

Described more specifically, the electric motor control means 82 commands the hybrid control means 52, upon releasing of the switching clutch C0, to control the first electric motor M1 so as to generate a reaction torque equal to the reaction torque that is to be generated by the engaging action of the switching clutch C0. In this state of control of the first electric motor M1, the first sun gear S1 temporarily receives two different kinds of torque. For example, the hybrid control means 52 controls the amount of generation of an electric energy generated by the first electric motor M1, so that the reaction torque generated by the first electric motor M1 maintains the speed NN1 of the first electric motor and the engine speed NE at the same value. In other words, the speed NM1 of the first electric motor is controlled by the electric motor control means 82 upon switching from the step-variable shifting state to the continuously-variable shifting state by the releasing action of the switching clutch C0, such that the speed NM1 is maintained substantially equal to the engine speed NE. That is, the rotating speed of the first sun gear S1 is controlled by controlling the first electric motor M1 under the control of the electric motor control means 82 such that the speed of the first sun gear S1 is held substantially equal to the engine speed NE.

In the step-variable shifting state established by the engaging action of the switching brake B0, the first sun gear S1 is held stationary, that is, the rotating speed of the first sun gear S1 is maintained at zero. In this state, the speed of the first electric motor M1 fixed to the first sun gear S1 is also maintained at zero, but the first electric motor M1 does not necessarily produce a torque. When the transmission mechanism 10 is switched to the continuously-variable shifting state by engaging the switching brake B0, the reaction torque of the switching brake B0 in its engaged state is gradually reduced while the reaction torque of the first electric motor M1 is gradually increased. If the timings at which the reaction torques of the switching brake B0 and the first electric motor M1 are reduced and increased are not adequately controlled, the transmission mechanism 11 suffers from a risk of occurrence of a switching shock upon switching from the step-variable shifting state to the continuously-variable shifting state.

For reducing the risk of occurrence of the switching shock described above, the electric motor control means 82 commands the hybrid control means 52, upon releasing of the switching brake B0, to control the first electric motor M1 so as to generate a reaction torque equal to the reaction torque that is to be generated by the engaging action of the switching brake B0. In this state of control of the first electric motor M1, the first sun gear S1 temporarily receives two different kinds of torque. For example, the hybrid control means 52 controls the first electric motor M1 such that the amount of generation of an electric energy generated by the first electric motor M1 is substantially zero, so that the reaction torque generated by the first electric motor M1 maintains the first sun gear S1 stationary. In other words, the speed NM1 of the first electric motor is controlled by the electric motor control means 82 upon switching from the step-variable shifting state to the continuously-variable shifting state by the releasing action of the switching clutch C0, such that the speed NM1 is maintained substantially zero. That is, the rotating speed of the first sun gear S1 is controlled by controlling the first electric motor M1 under the control of the electric motor control means 82 such that the speed of the first sun gear S1 is held substantially zero.

Synchronization-control-completion determining means 84 is provided to determine whether a predetermined reaction torque equal to the reaction torque that is to be generated by the engaging action of the switching clutch C0 or brake B0 has been generated by the first electric motor M1 under the control of the electric motor control means 82 upon determination that the transmission mechanism 10 should be switched from the step-variable shifting state to the continuously-variable shifting state. For instance, this determination by the synchronization-control-completion determining means 84 is made by determining whether the amount of the electric energy generated by the first electric motor M1 and supplied to the electric-energy storage device 60 corresponds to the above-indicated predetermined reaction torque.

The switching control means 50 described above initiates the releasing action of the switching clutch C0 or brake B0 when the synchronization-control-completion determining means 84 has determined that the predetermined reaction torque of the first electric motor M1 has been generated. Upon initiation of the releasing action, the switching clutch C0 or brake B0 is not required to generate a reaction torque since the predetermined reaction torque has been generated by the first electric motor M1. Therefore, the hydraulic pressure of the switching clutch C0 or brake B0 need not be gradually reduced, but may be rapidly reduced for comparatively rapid switching to the continuously-variable shifting state.

The electric motor control means 82 continues to control the speed NM1 of the first electric motor so as to maintain a speed difference of the first, second and third elements RE1, RE2 and RE3 before initiation of the releasing action of the switching clutch C0, that is, to maintain the first sun gear S1 and the engine speed NE at the same speed, until the releasing action of the switching clutch C0 under the control of the switching control means 50 is completed. After the completion of the releasing action of the switching clutch C0, the reaction torque generated by the first electric motor M1 is controlled by the hybrid control means 52 such that the generated reaction torque corresponds to the actual engine torque Te.

Alternatively, the electric motor control means 82 continues to control the speed NM1 of the first electric motor so as to maintain a speed difference of the above-indicated second element and the above-indicated transmission casing 12 before initiation of the releasing action of the switching brake B0, that is, to maintain the first sun gear S1 stationary with its speed held at zero, until the releasing action of the switching brake B0 under the control of the switching control means 50 is completed.

Figure 9:
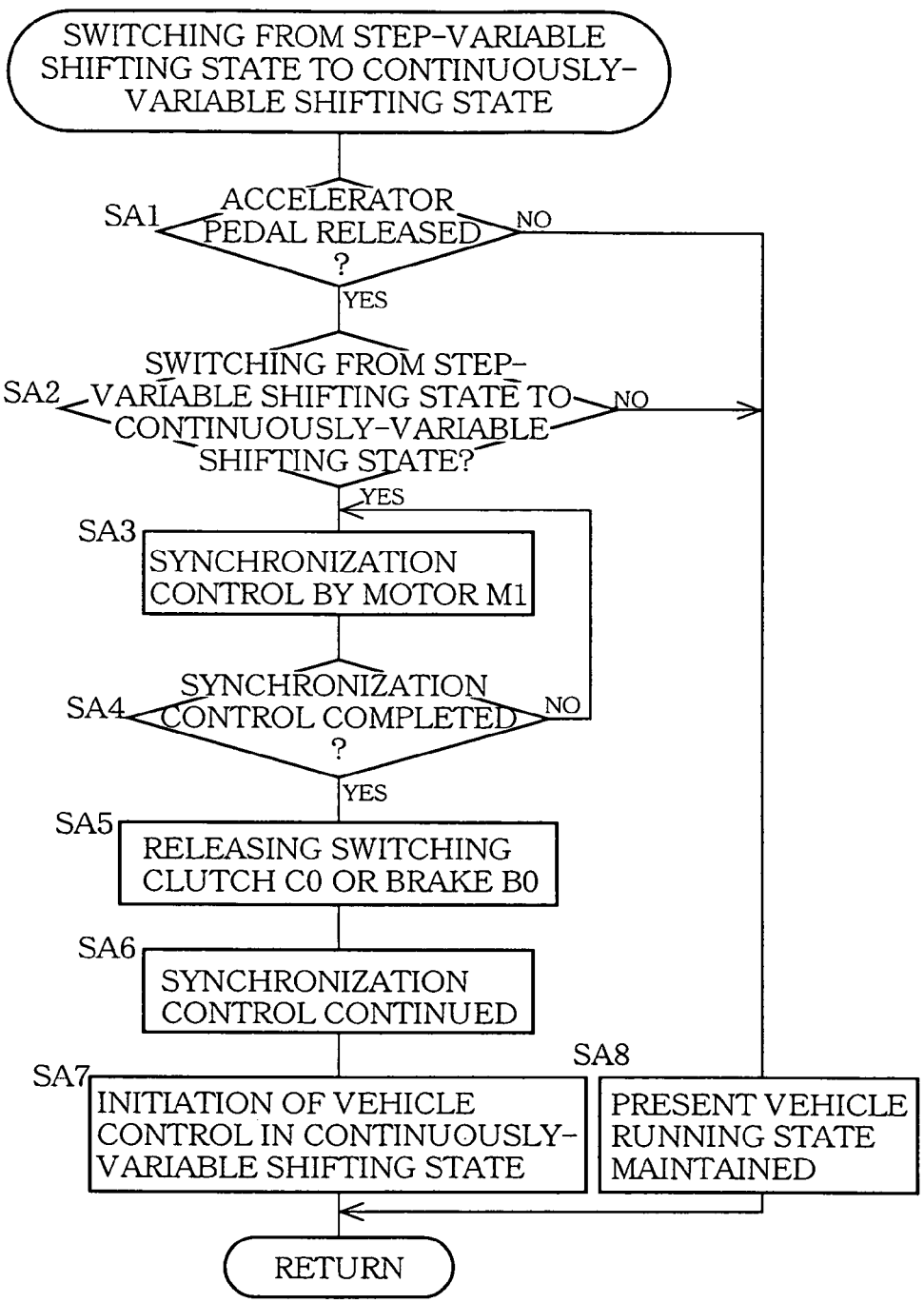
[FIG. 9] This figure is a flow chart illustrating a major control operation performed by the electronic control device of FIG. 4 when the transmission mechanism is switched from the step-variable shifting state to the continuously-variable shifting state, as a result of a releasing action of an accelerator pedal.
Figure 10:
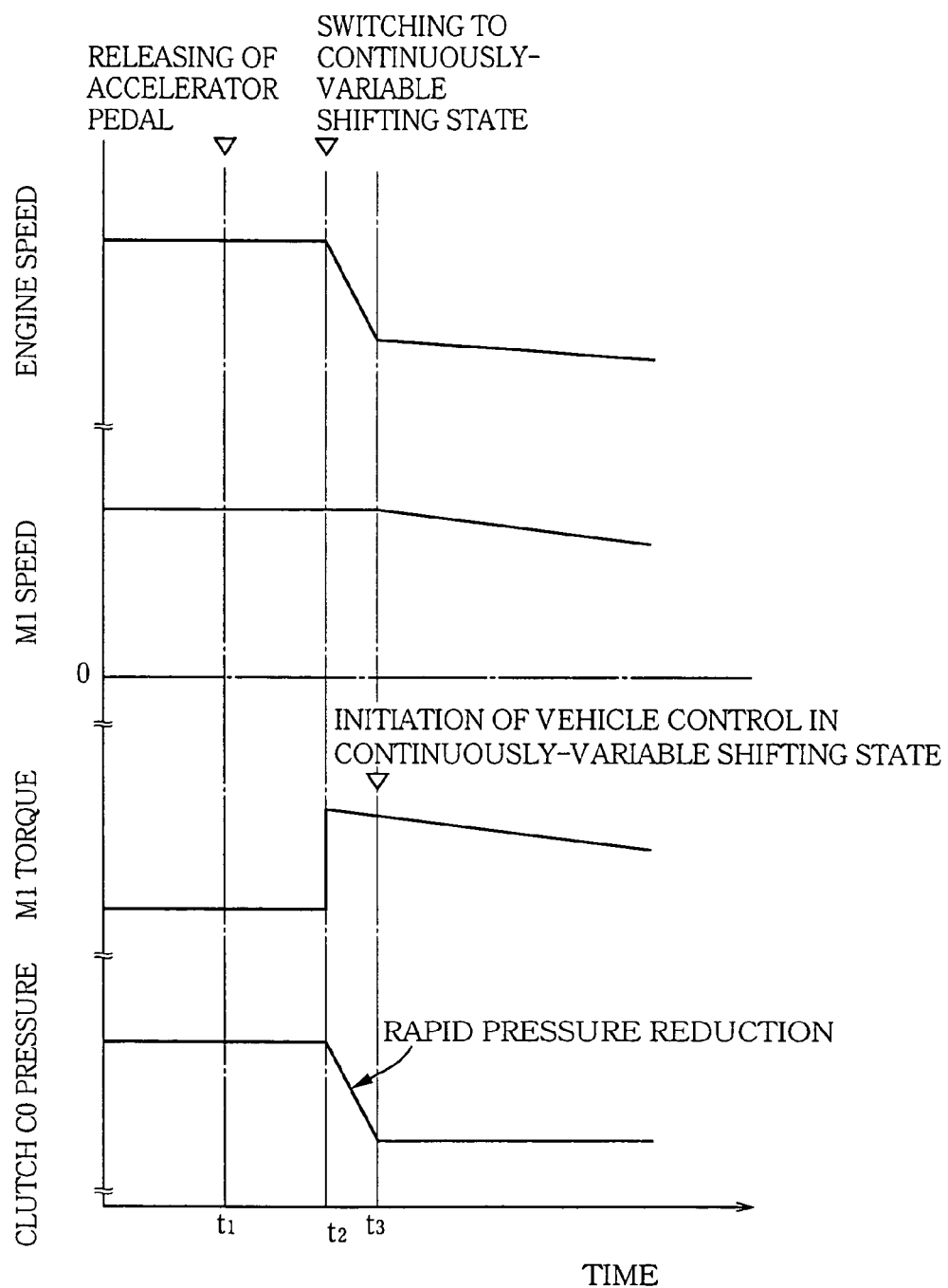
[FIG. 10] This figure is a time chart for explaining the control operation of FIG. 9 performed when the transmission mechanism is switched from the step-variable shifting state to the continuously-variable shifting state by a releasing action of a switching clutch upon releasing of the accelerator pedal.
Figure 11:
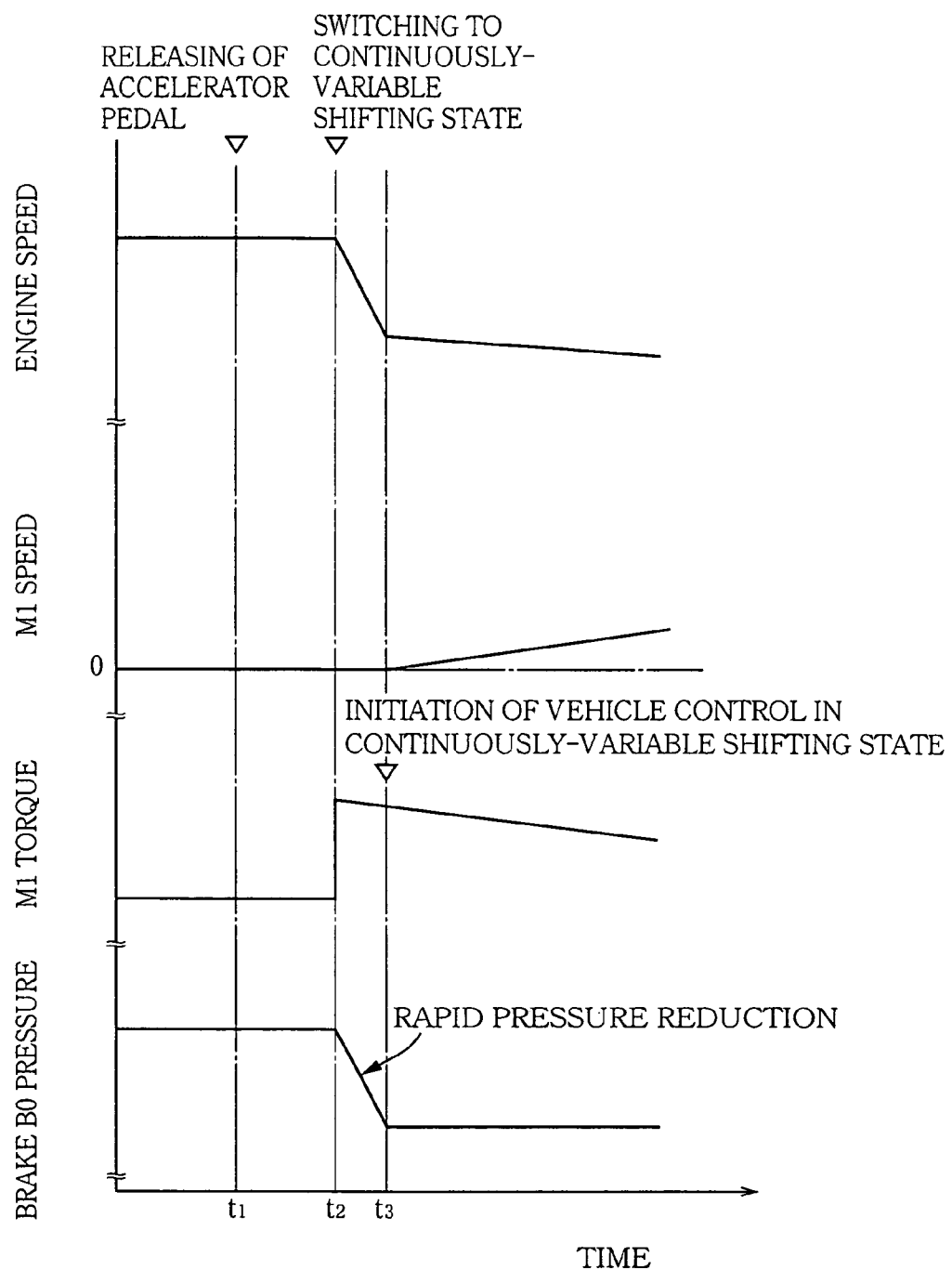
[FIG. 11] This figure is a time chart for explaining the control operation of FIG. 9 performed when the transmission mechanism is switched from the step-variable shifting state to the continuously-variable shifting state by a releasing action of a switching brake upon releasing of the accelerator pedal.

FIG. 9 is the flow chart illustrating a major control operation performed by the electronic control device 40, that is, a control routine executed upon switching of the transmission mechanism 10 from the step-variable shifting state to the continuously-variable shifting state. This control routine is repeatedly executed with an extremely short cycle time of several microseconds to several tens of microseconds, for example. FIGS. 10 and 11 are the time charts for explaining examples of the control operation illustrated in the flow chart of FIG. 9. The time chart of FIG. 10 shows the control operation performed when the step-variable shifting state established by the engaging action of the switching clutch C0 is switched to the continuously-variable shifting state established by the releasing action of the switching clutch C0, while the time chart of FIG. 11 shows the control operation performed when the step-variable shifting state established by the engaging action of the switching brake B0 is switched to the continuously-variable shifting state established by the releasing action of the switching brake B0.

The control routine is initiated with step SA1 (the word "step" being hereinafter omitted) corresponding to the vehicle condition determining means 80, to determine whether the accelerator pedal has been released. This determination is made on the basis of the amount of operation of the accelerator pedal. When an affirmative decision is obtained in SA1, the control flow goes to SA2 also corresponding to the vehicle condition determining means 80, to determine whether the vehicle condition as represented by the actual vehicle speed V and the required output torque $T_{OUT}$ calculated on the basis of the operating amount of the accelerator pedal has changed so as to require the transmission mechanism 10 to be switched from the step-variable shifting state to the continuously-variable shifting state. For example, this determination regarding the change of the vehicle condition is made according to the map of FIG. 6. If a negative decision is obtained in SA1 or SA2, the control flow goes to SA8 to maintain the present running state of the vehicle. These steps SA1 and SA2 may be modified into a single step to determine whether the transmission mechanism 10 should be switched from the step-variable shifting state to the continuously-variable shifting state. This determination may be made by determining whether none of the high-output vehicle running, the high-speed vehicle running and the functional deterioration of the electric path is determined, or whether the determination of the functional deterioration of the electric path which requires the step-variable shifting state is changed to the non-determination of the functional deterioration of the electric path, namely, whether the electric path is recovered from the functional deterioration.

When an affirmative decision is obtained in both SA1 and SA2 (at a point of time $t_1$ indicated in FIGS. 10 and 11), the control flow goes to SA3 corresponding to the electric motor control means 82, to control the first electric motor M1 such that the predetermined reaction torque equal to the reaction torque of the switching clutch C0 or brake B0 is generated by the first electric motor M1 at a point of time $t_2$ indicated in FIGS. 10 and 11, so that the first sun gear S1 temporarily receives two different kings of torques. Then, the control flow goes to SA4 corresponding to the synchronization-control-completion determining means 84, to determine whether the predetermined torque equal to the reaction torque of the switching clutch C0 or brake B0 has been generated by the first electric motor M1. For instance, this determination is made by determining whether the amount of the electric energy generated by the first electric motor M1 and supplied to the electric-energy storage device 60 corresponds to the above-indicated predetermined reaction torque. SA3 is repeatedly implemented until an affirmative decision is obtained in this step. When the affirmative decision is obtained in SA4, the control flow goes to SA5 corresponding to the switching control means 50, to initiate the releasing action of the switching clutch C0 or brake B0 (at the point of time $t_2$ indicated in FIGS. 10 and 11). Since the predetermined reaction torque has been generated by the first electric motor M1 in this state, the switching clutch C0 or brake B0 is not required to generate a reaction torque, so that the hydraulic pressure of the switching clutch C0 or brake B0 need not be gradually reduced, and is therefore rapidly reduced, for a time period from the point of time $t_2$ to a point of time $t_3$ as indicated in FIG. 10, so that the switching to the continuously-variable shifting state can be completed in a shorter time.

Then, the control flow goes to SA6 also corresponding to the electric motor control means 82, wherein the control of the first electric motor M1 is continued so that the speed of the first sun gear S1 is held equal to the engine speed NE, where the step-variable shifting state was established by the engaging action of the switching clutch C0. Where the step-variable shifting state was established by the engaging action of the switching brake B0, the control of the first electric motor M1 is continued so that the first sun gear S1 is held stationary with its speed being held zero. Then, the control flow goes to SA7 corresponding to the hybrid control means 52, to initiate the vehicle control with the transmission mechanism 10 placed in the continuously-variable shifting state wherein the engine 8 is operated with high efficiency while a proportion of vehicle drive forces generated by the engine 8 and the first electric motor M1 and/or second electric motor M2 is optimized. This vehicle control in the continuously-variable shifting state is initiated at the point of time $t_3$ indicated in FIGS. 10 and 11. As a result, the reaction torque of the switching clutch C0 or brake B0 generated in its engaged state is rapidly replaced by the reaction torque of the first electric motor M1, so that the switching shock can be reduced. Further, the difference between the input and output speeds of the switching clutch C0 or brake B0 in the process of its releasing action or its partially engaged state (during the time period from the point of time $t_2$ to the point of time $t_3$ indicated in FIGS. 10 and 11) can be reduced, whereby the load on the switching clutch C0 or brake B0 due to its dragging phenomenon can be reduced, leading to an improvement in its durability As described above, the electric motor control means 82 (SA3, SA6) controls the first electric motor of the transmission mechanism 10 including the power distributing mechanism 16 which has the first element RE1 (first carrier CA1) fixed to the engine 8, the second element RE2 (first sun gear S1) fixed to the first electric motor M1 and the third element RE3 (first ring gear R1) fixed to the second electric motor M2 and power transmitting member 18 and includes the switching clutch C0 for connecting the first and second elements RE1, RE2 to each other and the switching brake B0 for fixing the second element RE2 to the casing 12, and which is switchable between the continuously-variable shifting state in which the power distributing mechanism 16 is operable as an electrically controlled continuously variable transmission, and the step-variable shifting state in which the power distributing mechanism 16 is operable as a step-variable transmission. The electric motor control means 82 controls the first electric motor M1 so as to generate the predetermined reaction torque upon releasing of the switching clutch C0 or brake B0, so that the reaction torque of the switching clutch C0 or brake B0 is adequately replaced by the reaction torque of the first electric motor M1, so as to reduce the switching shock upon switching of the transmission mechanism. Further, the reduction of the reaction torque of the switching clutch C0 or brake B0 is compensated for by the predetermined reaction torque of the first electric motor M1, as if the switching clutch C0 or brake B0 were kept in the engaged state, so that the difference between the input and output speeds of the switching clutch C0 or brake B0 is reduced, whereby the load on the switching clutch C0 or brake B0 in its partially engaged state is reduced, leading to an improvement in the durability of the clutch C0 or brake B0. In addition, the power distributing mechanism 16 is simply constituted by the three elements, and the switching clutch C0 and brake B0, and the transmission mechanism 10 is easily switched by the switching clutch C0 or brake B0 under the control of the switching control means 50, between the continuously-variable and step-variable shifting states.

The control device according to the present embodiment is further arranged such that the switching control means 50 is operable upon switching of the transmission mechanism 10 from the step-variable shifting state to the continuously-variable shifting state, to initiate the releasing action of the switching clutch C0 or brake B0 after generation of the predetermined reaction torque by the first electric motor M1 under the control of the electric motor control means 82. According to this arrangement, the reaction torque of the switching clutch C0 or brake B0 is adequately replaced by the reaction torque of the first electric motor M1, so that the switching shock upon switching of the transmission mechanism 10 is reduced. Further, the reaction torque generated by the first electric motor M1 permits the rotating speed of the second element RE2 (first sun gear S1) to be adequately controlled in spite of the reduction of the reaction torque of the switching clutch C0 or brake B0 is reduced, so that the durability of the switching clutch C0 or brake B0 is improved.

The control device according to the present embodiment is further arranged such that the electric motor control means 82 controls the speed of the first electric motor M1 such that the speed difference among the first element RE1, second element RE2 and third element RE3 or the speed difference between the second element RE2 and the casing 12 is maintained at a value before initiation of the releasing action of the switching clutch C0 or brake B0, until the releasing action of the switching clutch C0 or brake B0 controlled by the switching control means 50 is completed. Accordingly, the difference between the input and output speeds of the switching clutch C0 or brake B0 in the process of its releasing action or in its partially engaged state is reduced until the releasing action is completed, so that the load on the switching clutch C0 or brake B0 due to its dragging phenomenon is reduced, with a result of an improvement in its durability In the present embodiment, the predetermined condition of the vehicle is determined on the basis of the predetermined upper limit value V1 of the running speed of the vehicle, and the switching control means 50 places the transmission mechanism 10 in the step-variable shifting state when the actual running speed V of the vehicle is higher than the predetermined upper limit value V1. In the high-speed running state of the vehicle in which the actual vehicle speed V is higher than the upper limit value V1, therefore, the output of the engine 8 is transmitted to the drive wheels 38 primarily through the mechanical power transmitting path, so that the fuel economy is improved owing to reduction of a loss of conversion between mechanical and electric energies in the step-variable shifting state as compared with that in the continuously-variable shifting state.

In the present embodiment, the predetermined condition of the vehicle is determined on the basis of a predetermined upper limit value T1 of the output of the vehicle, and the switching control means 50 places the transmission mechanism 10 in the step-variable shifting state when the actual output value $T_{OUT}$ is higher than the predetermined upper limit value T1. In the high-output running state of the vehicle in which the actual output value $T_{OUT}$ is higher than the predetermined upper limit value T1, therefore, the output of the engine 8 is transmitted to the drive wheels 38 primarily through the mechanical power transmitting path. However, the transmission mechanism 10 is operated as the electrically controlled continuously variable transmission when the vehicle is in the medium- or low-output running state. Accordingly, the required maximum amount of electric energy that should be generated by the first electric motor M1 can be reduced, that is, the required output capacity of the first electric motor M1 can be reduced, so that the required sizes of the first electric motor M1 and second electric motor M2 can be reduced, whereby the required size of the vehicular drive system including the first and second electric motors M1, M2 can be reduced.

The control device according to the present embodiment is further arranged such that the switching control means 50 can easily determine whether the vehicle is in the high-speed or high-output running state or not, on the basis of the actual vehicle speed V and output torque $T_{OUT}$ and according to the stored switching boundary line map defined by the upper limit V1 of the vehicle speed V and the upper limit T1 of the output torque $T_{OUT}$.

The control device according to the present embodiment is further arranged such that the switching control means 50 determines that the transmission mechanism 10 should be switched to the step-variable shifting state, when a functional-deterioration determining condition is satisfied, which is satisfied when the function of any one of control components for placing the transmission mechanism 10 in the continuously-variable shifting state is deteriorated. Thus, in the event of determination of the functional deterioration which disables the transmission mechanism 10 to be placed in the continuously-variable shifting state, the transmission mechanism 10 is placed in the step-variable shifting state, so that the vehicle can be run in the step-variable shifting state, even in the presence of the functional deterioration.

Further, the power distributing mechanism 16 controlled by the control device according to the present embodiment is simply constituted by the first planetary gear set 24 of single-pinion type having the three elements consisting of the first carrier CA1, first sun gear S1 and first ring gear R1, such that the axial dimension of the power distributing mechanism 16 is made small. In addition, the power distributing mechanism 16 can be switched between the continuously-variable shifting state and the step-variable shifting state, by the switching control means 50 which is arranged to control the hydraulically operated frictional coupling devices in the form of the switching clutch C0 for connecting the first sun gear S1 and the first carrier CA1 to each other and the switching brake B0 for fixing the first sun gear S1 to the transmission casing 12.

Further, the automatic transmission portion 20 of the transmission mechanism 10 controlled by the control device according to the present embodiment is connected in sires to and interposed between the power distributing mechanism 16 and the drive wheels 38, and the overall speed ratio of the transmission mechanism 10 is determined by the speed ratio of the power distributing mechanism 16, namely, by the speed ratio of the switchable type transmission portion 11, and the speed ratio of the automatic transmission portion 20. Accordingly, the vehicle drive force can be obtained over a relatively wide range of speed ratio, by utilizing the speed ratio of the automatic transmission portion 20, making it possible to improve the continuously variable control efficiency of the switchable type transmission portion 11, that is, the hybrid control efficiency.

Further, the switchable type transmission portion 11 controlled by the present control device is operable as if it were a part of the automatic transmission portion 20, and has an overdrive gear position in the form of the fifth gear position the speed ratio of which is lower than 1, when the transmission mechanism 10 is placed in the step-variable shifting state.

The switching control means 50 of the present control device is arranged to automatically switch the transmission mechanism 10 between the continuously-variable and step-variable shifting states, according to the vehicle condition, so that the vehicular drive system has not only an advantage of improved fuel economy of an electrically controlled continuously variable transmission, but also an advantage of high mechanical power transmitting efficiency of a step-variable transmission. Accordingly, when the engine is in a normal output state, for example, in the continuously-variable shifting region shown in FIG. 7 or in the continuously-variable shifting region shown in FIG. 6 in which the vehicle speed V is not higher than the upper limit V1 while the output torque $T_{OUT}$ is not lower than the upper limit T1, the transmission mechanism 10 is placed in the continuously-variable shifting state, so that the fuel economy is improved in a normal urban running of the hybrid vehicle, that is, in a medium- and low-speed running and a medium- and low-output running of the vehicle. When the engine is in a high-output running state, for example, in the continuously-variable shifting region shown in FIG. 6 in which the vehicle speed V is higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion between the mechanical and electric energies in the step-variable shifting state as compared with that in the continuously-variable shifting state. When the engine 8 is in a high-output running state, for example, in the continuously-variable shifting region shown in FIG. 6 in which the actual output torque $T_{OUT}$ is not lower than the upper limit T1, the transmission mechanism 10 is placed in the step-variable shifting state in which the output of the engine 8 is transmitted to the drive wheels 38 primarily through the mechanical power transmitting path. Thus, the transmission mechanism 10 is placed in the continuously-variable shifting state only when the vehicle is in the medium- or low-speed running state or in the medium- or low-output running state, so that the required amount of electric energy generated by the first electric motor M1, that is, the maximum amount of electric energy that must be transmitted from the first electric motor M1 can be reduced, making it possible to reduce the required sizes of the first and second electric motors M1, M2, and the required size of the vehicular drive system including those electric motors.

In the present embodiment, the second electric motor M2 is fixed to the power transmitting member 18 which is the input rotary element of the automatic transmission portion 20, so that the output torque of the second electric motor M2 can be reduced with respect to the torque of the output shaft 22 of the automatic transmission portion 20, whereby the required size of the second electric motor M2 can be reduced.

Other embodiments of the present invention will be described. In the following description, the same reference signs as used in the preceding embodiment will be used to identify the corresponding elements, which will not be described.

EMBODIMENT 2

Figure 12:
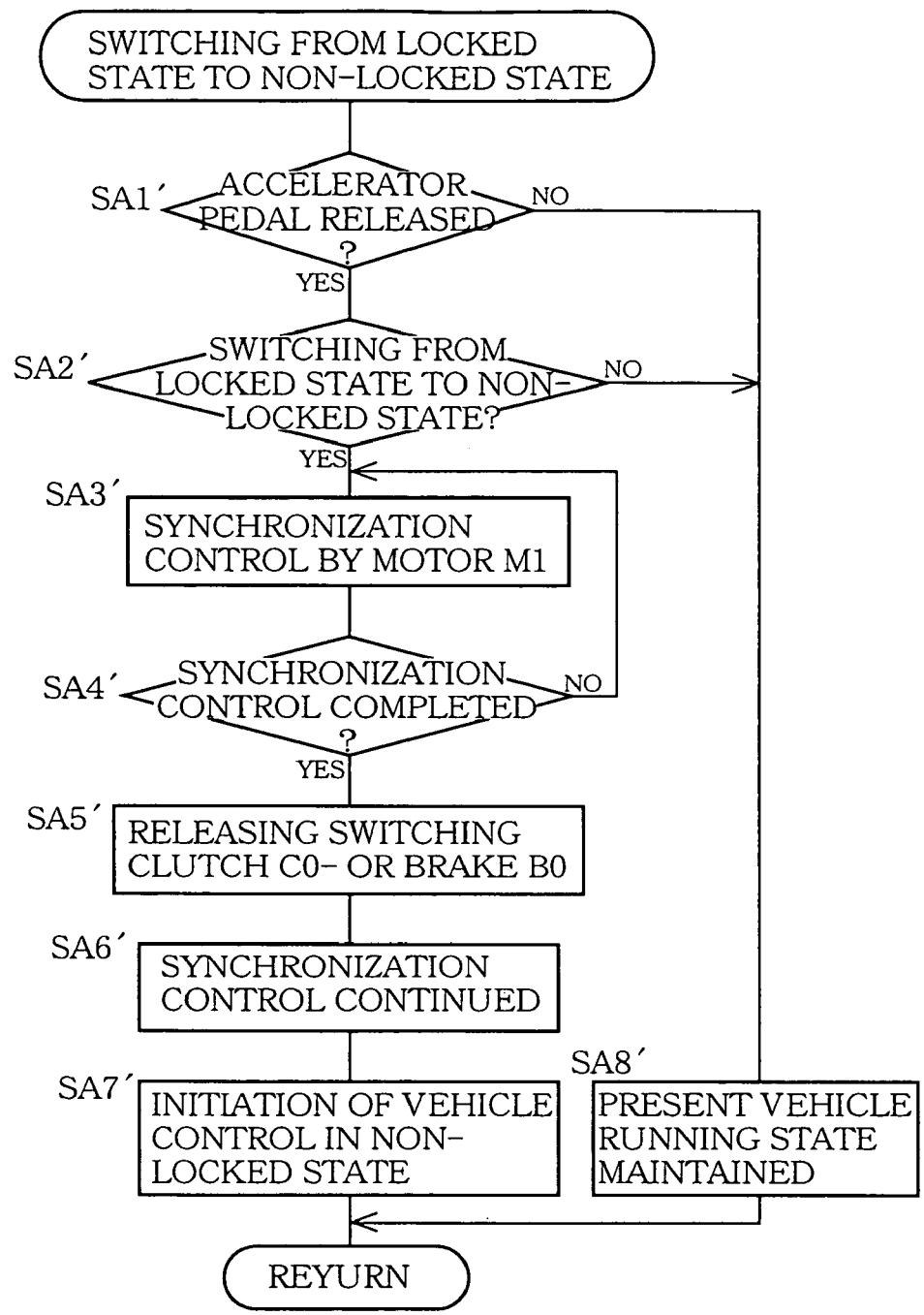
[FIG. 12] This figure is a flow chart illustrating a major control operation performed by the electronic control device of FIG. 4 when the switchable type transmission portion is switched from a locked state to a non-locked state, as a result of a releasing action of an accelerator pedal.
Figure 13:
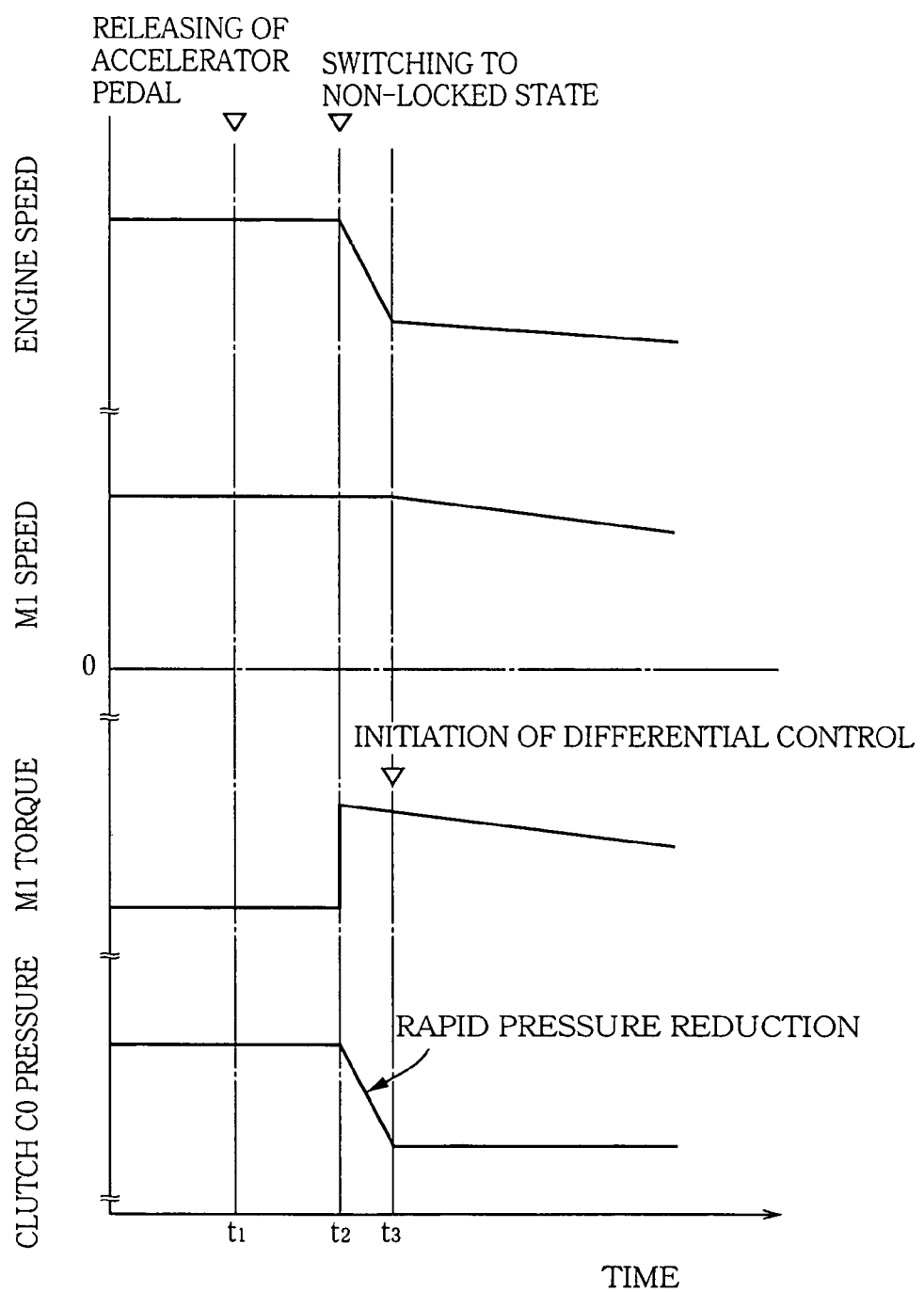
[FIG. 13] This figure is a time chart for explaining the control operation of FIG. 12 performed when the transmission mechanism is switched from the locked state to the non-locked state by the releasing action of the switching clutch upon releasing of the accelerator pedal.

FIG. 12 is the flow chart illustrating a major control operation of the electronic control device 40, that is, a control routine executed upon switching of the switchable type transmission portion 11 (that is, power distributing mechanism 16) from the locked state to the differential state (non-locked state). This control routine is repeatedly executed with an extremely short cycle time of several microseconds to several tens of microseconds, for example. FIG. 13 is the time chart for explaining an example of the control operation illustrated in the flow chart of FIG. 12, which is performed when the locked state established by the engaging action of the switching clutch C0 is switched to the non-locked state established by the releasing action of the switching clutch C0.

The control routine of the flow chart of FIG. 12 is different from that of the flow chart of FIG. 9 in that the control routine of FIG. 12 applies to the switching of the switchable transmission portion 11 from the locked state to the non-locked state by releasing the switching clutch C0 or brake B0, so as to reduce the switching shock, in the flow chart of FIG. 12. In this respect, it is noted that the switching of the transmission mechanism 10 from the step-variable shifting state to the continuously-variable shifting state can be considered equivalent to the switching of the switchable type transmission portion 11 from the locked state to the non-locked state.

The control routine is initiated with SA1' corresponding to the vehicle condition determining means 80, to determine whether the accelerator pedal has been released. When an affirmative decision is obtained in SA1', the control flow goes to SA2' also corresponding to the vehicle condition determining means 80, to determine whether the vehicle condition has changed so as to require the switchable type transmission portion 11 to be switched from the locked state to the non-locked state. For example, this determination regarding the change of the vehicle condition is made according to the map of FIG. 6. If a negative decision is obtained in SA1' or SA2', the control flow goes to SA8' to maintain the present running state of the vehicle. These steps SA1' and SA2' may be modified into a single step to determine whether the switchable type transmission portion 11 should be switched from the locked state to the non-locked state. This determination may be made by determining whether none of the high-output vehicle running, the high-speed vehicle running and the functional deterioration of the electric path is determined, or whether the determination of the functional deterioration of the electric path which requires the locked state is changed to the non-determination of the functional deterioration of the electric path, namely, whether the electric path is recovered from the functional deterioration.

When an affirmative decision is obtained in both SA1' and SA2' (at a point of time $t_1$ indicated in FIG. 13), the control flow goes to SA3' corresponding to the electric motor control means 82, to control the first electric motor M1 such that the predetermined reaction torque equal to the reaction torque of the switching clutch C0 or brake B0 is generated by the first electric motor M1 at a point of time $t_2$ indicated in FIG. 13, so that the first sun gear S1 temporarily receives two different kings of torques. Then, the control flow goes to SA4' corresponding to the synchronization-control-completion determining means 84, to determine whether the predetermined torque equal to the reaction torque of the switching clutch C0 or brake B0 has been generated by the first electric motor M1. For instance, this determination is made by determining whether the amount of the electric energy generated by the first electric motor M1 and supplied to the electric-energy storage device 60 corresponds to the above-indicated predetermined reaction torque. SA3' is repeatedly implemented until an affirmative decision is obtained in this step. When the affirmative decision is obtained in SA4', the control flow goes to SA5' corresponding to the switching control means 50, to initiate the releasing action of the switching clutch C0 or brake B0 (at the point of time $t_2$ indicated in FIG. 13). Since the predetermined reaction torque has been generated by the first electric motor M1 in this state, the switching clutch C0 or brake B0 is not required to generate a reaction torque, so that the hydraulic pressure of the switching clutch C0 or brake B0 need not be gradually reduced, and is therefore rapidly reduced, for a time period from the point of time $t_2$ to a point of time $t_3$ as indicated in FIG. 13, so that the switching to the non-locked state can be completed in a shorter time.

Then, the control flow goes to SA6' also corresponding to the electric motor control means 82, wherein the control of the first electric motor M1 is continued so that the speed of the first sun gear S1 is held equal to the engine speed NE, where the locked state was established by the engaging action of the switching clutch C0. Where the locked state was established by the engaging action of the switching brake B0, the control of the first electric motor M1 is continued so that the first sun gear S1 is held stationary with its speed being held zero. Then, the control flow goes to SA7' corresponding to the hybrid control means 52, to initiate (at the point of time $t_3$ indicated in FIG. 13) the vehicle control in the differential state of the switchable type transmission portion 11 wherein the engine 8 is operated with high efficiency while a proportion of vehicle drive forces generated by the engine 8 and the first electric motor M1 and/or second electric motor M2 is optimized. As a result, the reaction torque of the switching clutch C0 or brake B0 generated in its engaged state is rapidly replaced by the reaction torque of the first electric motor M1, so that the switching shock can be reduced. Further, the difference between the input and output speeds of the switching clutch C0 or brake B0 in the process of its releasing action or its partially engaged state (during the time period from the point of time $t_2$ to the point of time $t_3$ indicated in FIG. 13) can be reduced, whereby the load on the switching clutch C0 or brake B0 due to its dragging phenomenon can be reduced, leading to an improvement in its durability The control device according to the present embodiment has the same advantages as the control device according to the preceding embodiment, regarding the switching control upon switching of the shifting state of the transmission mechanism 10 by releasing the switching clutch C0 or brake B0, since the switching of the transmission mechanism 10 from the step-variable shifting state to the continuously-variable shifting state can be considered equivalent to the switching of the switchable type transmission portion 11 from the locked state to the non-locked state.

EMBODIMENT 3

In the preceding embodiments, the switching clutch C0 or brake B0 is released by the switching control means 50 only after the predetermined reaction torque of the first electric motor M1 has been generated under the control of the electric motor control means 82, so as to reduce the switching shock upon releasing of the switching clutch C0 or brake B0. The present embodiment is different from the preceding embodiments in that the electric motor control means 82 in the present embodiment is arranged to command the hybrid control means 52 so as to control the first electric motor M1 such that the predetermined reaction torque of the first electric motor M1 is generated in the process of the releasing action of the switching clutch C0 or brake B0 under the control of the switching control means 50, so as to reduce the switching shock upon releasing of the switching clutch C0 or brake B0 to switch the transmission mechanism 10 from the step-variable shifting state to the continuously-variable shifting state, or to switch the switchable type transmission portion 11 (power distributing mechanism 16) from the locked state to the non-locked state.

Described in detail, the switching control means 50 slowly releases the switching clutch C0, while the electric motor control means 82 controls the speed NM1 of the first electric motor in the process of the releasing action of the switching clutch C0 such that the speed of the first sun gear S1, that is, the speed NM1 of the first electric motor is held equal to the engine speed NE. Namely, the present embodiment is arranged to effect so-called "overlapping switching and motor controls" in which the control of the releasing action of the switching clutch C0 by the switching control means 50 takes place concurrently with the control of the speed of the first electric motor M1 by the electric motor control means 82, that is, the control of the torque of the first electric motor M1 by controlling its speed, more precisely, the control of the torque of the first electric motor M1 so as to hold the motor speed NM1 equal to the engine speed NE.

As a result, the reaction torque generated by the first electric motor M1 is gradually increased under the control of the electric motor control means 82, as the reaction torque of the switching clutch C0 is gradually reduced in the process of its releasing action, so that the reaction torque of the switching clutch C0 generated in its engaged state is gradually replaced by the reaction torque of the first electric motor M1. For example, the electric motor control means 82 feedback-controls the speed NM1 of the first electric motor such that the difference between the speed NM1 and the engine speed NE is substantially zeroed, for reducing the speed differences among the above-described first element RE1, second element RE2 and third element RE3.

Alternatively, the switching control means 50 slowly releases the switching brake B0, while the electric motor control means 82 controls the speed NM1 of the first electric motor in the process of the releasing action of the switching clutch C0 such that the speed NM1 of the first electric motor is held equal to the engine speed NE. Namely, the present embodiment is arranged to effect so-called "overlapping switching and motor controls" in which the control of the releasing action of the switching brake B0 by the switching control means 50 takes place concurrently with the control of the torque of the first electric motor M1 by the electric motor control means 82 so as to hold the motor speed NM1 equal to the engine speed NE.

As a result, the reaction torque generated by the first electric motor M1 is gradually increased under the control of the electric motor control means 82, as the reaction torque of the switching brake B0 is gradually reduced in the process of its releasing action, so that the reaction torque of the switching brake B0 generated in its engaged state is gradually replaced by the reaction torque of the first electric motor M1. For example, the electric motor control means 82 feedback-controls the speed NM1 of the first electric motor so as to reduce the speed difference between the speed of the above-described second element RE2 and the casing 12.

Figure 14:
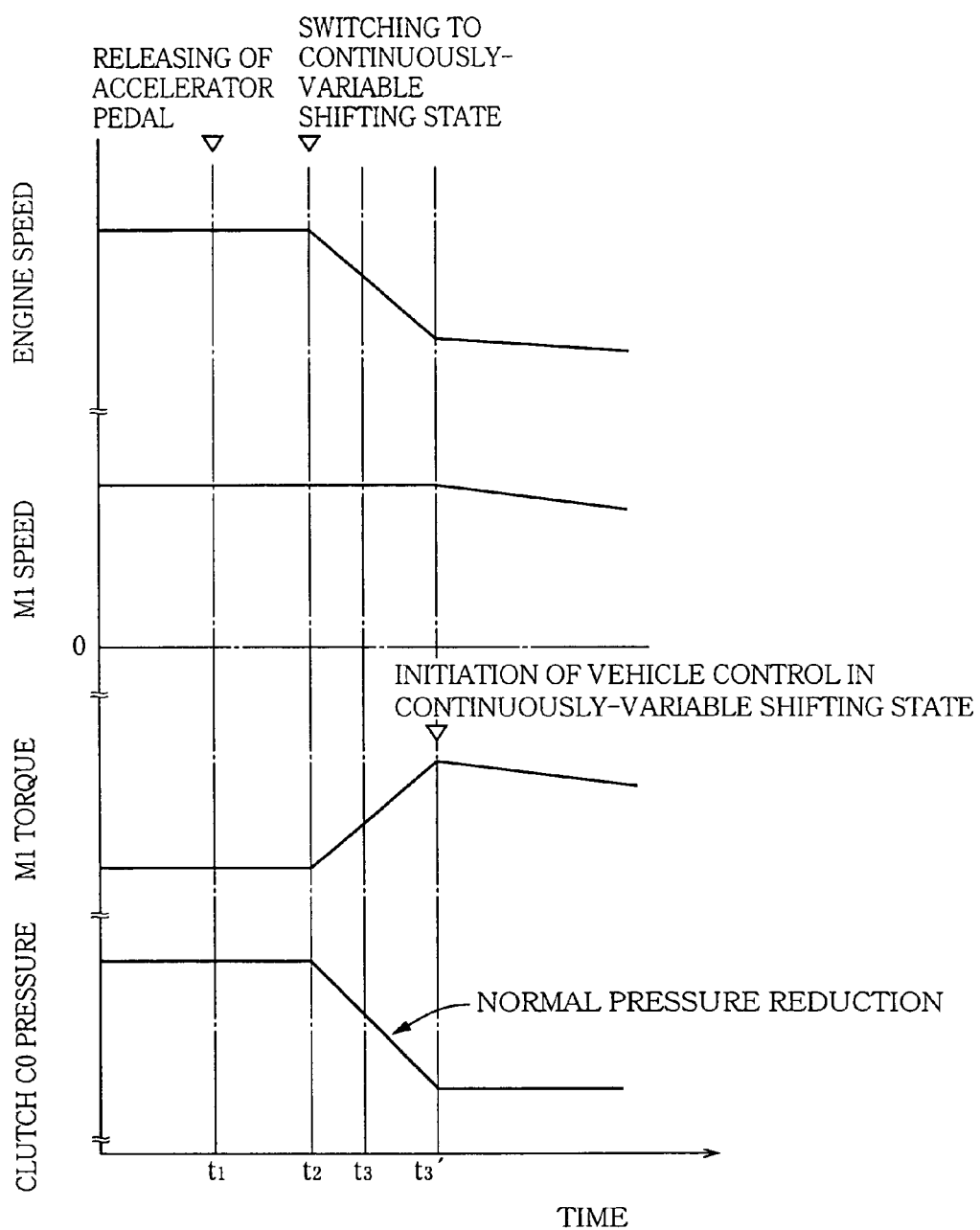
[FIG. 14] This figure is a time chart for explaining the control operation of FIG. 9 performed in an embodiment alternative to the embodiment of FIG. 10, when the transmission mechanism is switched from the step-variable shifting state to the continuously-variable shifting state by the releasing action of the switching clutch upon releasing of the accelerator pedal.
Figure 15:
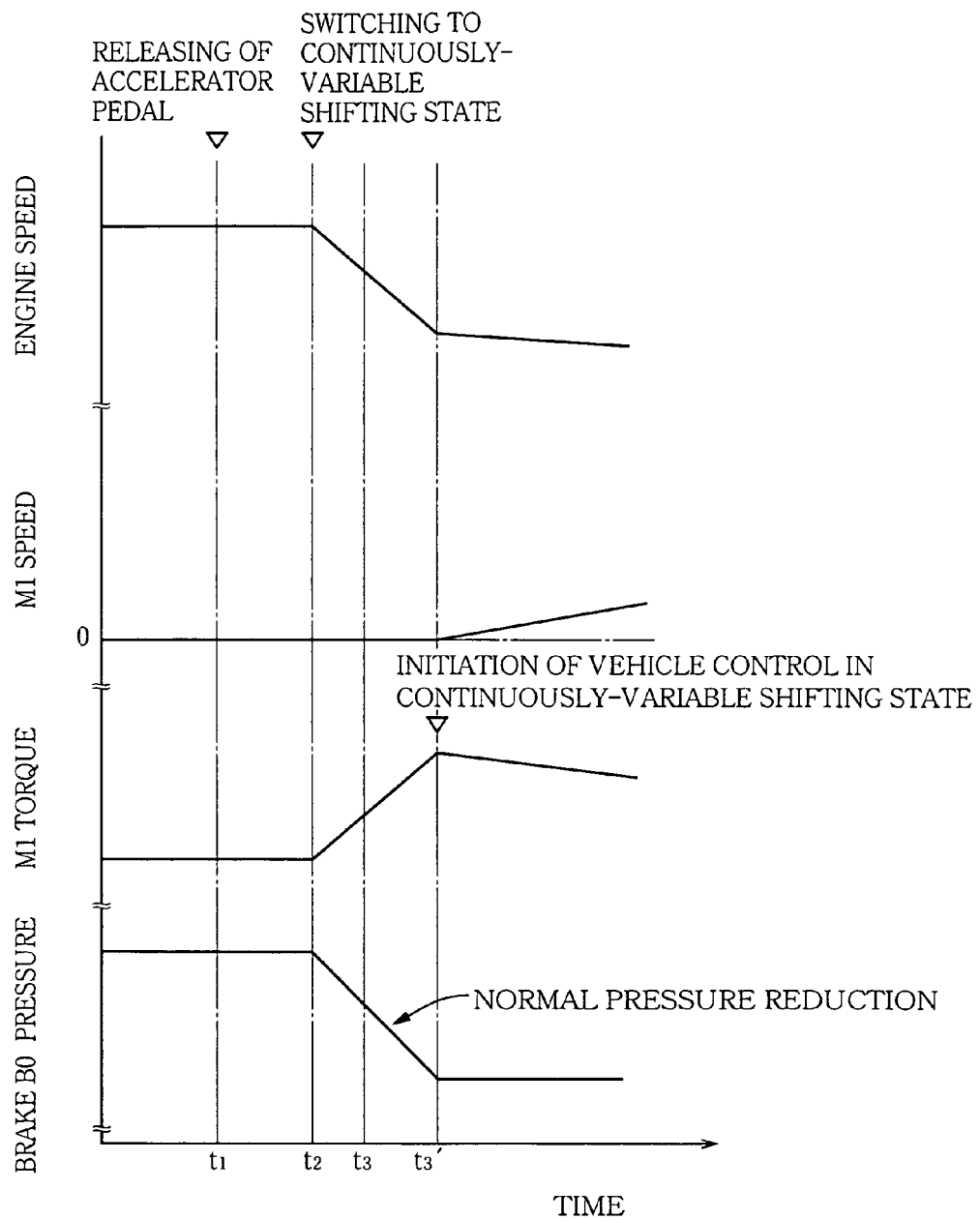
[FIG. 15] This figure is a time chart for explaining the control operation of FIG. 9 performed in an embodiment alternative to the embodiment of FIG. 10, when the transmission mechanism is switched from the step-variable shifting state to the continuously-variable shifting state by the releasing action of the switching brake upon releasing of the accelerator pedal.
Figure 16:
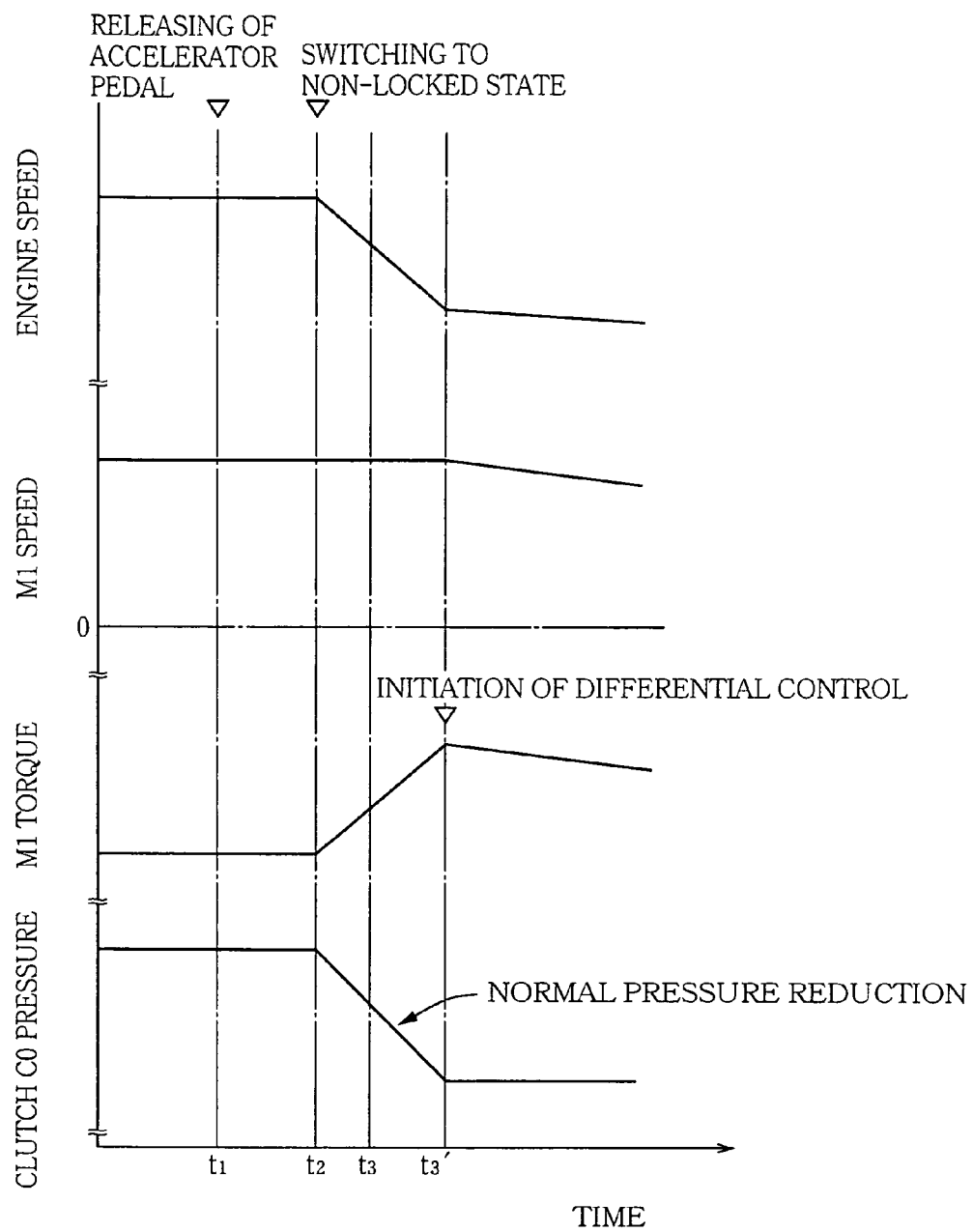
[FIG. 16] This figure is a time chart for explaining the control operation of FIG. 12 performed in an embodiment alternative to the embodiment of FIG. 13, when the transmission mechanism is switched from the locked state to the non-locked state by the releasing action of the switching clutch upon releasing of the accelerator pedal.

FIG. 14 is the time chart for explaining the control operation upon switching of the transmission mechanism 10 from the step-variable shifting state established by the engaging action of the switching clutch C0 to the continuously-variable shifting state established by the releasing action of the switching clutch C0. The example shown in the time chart of FIG. 14 is alternative to the example shown in the time chart of FIG. 10. FIG. 15 is the time chart for explaining the control operation upon switching of the transmission mechanism 10 from the step-variable shifting state established by the engaging action of the switching brake B0 to the continuously-variable shifting state established by the releasing action of the switching brake B0. The example shown in the time chart of FIG. 15 is alternative to the example shown in the time chart of FIG. 11. FIG. 16 is the time chart for explaining the control operation upon switching of the switchable transmission portion 11 from the locked state established by the engaging action of the switching clutch C0 to the non-locked state established by the releasing action of the switching clutch C0. The example shown in the time chart of FIG. 16 is alternative to the time chart of FIG. 13.

In the examples of FIGS. 10, 11 and 13, the hydraulic pressure of the switching clutch C0 or brake B0 is rapidly reduced only after the predetermined reaction torque of the first electric motor M1 has been generated. The example of FIGS. 14-16 are different from the corresponding examples of FIGS. 10, 11 and 13, primarily in that the so-called overlapping switching and motor controls are effected in the examples of FIGS. 14-16, such that the control of the releasing action of the switching clutch C0 or brake B0 and the speed control of the first electric motor M1, that is, the torque control of the first electric motor by its speed control, take place concurrently with each other. Accordingly, the examples of FIGS. 14 and 15 are different from the examples of FIGS. 10 and 11 in that the steps SA33 and SA4 are implemented concurrently with the step SA5 in the examples of FIGS. 14 and 15, and the example of FIG. 16 is different from the example of FIG. 13 in that the steps SA3' and SA4' are implemented concurrently with the step SA5' in the example of FIG. 16.

Described in detail, the switching clutch C0 is released at a lower speed in the example of FIG. 14 during the time period from the point of time $t_2$ to a point of time $t_3'$, than in the example of FIG. 10 in which the switching clutch C0 is rapidly released during the time period from the point of time $t_2$ to the point of time $t_3$), while the speed of the first sun gear S1, that is, the speed NM1 of the first electric motor is feedback-controlled so as to be held equal to the engine speed NE, in the process of the releasing action of the switching clutch C0. Namely, the torque of the first electric motor M1 is controlled in the process of the releasing action of the switching clutch C0, such that the speed NM1 of the first electric motor is held equal to the engine speed NE. After the point of time $t_3'$ indicated in FIG. 14, the vehicle control in the continuously-variable shifting state of the transmission mechanism 10 is implemented.

Similarly, the switching brake B0 is released at a lower speed in the example of FIG. 15 during the time period from the point of time $t_2$ to the point of time $t_3'$, than in the example of FIG. 11 in which the switching brake B0 is rapidly released during the time period from the point of time $t_2$ to the point of time $t_3$), while the speed of the first sun gear S1, that is, the speed NM1 of the first electric motor is feedback-controlled so as to be held zero, in the process of the releasing action of the switching brake B0. Namely, the torque of the first electric motor M1 is controlled in the process of the releasing action of the switching brake B0, such that the speed NM1 of the first electric motor is held zero. After the point of time $t_3'$ indicated in FIG. 15, the vehicle, control in the continuously-variable shifting state of the transmission mechanism 11 is implemented.

Similarly, the switching clutch C0 is released at a lower speed in the example of FIG. 16 during the time period from the point of time $t_2$ to a point of time $t_3'$, than in the example of FIG. 13 in which the switching clutch C0 is rapidly released during the time period from the point of time $t_2$ to the point of time $t_3$), while the speed of the first sun gear S1, that is, the speed NM1 of the first electric motor is feedback-controlled so as to be held equal to the engine speed NE, in the process of the releasing action of the switching clutch C0. Namely, the torque of the first electric motor M1 is controlled in the process of the releasing action of the switching clutch C0, such that the speed NM1 of the first electric motor is held equal to the engine speed NE. After the point of time $t_3'$ indicated in FIG. 16 the vehicle control in the differential state of the switchable type transmission portion 10 is implemented.

As a result, the reaction torque generated by the first electric motor M1 is gradually increased as the reaction torque of the switching clutch C0 or brake B0 is gradually reduced in the process of its releasing action, so that the reaction torque of the switching clutch C0 or brake B0 generated in its engaged state is gradually replaced by the reaction torque of the first electric motor M1, whereby the switching shock is reduced. Further, the difference between the input and output speeds of the switching clutch C0 or brake B0 in its releasing action or in its partially engaged state (during the time period from the point of time $t_2$ to the point of time $t_3'$ indicated in FIGS. 14-16) is reduced, with a result of reduction of the load on the switching clutch or brake due to the dragging phenomenon, so that the durability of the switching clutch or brake is increased.

In the examples of FIGS. 14, 15 and 16, the rate of increase of the torque of the first electric motor M1 or the rate of reduction of the hydraulic pressure of the switching clutch C0 or brake B0 may be controlled depending upon the vehicle speed V or engine torque Te, so as to effect the so-called overlapping switching and motor controls such that the motor torque is increased while at the same time the switching clutch C0 or brake B0 is released.

As described above, the control device according to the present embodiment is arranged such that the electric motor control means 82 is operable upon switching of the transmission mechanism 10 from the step-variable shifting state to the continuously-variable shifting state, that is, upon switching of the switchable type transmission portion 11 (power distributing mechanism 16) from the locked state to the non-locked state, and the electric motor control means 82 controls the first electric motor M1 in the process of the releasing action of the switching clutch C0 or brake B0 under the control of the switching control means 50 such that the reaction torque of the first electric motor M1 is increased as the switching clutch C0 or brake B0 is released. According to this arrangement, the reaction torque of the switching clutch c0 or brake B0 is adequately replaced by the reaction torque of the first electric motor M1, so that the switching shock upon switching of the transmission mechanism is reduced. Further, the reaction torque generated by the first electric motor M1 permits the rotating speed of the second element RE2 (first sun gear S1) to be adequately controlled in spite of the reduction of the reaction torque of the switching clutch C0 or brake B0, so that the durability of the switching clutch C0 or brake B0 is improved.

The control device according to the present embodiment is further arranged such that the electric motor control means 82 feedback-controls the speed of the first electric motor M1 so as to reduce the speed difference among the first element RE1, second element RE2 and third element RE3 or the speed difference between the second element RE2 and the casing 12, in the process of the releasing action of the switching clutch C0 or brake B0. Accordingly, the reaction torque of the switching clutch C0 or brake B0 is replaced by the reaction torque of the first electric motor M1, in a shorter period of time.

Unlike the preceding embodiments wherein the releasing action of the switching clutch C0 or brake B0 is initiated after the generation of the predetermined reaction torque of the first electric motor M1, the present embodiment is arranged to generate the reaction torque of the first electric motor M1 as the switching clutch C0 or brake B0 is released. The present embodiment has the same advantages as the preceding embodiments, except for the control difference described above.

EMBODIMENT 4

As described above, the transmission mechanism 10 is switchable between the continuously-variable shifting state and the step-variable shifting state. In the continuously-variable shifting state, for example, the transmission mechanism 10 is in a free state in which the speeds of the first sun gear S1 and the first ring gear R1 are not influenced or governed by the first electric motor M1 fixed to the first sun gear S1 and the second electric motor M2 fixed to the first ring gear M2. That is, the speed ratio of the transmission mechanism 11 placed in the continuously-variable shifting state is not held fixed with respect to the engine speed NE. In the step-variable shifting state established by the engaging action of the switching clutch C0, for example, on the other hand, the rotary elements of the first planetary gear set 24 are rotated as a unit, and the speed of the first sun gear S1 and the speed of the first ring gear R1 are held equal to the engine speed NE, that is, equal to the speed of the first carrier CA1. When the first carrier CA1 and the first sun gear S1 are not synchronized with each other upon switching of the transmission mechanism 10 to the step-variable shifting state by engaging the switching clutch C0, the switching clutch has a risk of an engaging shock due to the speed difference between the first carrier CA1 and the first sun gear S1. In other words, the transmission mechanism 10 has a risk of occurrence of a switching shock upon switching of the transmission mechanism 10 from the continuously-variable shifting state to the step-variable shifting state.

To reduce this switching shock, the electric motor control means 82 in the present embodiment is arranged to control the speed of the first electric motor M1 upon engagement of the switching clutch C0 or brake B0, that is, upon switching of the transmission mechanism 10 from the continuously-variable shifting state to the step-variable shifting state, so as to reduce the speed differences among the first element RE1, second element RE2 and third element RE3, or the speed difference between the second element RE2 and the casing 12, so that the first, second and third elements RE1, RE2, RE3 have the speed which is substantially equal to that to be established after the switching to the step-variable shifting state. In other words, the electric motor control means 82 controls the first electric motor M1 such that the predetermined reaction torque equal to the reaction torque generated by the engaging action of the switching clutch C0 or brake B0 is generated by at least the first electric motor M1 of the first and second electric motors M1, M2, so as to reduce the switching shock upon switching of the transmission mechanism 10 from the continuously-variable shifting state to the step-variable shifting state. On the other hand, the switching control means 50 initiates the engaging action of the switching clutch C0 or brake B0 to switch the transmission mechanism 10 from the continuously-variable shifting state to the step-variable shifting state, only after the control of the speed of the first electric motor M1 under the control of the electric motor control means 82 to reduce the speed differences among the first, second and third elements RE1, RE2 and RE3, or the speed difference between the second element RE2 and the casing 12.

Described in detail, the electric motor control means 82 commands the hybrid control means 52, upon engagement of the switching clutch C0, to control the first electric motor M1 such that the speed of the first sun gear S1, that is, the speed NM1 of the first electric motor is changed toward the engine speed NE, in other words, to control the torque of the first electric motor M1 such that the speed NM1 of the first electric motor is made equal to the engine speed NE. controlled witching in the process of the releasing action of the switching clutch C0 such that the speed of the first sun gear S1, that is, the speed NM1 of the first electric motor is held equal to the engine speed NE. The hybrid control means 52 controls the first electric motor M1 to generate the predetermined toque equal to the reaction torque of the switching clutch C0, by controlling the amount of generation of an electric energy by the first electric motor M1.

Where the step-variable shifting state is established by engaging the switching brake B0, the first sun gear S1 is held stationary, that is, the speed of the first sun gear S1 is held zero. When the transmission mechanism 10 is switched to the step-variable shifting state by engaging the switching brake B0, the speed of the first sun gear S1 should be lowered to zero, so that the switching brake B0 has a risk of an engaging shock due to the speed difference between the firs sun gear S1 and the casing 12. That is, the transmission mechanism 10 has a risk of a switching shock upon switching from the continuously-variable shifting state to the step-variable shifting state by engaging the switching brake B0.

To reduce this switching shock, the electric motor control means 82 is arranged to command the hybrid control means 52, upon engagement of the switching brake B0, to control the first electric motor M1 such that the speed of the first sun gear S1, that is, the speed NM1 of the first electric motor is controlled to be zero, in other words, such that the predetermined torque for holding the first sun gear S1 stationary is generated by the first electric motor M1. The hybrid control means 52 controls the first electric motor M1 to generate the predetermined toque equal to the reaction torque of the switching brake B0, by controlling the amount of generation of an electric energy by the first electric motor M1.

The synchronization-control-completion determining means 84 is operable, upon switching of the transmission mechanism 10 from the continuously-variable shifting state to the step-variable shifting state by the engaging action of the switching clutch C0, to determine whether the speed of the first sun gear S1 has been made equal to the engine speed NE. For example, this determination is made by determining whether the speed NM1 of the first electric motor has been made equal to the engine speed NE under the control of the electric motor control means 82. Upon switching of the transmission mechanism 10 from the continuously-variable shifting state to the step-variable shifting state by the engaging action of the switching brake B0, the synchronization-control-completion determining means 84 is operable to determine whether the speed of the first sun gear S1 has been zeroed. For example, this determination is made by determining whether the speed NM1 of the first electric motor has been zeroed under the control of the electric motor control means 82.

The switching control means 50, which is operated upon determination by the synchronization-control-completion determining means 84 that the speed of the first sun gear S1 has been made equal to the engine speed NE or has been zeroed, initiates the engaging action of the switching clutch C0 or brake B0. Upon initiation of the engaging action, the switching clutch C0 or brake B0 is not required to generate a reaction torque since the predetermined reaction torque has been generated by the first electric motor M1. Therefore, the hydraulic pressure of the switching clutch C0 or brake B0 need not be gradually reduced, but may be rapidly reduced for comparatively rapid switching to the step-variable shifting state.

The electric motor control means 82 continues the control of the first electric motor M1 until the moment of completion of the engaging action of the switching clutch C0 or brake B0, for maintaining the predetermined reaction torque to hold the speed of the first sun gear S1 equal to the engine speed NE, so as to reduce the engaging shock of the switching clutch C0, or to hold the speed of the first sun gear S1 zero, so as to reduce the engaging shock of the switching brake B0, when the transmission mechanism 10 is switched from the continuously-variable shifting state to the step-variable shifting state under the control of the switching control means 50. Upon completion of the engaging action of the switching clutch C0 or brake B0, the switching clutch or brake temporarily receives two different kinds of toque. For example, the reaction torque generated by the first electric motor M1 is controlled by the hybrid control means 52 such that the generated torque is equal to the actual engine torque Te.

Engine-output-control-necessity determining means 86 is provided to determine whether it is necessary to temporarily reduce the engine torque Te or the rate of increase of the engine output, or limit the engine torque Te or the rate of increase of the engine output to a value not higher than a predetermined limit, for preventing an increase of the electric energy generated and supplied by the first electric motor M1, from exceeding a predetermined upper limit determined by the nominal rating of the first electric motor M1, in the process of the switching of the transmission mechanism 10 to the step-variable shifting state.

Engine-output control means 88 is provided to temporarily reduce the engine torque Te or the rate of increase of the engine output or limit the engine torque Te or the rate of increase of the engine output, upon affirmative determination by the engine-output-control-necessity determining means 86.

Figure 17:
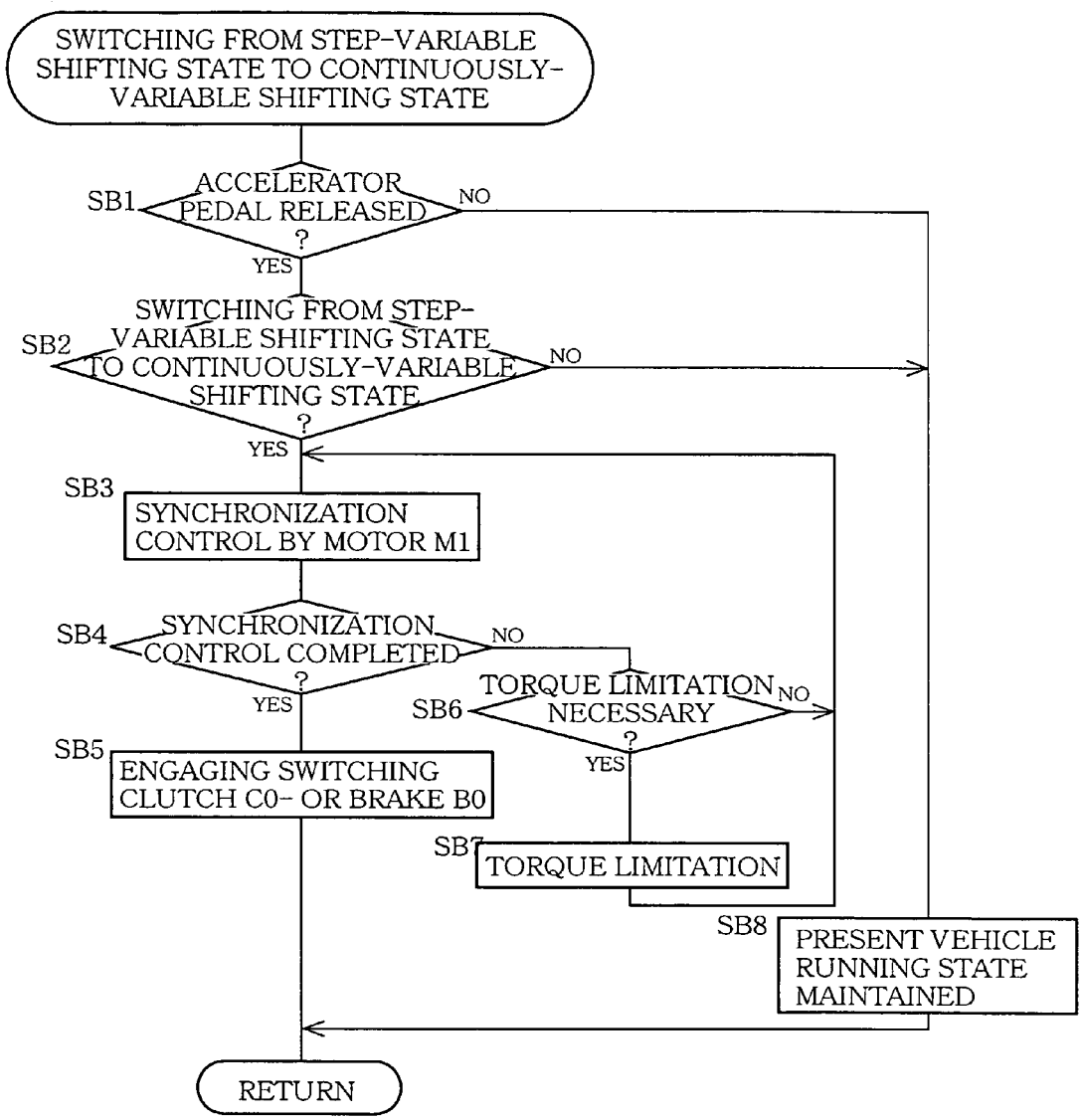
[FIG. 17] This figure is a flow chart illustrating a major control operation performed by the electronic control device of FIG. 4 when the transmission mechanism is switched from the continuously-variable shifting state to the step-variable shifting state, as a result of a depressing action of the accelerator pedal.
Figure 19:
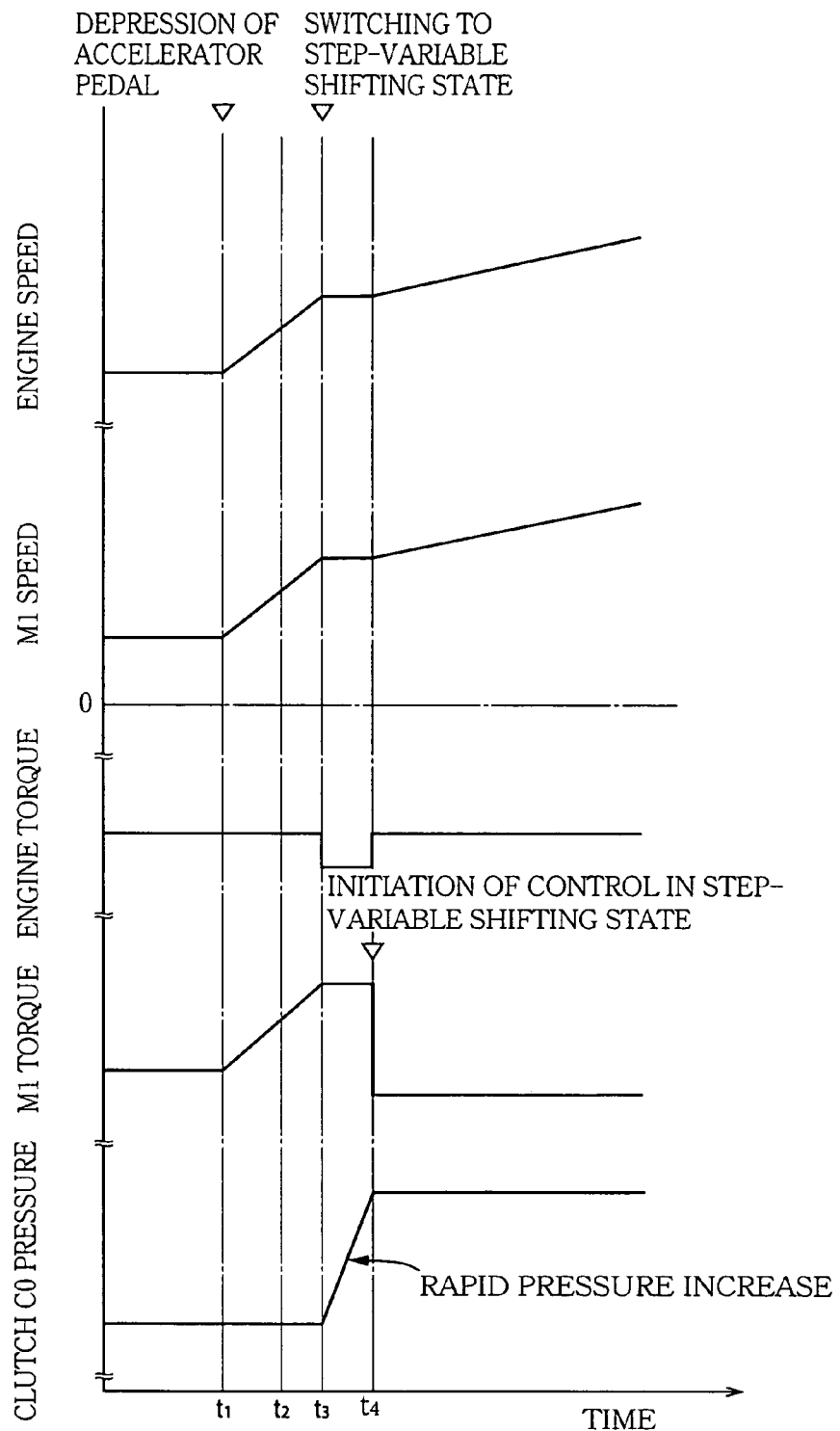
[FIG. 19] This figure is a time chart for explaining the control operation of FIG. 17 performed when the transmission mechanism is switched from the continuously-variable shifting state to the step-variable shifting state by an engaging action of the switching clutch upon depression of the accelerator pedal.
Figure 20:
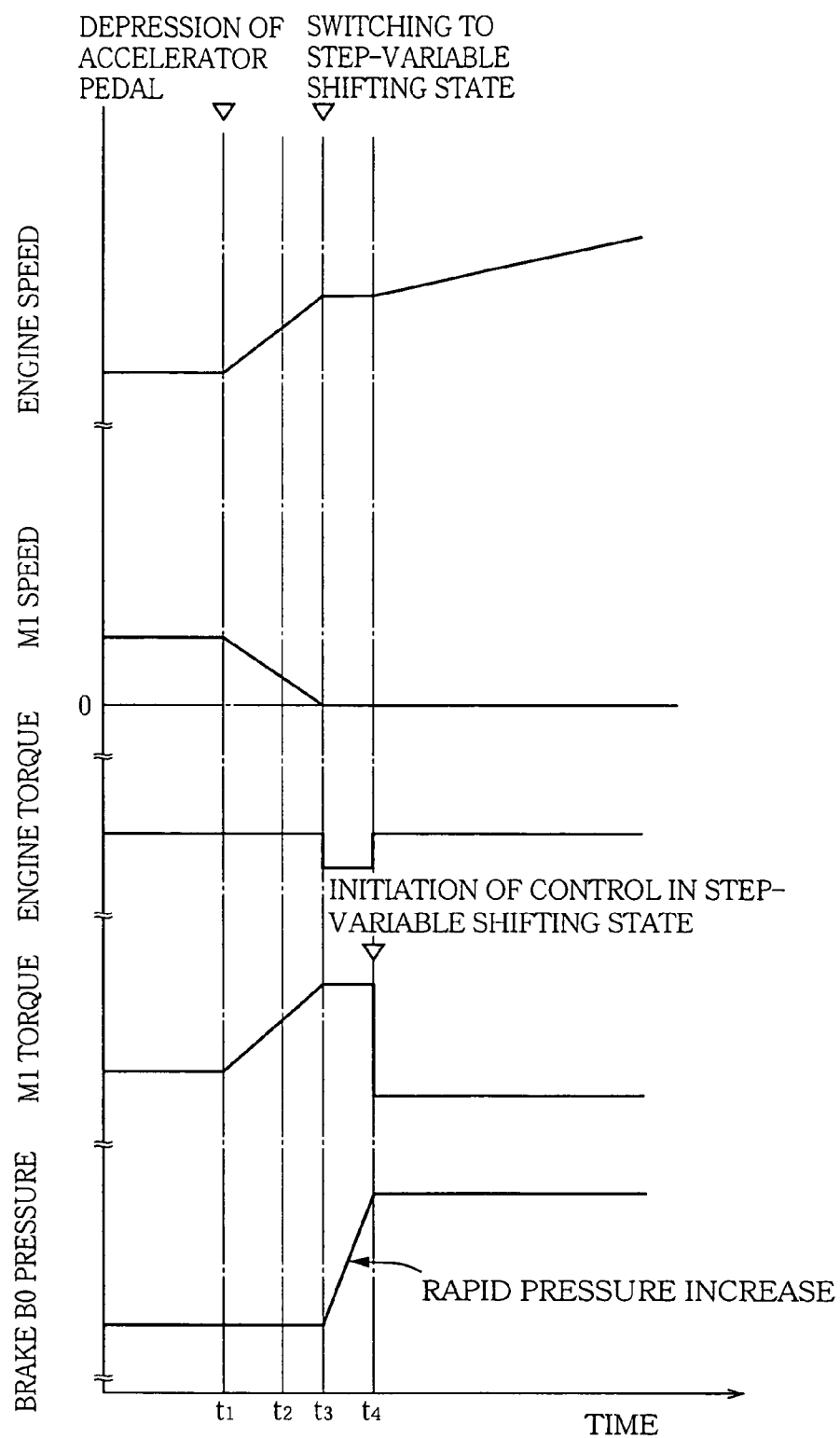
[FIG. 20] This figure is a time chart for explaining the control operation of FIG. 17 performed when the transmission mechanism is switched from the continuously-variable shifting state to the step-variable shifting state by an engaging of the switching brake upon depression of the accelerator pedal.

FIG. 17 is the flow chart illustrating a major control operation performed by the electronic control device 40, that is, a control routine executed upon switching of the transmission mechanism 10 from the continuously-variable shifting state to the step-variable shifting state. This control routine is repeatedly executed with an extremely short cycle time of several microseconds to several tens of microseconds, for example. FIGS. 19 and 20 are the time charts for explaining examples of the control operation illustrated in the flow chart of FIG. 17. The time chart of FIG. 19 shows the control operation performed when the switching clutch C0 is engaged for switching from the continuously-variable shifting state to the step-variable shifting state, while the time chart of FIG. 20 shows the control operation performed when the switching brake is engaged for switching from the continuously-variable shifting state to the step-variable shifting state.

The control routine is initiated with step SB1 (the word "step" being hereinafter omitted) corresponding to the vehicle condition determining means 80, to determine whether the accelerator pedal has been depressed. This determination is made on the basis of the amount of operation of the accelerator pedal. When an affirmative decision is obtained in SB1, the control flow goes to SB2 also corresponding to the vehicle condition determining means 80, to determine whether the vehicle condition as represented by the actual vehicle speed V and the required output torque $T_{OUT}$ calculated on the basis of the operating amount of the accelerator pedal has changed so as to require the transmission mechanism 10 to be switched from the continuously-variable shifting state to the step-variable shifting state. For example, this determination regarding the change of the vehicle condition is made according to a map of FIG. 18. If a negative decision is obtained in SB1 or SB2, the control flow goes to SB8 to maintain the present running state of the vehicle. These steps SB1 and SB2 may be modified into a single step to determine whether the transmission mechanism 10 should be switched from the continuously-variable shifting state to the step-variable shifting state. This determination may be made by determining whether any one of the high-output vehicle running, the high-speed vehicle running and the functional deterioration of the electric path is determined.

When an affirmative decision is obtained in both SB1 and SB2 (at a point of time $t_1$ indicated in FIGS. 19 and 20), the control flow goes to SB3 corresponding to the electric motor control means 82, to control the first electric motor M1 such that the speed of the first sun gear S1, that is, the speed NM1 of the first electric motor M1 is made equal to the engine speed NE, where the step-variable shifting state is established by engaging the switching clutch C0, for example. That is, the first electric motor M1 is controlled to generate the predetermined reaction torque necessary to hold the speed NM1 equal to the engine speed NE. Where the step-variable shifting state is established by engaging the switching brake B0, the speed of the first sun gear S1, that is, the speed NM1 of the first electric motor is controlled to be zero. That is, the first electric motor M1 is controlled to generate the predetermined reaction torque necessary to hold the first sun gear S1 stationary. This control of the reaction torque takes place during the time period from the point of time t1 to a point of time $t_3$ indicated in FIGS. 19 and 20. Then, the control flow goes to SB4 corresponding to the synchronization-control-completion determining means 84, to determine whether the speed of the first sun gear S1 has been made equal to the engine speed NE, where the step-variable shifting state is established by engaging the switching clutch C0. For example, this determination is made by determining whether the speed NM1 of the first electric motor has been made equal to the engine speed NE. Where the step-variable shifting state is established by engaging the switching brake B0, the determination as to whether the speed of the first sun gear S1 has been zeroed is made by determining whether the speed NM1 of the first electric motor has been zeroed, for example.

SB3 is repeatedly implemented until an affirmative decision is obtained in SB4. When a negative decision is obtained in SB4, the control flow goes to SB6 corresponding to the engine-output-control-necessity determining means 86, to determine whether it is necessary to temporarily reduce the engine torque Te or the rate of increase of the engine output, or limit the engine torque Te or the rate of increase of the engine output to a value not higher than the predetermined limit until the engaging action of the switching clutch C0 or brake B0 is completed. If an affirmative decision is obtained in SB6, the control flow goes to SB7 corresponding to the engine output control means 88, to reduce the engine torque (during the time period from the point of time $t_3$ to a point of time $t_4$ indicated in FIGS. 19 and 20), by reducing the angle of opening of the throttle valve or the amount of fuel supply to the engine 8, or retarding the engine ignition timing, for example. If a negative decision is obtained in SB6, or after SB7 is implemented, the control flow goes back to SB3.

If the affirmative decision is obtained in SB4, the control flow goes to SB5 corresponding to the switching control means 50, to initiate the engaging action of the switching clutch C0 or brake B0 (at the point of time $t_3$ indicated in FIGS. 19 and 20). Since the predetermined reaction torque has been generated by the first electric motor M1 when the affirmative decision is obtained in SB4, the switching clutch C0 or brake B0 is not required to generate a reaction torque in the process of the engaging action, so that the hydraulic pressure of the switching clutch C0 or brake B0 is not required to be gradually increased, and is therefore rapidly increased. This rapid increase of the hydraulic pressure takes place during the time period from the point of time $t_3$ to the point of time $t_4$ indicated in FIGS. 19 and 20. After the engaging action of the switching clutch C0 or brake B0 is completed, the first electric motor M1 need not generate the reaction torque, so that the control of the first electric motor M1 to generate the reaction torque is terminated. While the flow chart of FIG. 17 does not show this termination, FIGS. 19 and 20 show the termination of generation of the reaction torque by the first electric motor M1 at the point of time $t_4$, after which the vehicle is controlled with the transmission mechanism placed in the step-variable shifting state.

As a result of execution of the control routine, the switching clutch C0 is engaged while the speed of the first sun gear S1 is equal to the engine speed NE, so that the engaging shock of the switching clutch C0 is reduced. Alternatively, the switching brake B0 is engaged while the first sun gear S1 is stationary with its speed being zeroed, so that the engaging shock of the switching brake B0 is reduced. Further, the speed difference between the input and output speeds of the switching clutch C0 or brake B0 is reduced in the process of its engaging action or in its partially engaged state (during the time period from the point of time $t_3$ to the point of time $t_4$ indicated in FIGS. 19 and 20), so that the load on the switching clutch C0 or brake B0 due to its dragging phenomenon is reduced, whereby the durability of the switching clutch or brake is improved.

As described above, the electric motor control means 82 (SB3) controls the first electric motor M1 of the transmission mechanism 10 including the power distributing mechanism 16 which has the first element RE1 (first carrier CA1) fixed to the engine 8, the second element RE2 (first sun gear S1) fixed to the first electric motor M1 and the third element RE3 (first ring gear R1) fixed to the second electric motor M2 and power transmitting member 18 and includes the switching clutch C0 for connecting the first and second elements RE1, RE2 to each other and the switching brake B0 for fixing the second element RE2 to the casing 12, and which is switchable between the continuously-variable shifting state in which the power distributing mechanism 16 is operable as an electrically controlled continuously variable transmission, and the step-variable shifting state in which the power distributing mechanism 16 is operable as a step-variable transmission. The electric motor control means 82 controls the first electric motor M1 so as to reduce the speed difference between the second element RE2 and the first element RE1 or the speed difference between the second element RE2 and the casing 12, upon engagement of the switching clutch C0 or brake, so that the engaging shock due to the above-indicated speed difference is reduced, with a result of reduction of the switching shock, and the speed difference between the input and output speeds of the switching clutch C0 or brake B0 is reduced, with a result of reduction of the load on the switching clutch or brake in its partially engaged state, and a consequent improvement of the durability of the switching clutch C0 or brake B0. It is also noted that the power distributing mechanism 16 is simply constituted by the three elements, and the switching clutch C0 and brake B0, and the transmission mechanism 10 is easily switched by the switching clutch C0 or brake B0 under the control of the switching control means 50, between the continuously-variable and step-variable shifting states.

The control device according to the present embodiment is further arranged such that the switching control means is operable upon switching of the transmission mechanism 10 from the continuously-variable shifting state to the step-variable shifting state, to initiate the engaging action of the switching clutch C0 or brake B0 after the speed of the first electric motor M1 has been controlled by the electric motor control means 82 so as to reduce the speed differences among the first, second and third elements RE1, RE2, RE3 or the speed difference between the second element RE2 and the casing 12. Accordingly, the speed of each rotary element is controlled to be changed to the value that is to be established after the switching to the step-variable shifting state, so that the switching shock due to the speed difference upon engagement of the switching clutch C0 or brake B0 is reduced, and the difference between the input and output speeds of the switching clutch C0 or brake B0 in its partially engaged state is reduced, whereby the load on the switching clutch or brake is reduced, leading to an improvement of the durability of the switching clutch C0 or brake B0.

The control device according to the present embodiment further includes the engine output control means 88 (SB7) for controlling the torque Te or output of the engine 8, such that the engine torque Te or output is limited so as to prevent it from exceeding the predetermined upper limit determined by the nominal rating of the first electric motor M1, until the engaging action of the switching clutch C0 controlled by the switching control means 50 is completed. Upon switching of the transmission mechanism 10 from the continuously-variable shifting state to the step-variable shifting state in response to a requirement for high-output running of the vehicle, for example, the transmission mechanism 10 is adequately kept in its continuously-variable shifting state before switching to the step-variable shifting state, even where the first electric motor M1 does not have a capacity or output corresponding to a high-output range of the engine 8.

EMBODIMENT 5

Figure 21:
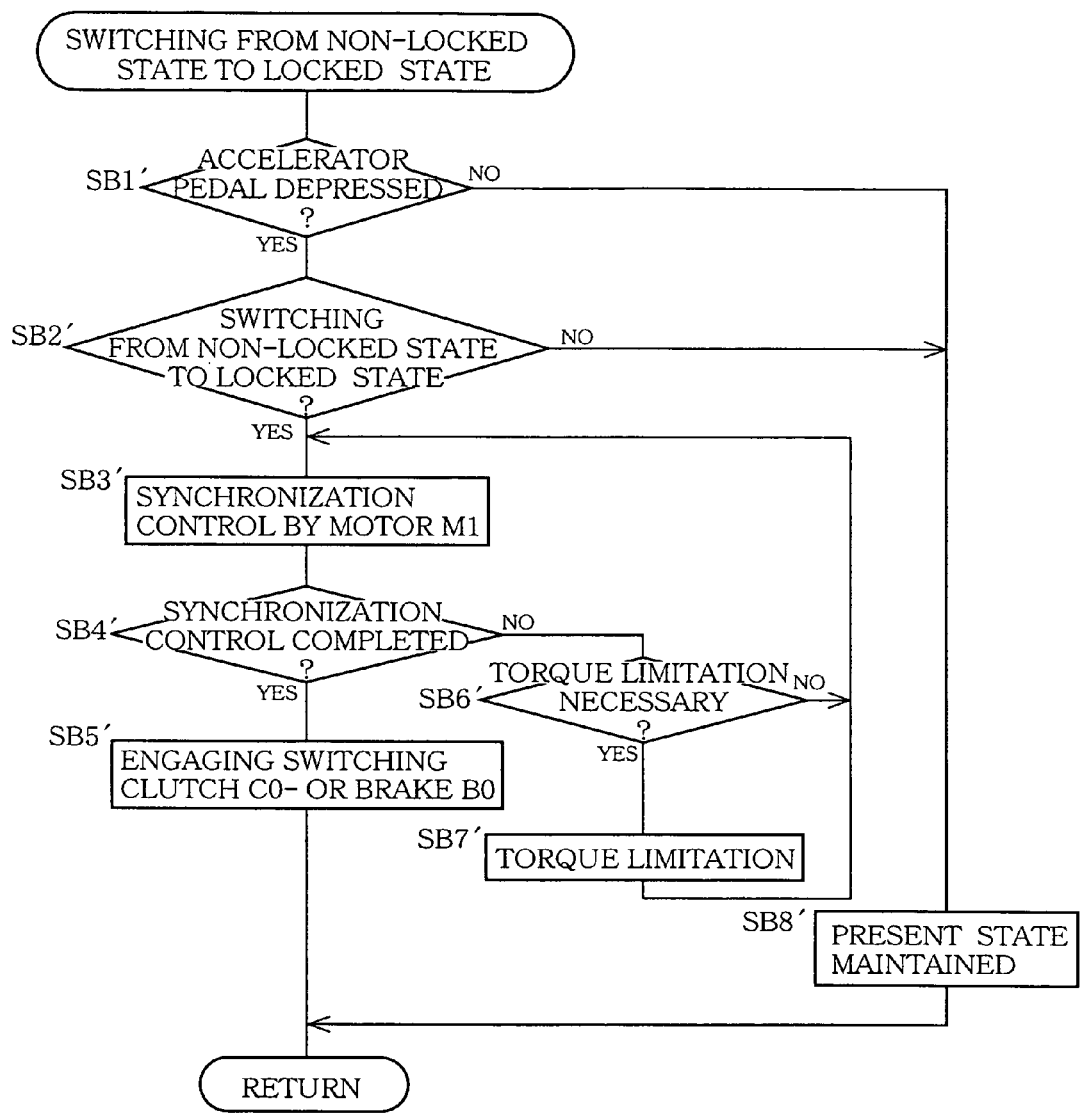
[FIG. 21] This figure is a flow chart illustrating a major control operation performed by the electronic control device of FIG. 4 when the switchable type transmission portion is switched from the non-locked state to the locked state as a result of a depressing action of the accelerator pedal.
Figure 22:
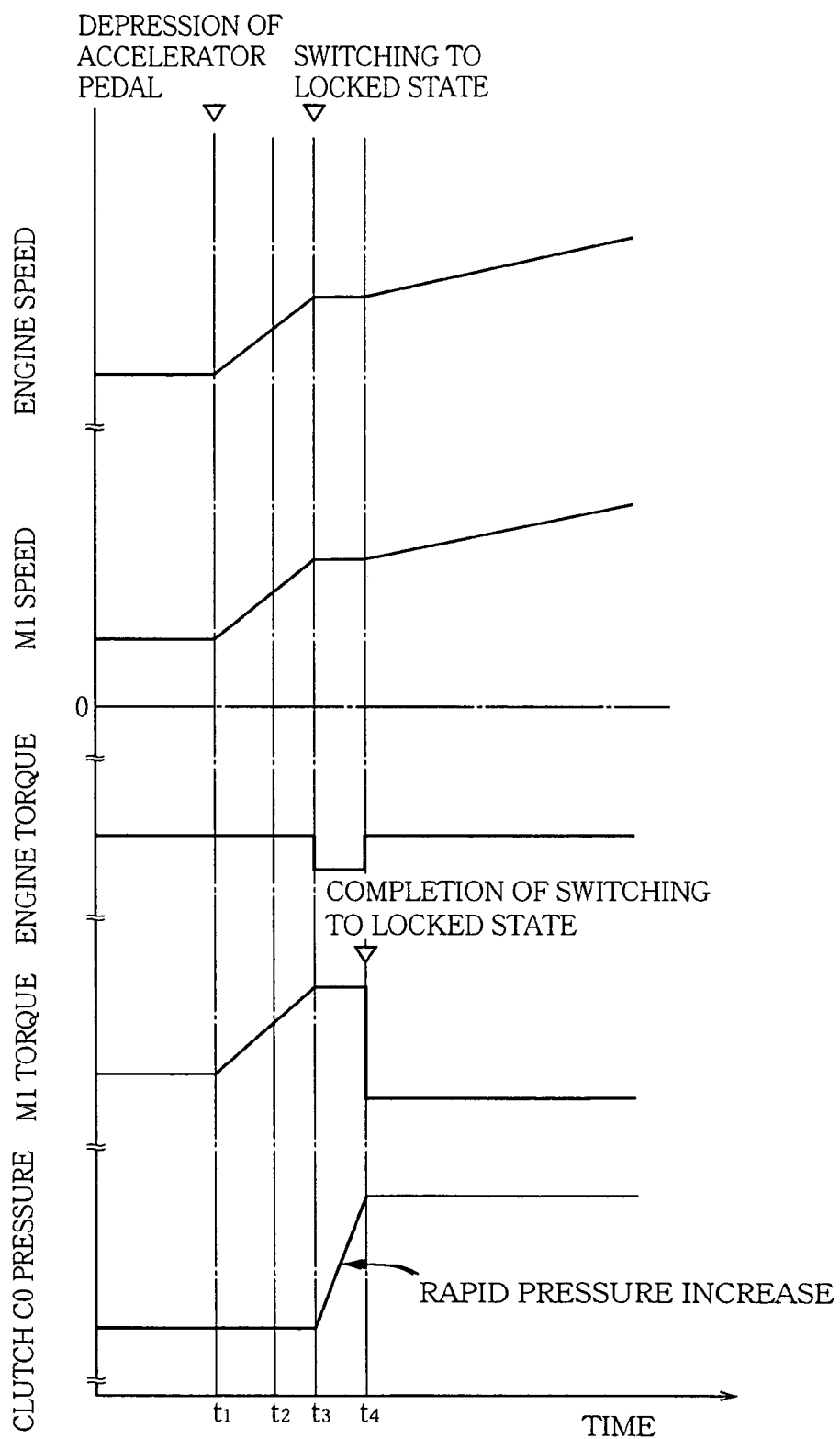
[FIG. 22] This figure is a time chart for explaining the control operation of FIG. 21 performed when the transmission mechanism is switched from the non-locked state to the locked state by an engaging action of the switching clutch upon depression of the accelerator pedal.

FIG. 21 is the flow chart illustrating a major control operation of the electronic control device 40, that is, a control routine executed upon switching of the switchable type transmission portion 11 (that is, power distributing mechanism 16) from the differential state (non-locked state) to the locked state. This control routine is repeatedly executed with an extremely short cycle time of several microseconds to several tens of microseconds, for example. FIG. 22 is the time chart for explaining an example of the control operation illustrated in the flow chart of FIG. 21, which is performed when the non-locked state is switched to the locked state established by the engaging action of the switching clutch C0.

The control routine of the flow chart of FIG. 21 is different from that of the flow chart of FIG. 17 in that the control routine of FIG. 21 applies to the switching of the switchable transmission portion 11 from the non-locked state to the locked state by engaging the switching clutch C0 or brake B0, so as to reduce the switching shock. In this respect, it is noted that the switching of the transmission mechanism 10 from the continuously-variable shifting state to the step-variable shifting state can be considered equivalent to the switching of the switchable type transmission portion 11 from the non-locked state to the locked state.

The control routine is initiated with SB1' corresponding to the vehicle condition determining means 80, to determine whether the accelerator pedal has been depressed. This determination is made on the basis of the amount of operation of the accelerator pedal. When an affirmative decision is obtained in SB1', the control flow goes to SB2' also corresponding to the vehicle condition determining means 80, to determine whether the vehicle condition as represented by the actual vehicle speed V and the required output torque $T_{OUT}$ calculated on the basis of the operating amount of the accelerator pedal has changed so as to require the switchable transmission portion 11 to be switched from the non-locked state to the locked state. For example, this determination regarding the change of the vehicle condition is made according to the map of FIG. 18. If a negative decision is obtained in SB1' or SB2', the control flow goes to SB8' to maintain the present running state of the vehicle. These steps SB1' and SB2' may be modified into a single step to determine whether the switchable transmission portion 11 should be switched from the non-locked state to the locked state. This determination may be made by determining whether any one of the high-output vehicle running, the high-speed vehicle running and the functional deterioration of the electric path is determined.

When an affirmative decision is obtained in both SB1' and SB2' (at the point of time $t_1$ indicated in FIG. 22), the control flow goes to SB3' corresponding to the electric motor control means 82, to control the first electric motor M1 such that the speed of the first sun gear S1, that is, the speed NM1 of the first electric motor M1 is made equal to the engine speed NE, where the locked state is established by engaging the switching clutch C0, for example. That is, the first electric motor M1 is controlled to generate the predetermined reaction torque necessary to hold the speed NM1 equal to the engine speed NE. Where the locked state is established by engaging the switching brake B0, the speed of the first sun gear S1, that is, the speed NM1 of the first electric motor is controlled to be zero. That is, the first electric motor M1 is controlled to generate the predetermined reaction torque necessary to hold the first sun gear S1 stationary. This control of the reaction torque takes place during the time period from the point of time $t_1$ to the point of time t3 indicated in FIG. 22. Then, the control flow goes to SB4' corresponding to the synchronization-control-completion determining means 84, to determine whether the speed of the first sun gear S1 has been made equal to the engine speed NE, where the locked state is established by engaging the switching clutch C0. For example, this determination is made by determining whether the speed NM1 of the first electric motor has been made equal to the engine speed NE. Where the locked state is established by engaging the switching brake B0, the determination as to whether the speed of the first sun gear S1 has been zeroed is made by determining whether the speed NM1 of the first electric motor has been zeroed, for example.

SB3' is repeatedly implemented until an affirmative decision is obtained in SB4'. When a negative decision is obtained in SB4', the control flow goes to SB6' corresponding to the engine-output-control-necessity determining means 86, to determine whether it is necessary to temporarily reduce the engine torque Te or the rate of increase of the engine output, or limit the engine torque Te or the rate of increase of the engine output to a value not higher than the predetermined limit until the engaging action of the switching clutch C0 or brake B0 is completed. If an affirmative decision is obtained in SB6', the control flow goes to SB7' corresponding to the engine output control means 88, to reduce the engine torque (during the time period from the point of time $t_3$ to the point of time $t_4$ indicated in FIG. 22), by reducing the angle of opening of the throttle valve or the amount of fuel supply to the engine 8, or retarding the engine ignition timing, for example. If a negative decision is obtained in SB6', or after SB7' is implemented, the control flow goes back to SB3'.

If the affirmative decision is obtained in SB4', the control flow goes to SB5' corresponding to the switching control means 50, to initiate the engaging action of the switching clutch C0 or brake B0 (at the point of time $t_3$ indicated in FIG. 22). Since the predetermined reaction torque has been generated by the first electric motor M1 when the affirmative decision is obtained in SB4', the switching clutch C0 or brake B0 is not required to generate a reaction torque in the process of the engaging action, so that the hydraulic pressure of the switching clutch C0 or brake B0 is not required to be gradually increased, and is therefore rapidly increased. This rapid increase of the hydraulic pressure takes place during the time period from the point of time $t_3$ to the point of time $t_4$ indicated in FIG. 22. After the engaging action of the switching clutch C0 or brake B0 is completed, the first electric motor M1 need not generate the reaction torque, so that the control of the first electric motor M1 to generate the reaction torque is terminated. While the flow chart of FIG. 21 does not show this termination, FIG. 22 shows the termination of generation of the reaction torque by the first electric motor M1 at the point of time $t_4$, after which the vehicle is controlled with the switchable transmission portion placed in the locked state.

As a result of execution of the control routine, the switching clutch C0 is engaged while the speed of the first sun gear S1 is equal to the engine speed NE, so that the engaging shock of the switching clutch C0 is reduced. Alternatively, the switching brake B0 is engaged while the first sun gear S1 is stationary with its speed being zeroed, so that the engaging shock of the switching brake B0 is reduced. Further, the speed difference between the input and output speeds of the switching clutch C0 or brake B0 is reduced in the process of its engaging action or in its partially engaged state (during the time period from the point of time $t_3$ to the point of time $t_4$ indicated in FIG. 22), so that the load on the switching clutch C0 or brake B0 due to its dragging phenomenon is reduced, whereby the durability of the switching clutch or brake is improved.

The control device according to the present embodiment has the same advantages as the control device according to the preceding embodiment, regarding the switching control upon switching of the shifting state of the transmission mechanism 10 by engaging the switching clutch C0 or brake B0, since the switching of the transmission mechanism 10 from the continuously-variable shifting state to the step-variable shifting state can be considered equivalent to the switching of the switchable type transmission portion 11 from the non-locked state to the locked state.

EMBODIMENT 6

In the preceding embodiments, the engaging action of the switching clutch C0 or brake B0 is initiated by the switching control means 50 only after the speed differences among the first element RE1, second element RE3 and third element RE3, or the speed difference between the second element RE2 and the casing 12 is reduced with the speed of the first electric motor M1 controlled by the electric motor control means 82 to reduce the switching shock upon engagement of the switching clutch C0 or brake B0. The present embodiment is different from the preceding embodiments in that the switching control means 50 in the present embodiment controls the engaging action of the switching clutch C0 or brake B0 in the process of the speed control of the first electric motor M1 by the electric motor control means 82 to reduce the speed differences among the first, second and third elements RE1, RE2 and RE3 or the speed difference between the second element RE2 and the casing 12, for reducing the switching shock upon engagement of the switching clutch C0 or brake B0 under the control of the switching control means 50 to switch the transmission mechanism 10 from the continuously-variable shifting state to the step-variable shifting state, or for switching of the switchable type transmission portion 11 (power distributing mechanism 16) from the non-locked state to the locked state. Further, the electric motor control means 82 in the present embodiment is arranged to reduce the reaction torque of the first electric motor M1 in the process of the engaging action of the switching clutch C0 or brake B0 under the control of the switching control means 50.

Described in detail, the electric motor control means 82 controls the first electric motor M1 such that the speed of the first sun gear S1 is made equal to the engine speed NE, for reducing the engaging shock of the switching clutch C0, while the switching control means 50 controls the switching clutch C0 such that the switching clutch C0 is slowly engaged. Namely, the present embodiment is arranged to implement the so-called "overlapping switching and motor controls" in which the engaging action of the switching clutch C0 under the control of the switching control means 50 takes place concurrently with the speed control of the first electric motor M1 by the electric motor control means 82, that is, with the control of the torque of the first electric motor M1 so as to hold its speed NM1 equal to the engine speed NE.

As a result, the reaction torque generated by the first electric motor M1 is gradually reduced under the control of the electric motor control means 82 while the reaction torque of the switching clutch C0 is gradually increased in the process of its engaging action, so that the reaction torque of the first electric motor M1 is replaced by the reaction torque of the switching clutch C0 in the process of its engaging action. For example, the speed of the first sun gear S1, that is, the speed NM1 of the first electric motor is feedback-controlled so as to be held equal to the engine speed NE while the switching clutch C0 is slowly engaged.

Alternatively, the electric motor control means 82 controls the first electric motor M1 such that the speed of the first sun gear S1 is zeroed for reducing the engaging shock of the switching brake B0, while the switching control means 50 controls the switching brake B0 such that the switching brake B0 is slowly engaged. Namely, the present embodiment is arranged to implement the so-called "overlapping switching and motor controls" in which the engaging action of the switching brake B0 under the control of the switching control means 50 takes place concurrently with the torque control of the first electric motor M1 by the electric motor control means 82 so as to zero the speed NM1 of the first electric motor M1.

As a result, the reaction torque generated by the first electric motor M1 is gradually reduced under the control of the electric motor control means 82 while the reaction torque of the switching brake B0 is gradually increased in the process of its engaging action, so that the reaction torque of the first electric motor M1 is replaced by the reaction torque of the switching brake B0 in the process of its engaging action. For example, the speed NM1 of the first electric motor is feedback-controlled so as to be held zero while the switching brake B0 is slowly engaged.

Figure 23:
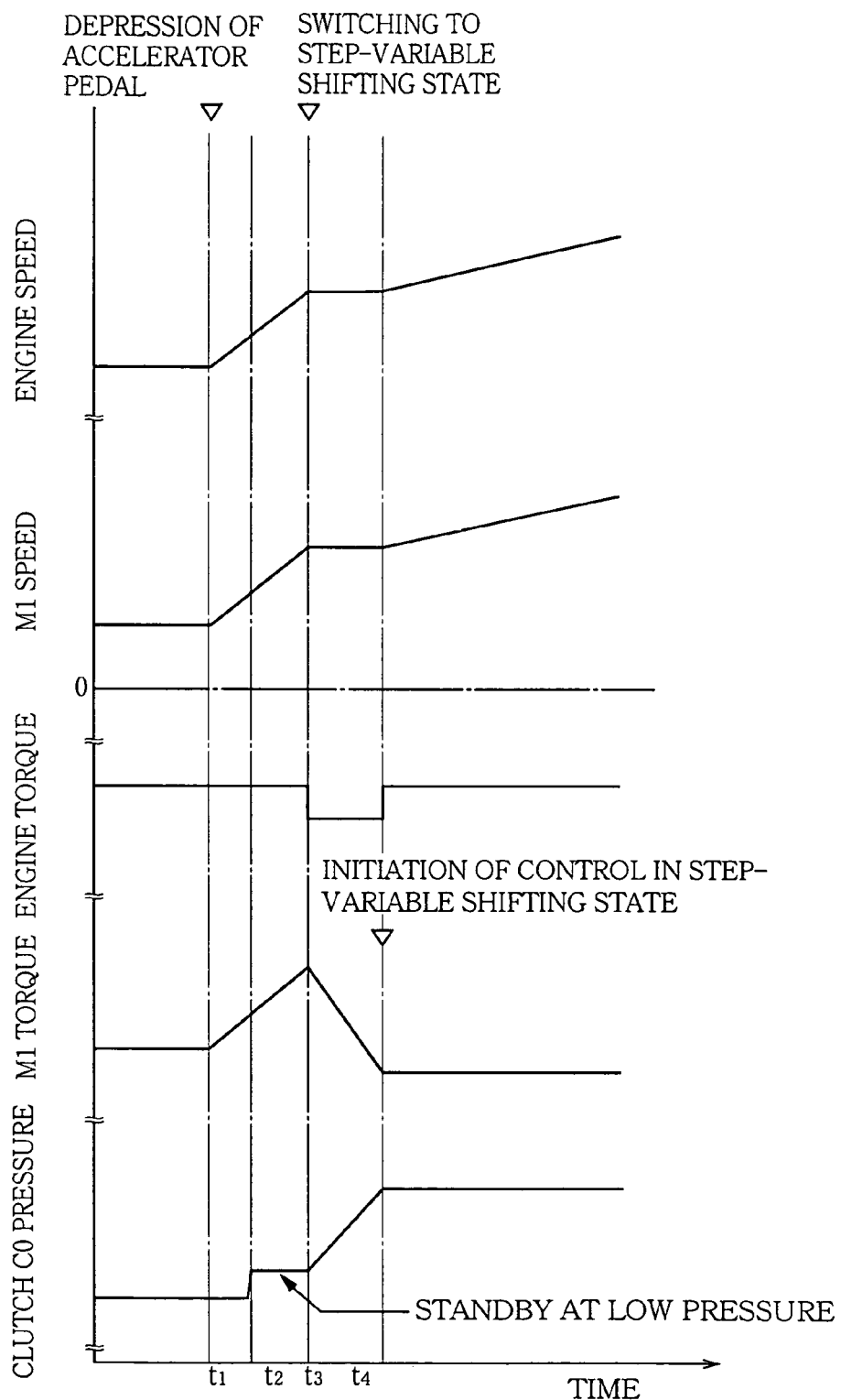
[FIG. 23] This figure is a time chart for explaining the control operation of FIG. 17 performed in an embodiment alternative to the embodiment of FIG. 19, when the transmission mechanism is switched from the continuously-variable shifting state to the step-variable shifting state by the engaging action of the switching clutch upon depression of the accelerator pedal.
Figure 24:
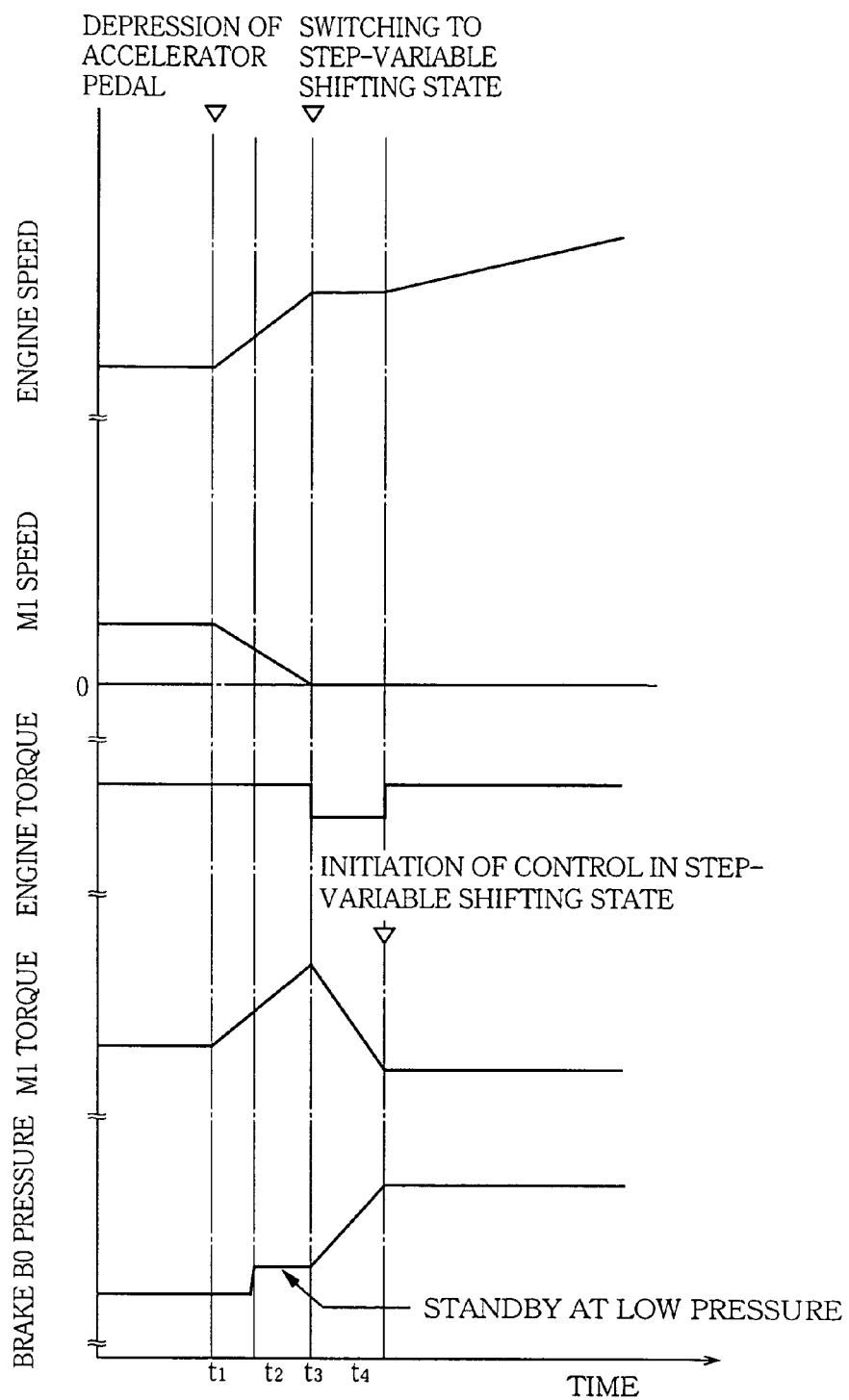
[FIG. 24] This figure is a time chart for explaining the control operation of FIG. 17 performed in an embodiment alternative to the embodiment of FIG. 20, when the transmission mechanism is switched from the continuously-variable shifting state to the step-variable shifting state by an engaging action of the switching brake upon depression of the accelerator pedal.
Figure 25:
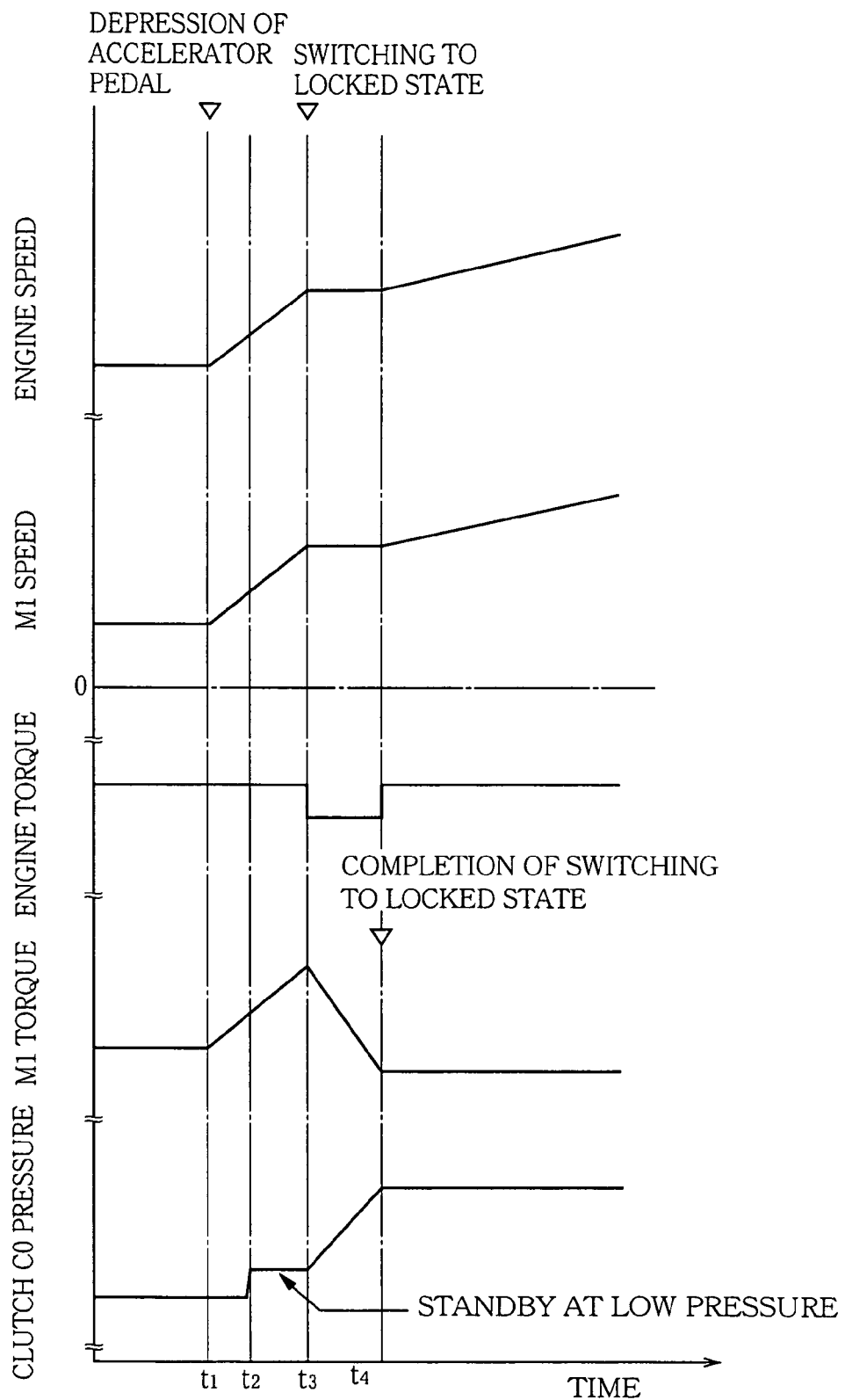
[FIG. 25] This figure is a time chart for explaining the control operation of FIG. 21 performed in an embodiment alternative to the embodiment of FIG. 22, when the transmission mechanism is switched from the non-locked state to the locked state by the engaging action of the switching clutch upon depression of the accelerator pedal.

FIG. 23 is the time chart for explaining the control operation upon switching from the continuously-variable shifting state to the step-variable shifting state by the engaging action of the switching clutch C0. The example shown in the time chart of FIG. 23 is alternative to the example shown in the time chart of FIG. 19. FIG. 24 is the time chart for explaining the control operation upon switching from the continuously-variable shifting state to the step-variable shifting state by the engaging action of the switching brake B0. The example shown in the time chart of FIG. 24 is alternative to the example shown in the time chart of FIG. 20. FIG. 25 is the time chart for explaining the control operation upon switching from the non-locked state to the locked state by the engaging action of the switching clutch C0. The example shown in the time chart of FIG. 25 is alternative to the time chart of FIG. 22.

While the examples of FIGS. 19, 20 and 22 are arranged such that the hydraulic pressure of the switching clutch C0 or brake B0 is rapidly increased while the predetermined reaction torque of the first electric motor M1 is generated, the examples of FIGS. 23-25 are arranged to implement the overlapping switching and motor controls in which the engaging action of the switching clutch C0 or brake B0 takes place concurrently with the speed control of the first electric motor M1 so as to generate the predetermined reaction torque. Accordingly, the examples of FIGS. 23 and 24 are different from the examples of FIGS. 19 and 20 in that the steps SB3 and SB4 of FIG. 17 are implemented concurrently with the step SB5 in the examples of FIGS. 23 and 24. Similarly, the example of FIG. 25 is different from the example of FIG. 22 in that the steps SB3' and SB4' of FIG. 21 are implemented concurrently with the step SB5' in the example of FIG. 25.

Described in detail, the switching clutch C0 is engaged at a lower speed in the example of FIG. 23 during the time period from a point of time $t_3$ to a point of time $t_4$, than in the example of FIG. 19 in which the switching clutch C0 is rapidly engaged during the time period from the point of time $t_3$ to the point of time $t_4$), while the speed of the first sun gear S1, that is, the speed NM1 of the first electric motor is feedback-controlled so as to be held equal to the engine speed NE, in the process of the engaging action of the switching clutch C0. Namely, the torque of the first electric motor M1 is controlled in the process of the engaging action of the switching clutch C0, such that the speed NM1 of the first electric motor is held equal to the engine speed NE. After the point of time $tr_4$ indicated in FIG. 23, the vehicle control in the step-variable shifting state of the transmission mechanism 10 is implemented.

Similarly, the switching brake B0 is engaged at a lower speed in the example of FIG. 24 during the time period from the point of time $t_3$ to the point of time $t_4$, than in the example of FIG. 20 in which the switching brake B0 is rapidly engaged during the time period from the point of time $t_3$ to the point of time $t_4$), while the speed of the first sun gear S1, that is, the speed NM1 of the first electric motor is feedback-controlled so as to be held zero, in the process of the engaging action of the switching brake B0. Namely, the torque of the first electric motor M1 is gradually reduced in the process of the engaging action of the switching brake B0, such that the speed NM1 of the first electric motor is held zero. After the point of time $t_4$ indicated in FIG. 24, the vehicle control in the step-variable shifting state of the transmission mechanism 10 is implemented.

Similarly, the switching clutch C0 is engaged at a lower speed in the example of FIG. 25 during the time period from the point of time $t_3$ to the point of time $t_4$, than in the example of FIG. 22 in which the switching clutch C0 is rapidly engaged during the time period from the point of time $t_3$ to the point of time $t_4$), while the speed of the first sun gear S1, that is, the speed NM1 of the first electric motor is feedback-controlled so as to be held equal to the engine speed NE, in the process of the engaging action of the switching clutch C0. Namely, the torque of the first electric motor M1 is gradually reduced in the process of the engaging action of the switching clutch C0, such that the speed NM1 of the first electric motor is held equal to the engine speed NE. After the point of time $t_4$ indicated in FIG. 25 the vehicle control in the locked of the switchable type transmission portion 11 is implemented.

As a result, the switching clutch C0 is engaged while the speed of the first sung gear S1 is controlled to be equal to the engine speed NE so that the engaging shock of the switching clutch C0 is reduced. Alternatively, the switching brake B0 is engaged while the speed of the first sun gear S1 is controlled to be zeroed, so that the engaging shock of the switching brake B0 is reduced. Further, the difference between the input and output speeds of the switching clutch C0 or brake B0 in its engaging action or in its partially engaged state (during the time period from the point of time $t_3$ to the point of time $t_4$ indicated in FIGS. 23-25) is reduced, with a result of reduction of the load on the switching clutch or brake due to the dragging phenomenon, so that the durability of the switching clutch or brake is increased.

In the examples of FIGS. 23, 24 and 25, the rate of gradual reduction of the torque of the first electric motor M1 or the rate of increase of the hydraulic pressure of the switching clutch C0 or brake B0 may be controlled depending upon the vehicle speed V or engine torque Te, so as to effect the so-called overlapping switching and motor controls such that the motor torque is reduced while at the same time the switching clutch C0 or brake B0 is engaged.

As described above, the control device according to the present embodiment is arranged such that the switching control means 50 is operable upon switching of the transmission mechanism 10 from the continuously-variable shifting state to the step-variable shifting state, that is, upon switching of the switchable type transmission portion 11 (power distributing mechanism 16) from the non-lock state to the locked state, to effect an engaging action of the switching clutch C0 or B0 in the process of control of the speed of the first electric motor M1 by the electric motor control means 82 so as to reduce the speed differences among the first, second and third elements RE1, RE2, RE3 or the speed difference between the second element RE2 and the casing 12r. According to this arrangement, the speed of each rotary element is controlled to be changed to the value that is to be established after the switching to the step-variable shifting state, so that the switching shock due to the speed difference upon engagement of the coupling device is reduced, and the difference between the input and output speeds of the coupling device in its partially engaged state is reduced, whereby the load on the coupling is reduced, with a result of an improvement in the durability of the coupling device.

controls the engaging action of the switching clutch C0 or brake B0 in the process of the speed control of the first electric motor M1 by the electric motor control means 82 so as to reduce the speed differences among the first element RE1, second element RE2 and third element RE3 or the speed difference between the second element RE2 and the casing 12, upon switching of the transmission mechanism 10 from the continuously-variable shifting state to the step-variable shifting state, or upon switching of the switchable transmission portion 11 (power distributing mechanism 16) from the non-locked state to the locked state. Accordingly, the speed of each rotary element is controlled to be a value that is to be established when the engaging action of the switching clutch C0 or brake B0 is completed, so that the switching shock due to the speed difference upon engagement of the switching clutch C0 or brake B0 is reduced. Further, the difference between the input and output speeds of the switching clutch C0 or brake B0 in its partially engaged state is reduced, so that the load on the switching clutch or brake is reduced, with a result of an improvement of the switching clutch C0 or brake B0.

Unlike the preceding embodiments wherein the engaging action of the switching clutch C0 or brake B0 is initiated after the reduction of the speed differences among the first, second and third elements RE1, RE2 and RE3 or the speed difference between the second element RE2 and the casing 12, so as to reduce the switching shock upon engagement of the switching clutch C0 or brake B0, the present embodiment is arranged to initiate the engaging action of the switching clutch C0 or brake B0 in the process of reduction of the above-indicated speed differences among the first, second and third elements RE1, RE2 and RE3 or the above-indicated speed difference between the second element RE2 and the casing 12. The present embodiment has the same advantages as the preceding embodiments, except for the control difference described above.

EMBODIMENT 7

Figures 26, 27:
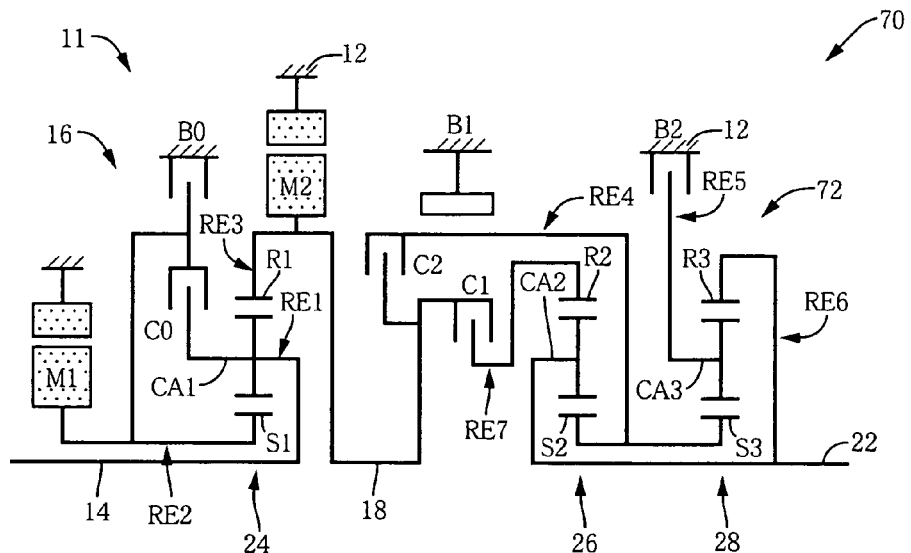
[FIG. 26] This figure is a schematic view corresponding to that of FIG. 1, showing an arrangement of a hybrid vehicle drive system according to another embodiment of the present invention.
[FIG. 27] This figure is a table corresponding to that of FIG. 2, indicating shifting actions of the hybrid vehicle drive system of the embodiment of FIG. 26, which is operable in a continuously-variable shifting state and a step-variable shifting state, in relation to different combinations of operating states of hydraulically operated frictional coupling devices to effect the respective shifting actions.
Figure 28:
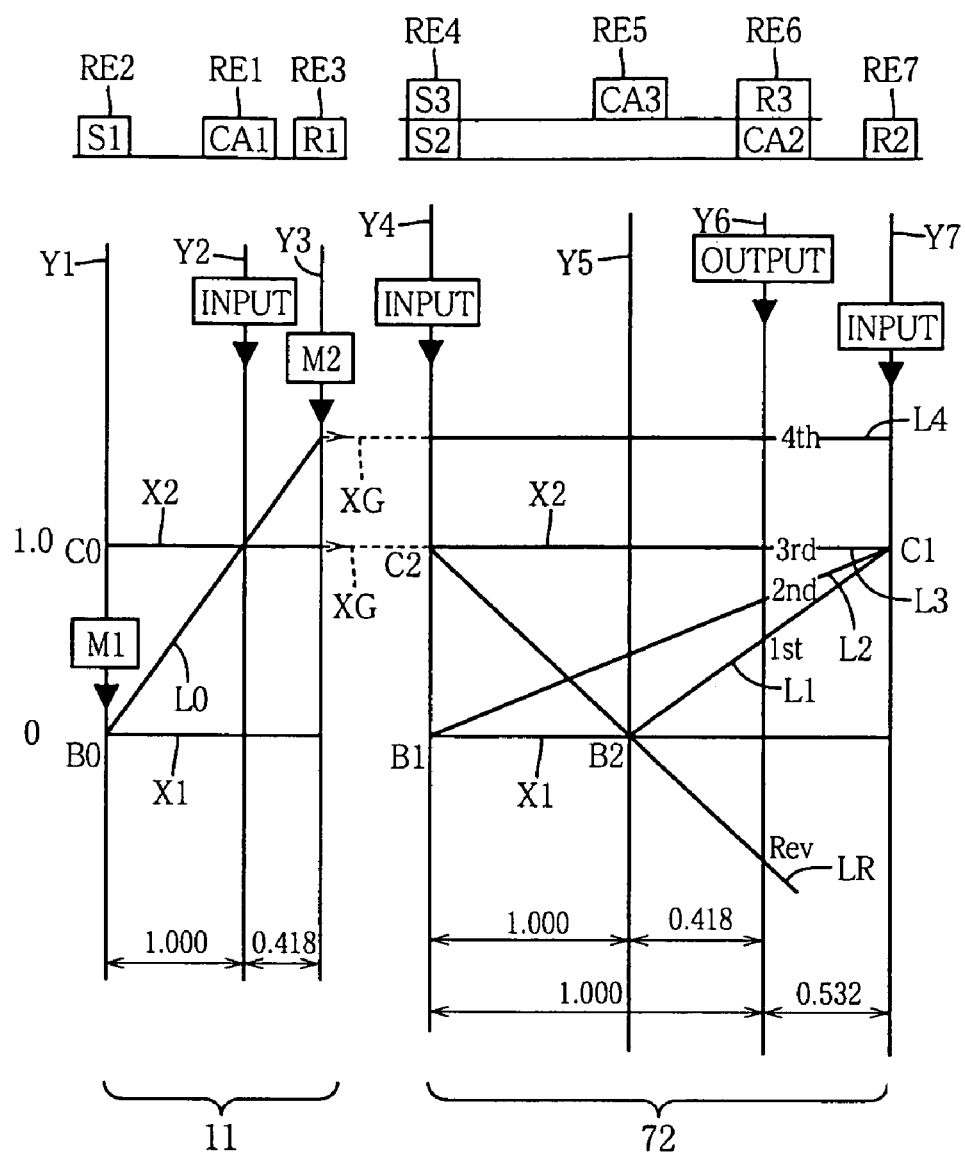
[FIG. 28] This figure is a collinear chart corresponding to that of FIG. 3, indicating relative rotating speeds of the rotary elements of the hybrid vehicle drive system of the embodiment of FIG. 26 operated in the step-variable shifting state in the different gear positions.

FIG. 26 is a schematic view showing an arrangement of a transmission mechanism 70, which is controllable by the control device according to the present invention, and FIG. 27 is a table indicating a relationship between the gear positions of the transmission mechanism 70 and different combinations of operating states of hydraulically operated frictional coupling devices for establishing the respective gear positions, while FIG. 28 is a collinear chart for explaining a shifting operation of the transmission mechanism 70.

The transmission mechanism 70 includes the switchable transmission portion 11 having the first electric motor M1, power distributing mechanism 16 and second electric motor M2, as in the first embodiment. The transmission mechanism 70 further includes an automatic transmission portion 72 having three forward drive positions. The automatic transmission portion 72 is disposed between the switchable transmission portion 11 and the output shaft 22 and is connected in series to the switchable transmission portion 11 and output shaft 22, through the power transmitting member 18. The power distributing mechanism 16 includes the first planetary gear set 24 of single-pinion type having a gear ratio $\rho 1$ of about 0.418, for example, and the switching clutch C0 and the switching brake B0, as in the first embodiment. The automatic transmission portion 72 includes a single-pinion type second planetary gear set 26 having a gear ratio $\rho 2$ of about 0.532, for example, and a single-pinion type third planetary gear set 28 having a gear ratio $\rho 3$ of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the transmission casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the transmission casing 12 through the second brake B2.

In the transmission mechanism 70 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 27. Those gear positions have respective speed ratios $\gamma$ (input shaft speed $N_{IN}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as a continuously variable transmission described above. In the present transmission mechanism 70, therefore, a step-variable transmission is constituted by the automatic transmission portion 20, and the switchable transmission portion 11 which is placed in the fixed-speed-ratio shifting state by engagement of the switching clutch C0 or switching brake B0. Further, a continuously variable transmission is constituted by the automatic transmission portion 20, and the switchable transmission portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio $\gamma 1$ of about 2.804, for example, is established by engaging actions of the switching clutch C0, first clutch C1 and second brake B2, and the second gear position having the speed ratio $\gamma 2$ of about 1.531, for example, which is lower than the speed ratio $\gamma 1$, is established by engaging actions of the switching clutch C0, first clutch C1 and first brake B1, as indicated in FIG. 23. Further, the third gear position having the speed ratio $\gamma 3$ of about 1.000, for example, which is lower than the speed ratio $\gamma 2$, is established by engaging actions of the switching clutch C0, first clutch C1 and second clutch C2, and the fourth gear position having the speed ratio $\gamma 4$ of about 0.705, for example, which is lower than the speed ratio $\gamma 3$, is established by engaging actions of the first clutch C1, second clutch C2, and switching brake B0. Further, the reverse gear position having the speed ratio $\gamma R$ of about 2.393, for example, which is intermediate between the speed ratios $\gamma 1$ and $\gamma 2$, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 indicated in FIG. 27 are both released, so that the switchable transmission portion 11 functions as the continuously variable transmission, while the automatic transmission portion 72 connected in series to the switchable transmission portion 11 functions as the step-variable transmission, whereby the speed of the rotary motion transmitted to the automatic transmission portion 72 placed in one of the first through third gear positions, namely, the rotating speed of the power transmitting member 18 is continuously changed, so that the speed ratio of the transmission mechanism 10 when the automatic transmission portion 72 is placed in one of those gear positions is continuously variable over a predetermined range. Accordingly, the speed ratio of the automatic transmission portion 72 is continuously variable across the adjacent gear positions, whereby the overall speed ratio $\gamma T$ of the transmission mechanism 70 is continuously variable.

The collinear chart of FIG. 28 indicates, by straight lines, a relationship among the rotating speeds of the rotary elements in each of the gear positions of the transmission mechanism 70, which is constituted by the switchable transmission portion 11 functioning as the continuously-variable shifting portion or first shifting portion, and the automatic transmission portion 72 functioning as the step-variable shifting portion or second shifting portion. The collinear chart of FIG. 28 indicates the rotating speeds of the individual elements of the power distributing mechanism 16 when the switching clutch C0 and brake B0 are both released, and the rotating speeds of those elements when the switching clutch C0 or brake B0 is engaged, as in the preceding embodiments When the first clutch C1 and the second brake B2 are engaged, the automatic transmission portion 72 is placed in the first gear position. The rotating speed of the output shaft 22 in the first gear position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 (R2) and the horizontal line X2, and a point of intersection between the vertical line Y5 indicative of the rotating speed of the fifth rotary element RE5 (CA3) and the horizontal line X1, as indicated in FIG. 28. Similarly, the rotating speed of the output shaft 22 in the second gear position established by the engaging actions of the first clutch C1 and first brake B1 is represented by a point of intersection between an inclined straight line L2 determined by those engaging actions and the vertical line Y6 indicative of the rotating speed of the sixth rotary element RE6 (CA2, R3) fixed to the output shaft 22. The rotating speed of the output shaft 22 in the third speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed NE, with the drive force received from the switchable transmission portion 11. When the switching brake B0 is engaged in place of the switching clutch C0, the sixth rotary element RE6 is rotated at a speed higher than the engine speed NE, with the drive force received from the switchable transmission portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The transmission mechanism 70 is also constituted by the switchable transmission portion 11 functioning as the continuously-variable shifting portion or first shifting portion, and the automatic transmission portion 72 functioning as the step-variable shifting portion or second shifting portion, so that the present transmission mechanism 70 has advantages similar to those of the first embodiment.

EMBODIMENT 8

Figure 29:
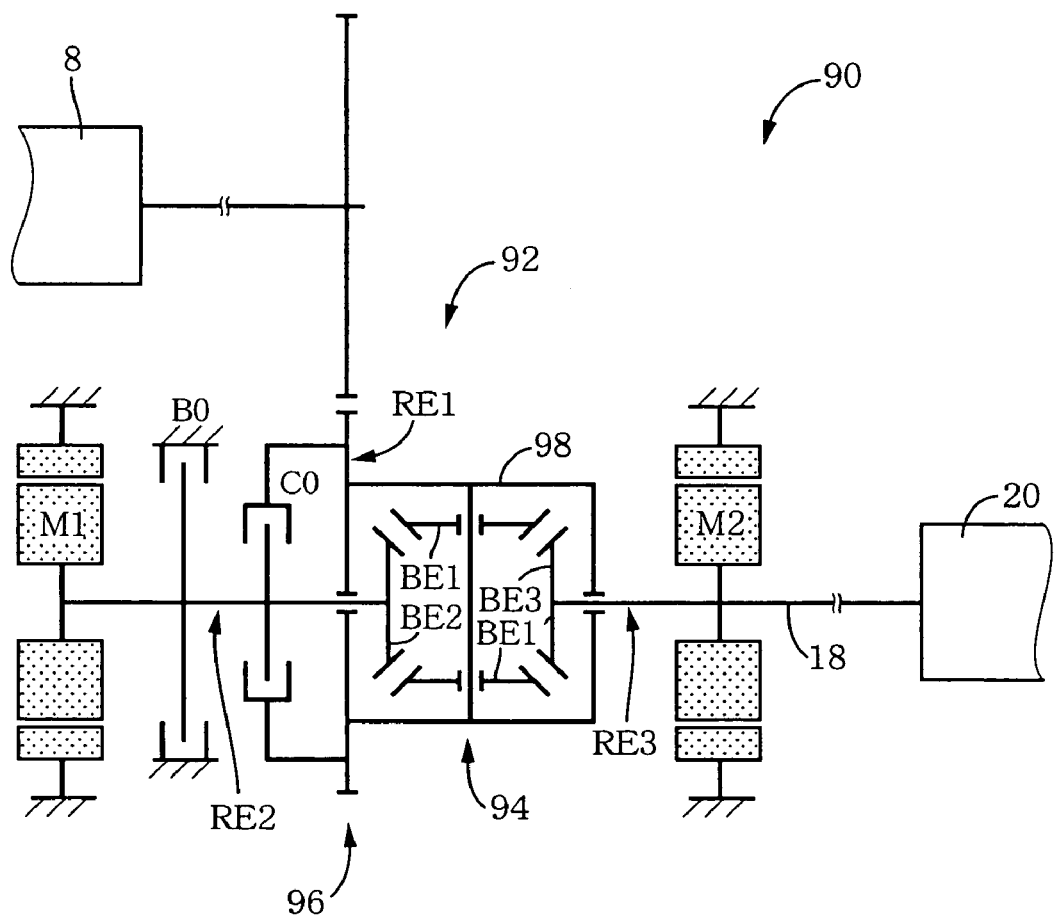
[FIG. 29] This figure is a schematic view for explaining a power distributing mechanism provided in a switchable type transmission portion according to a further embodiment of this invention, in place of the power distributing mechanism of the switchable type transmission portion in the embodiment of FIG. 1.

FIG. 29 is a schematic view for explaining a power distributing mechanism 92 of a switchable transmission portion 90, which is alternative to the power distributing mechanism 16 in the preceding embodiments.

The power distributing mechanism 92 includes, as major components, a well-known bevel-gear type differential gear device 94, the switching clutch C0 and the switching brake B0. This differential gear device 94 includes: first bevel gears BE1; a gear casing 98 supporting the first bevel gears BE1 such that each first bevel gear BE1 is rotatable about its axis and an axis of the differential gear device 94; a second bevel gear BE2; and a third bevel gear BE3 which meshes with the second bevel gear BE2 through the first bevel gears BE1. The gear casing 92 corresponds to the first element RE1, and the second bevel gear BE2 corresponds to the second element RE2, while the third bevel gear BE3 corresponds to the third element RE3.

In this power distributing mechanism 92, the gear casing 92 is operatively connected to a pair of counter gears 96 which corresponds to the input shaft 14 and which has a gear ratio of 1.0, for example. Namely, the gear casing 92 is operatively connected to the engine 8 through the pair of counter gears 96. The second bevel gear BE2 is fixed to the first electric motor M1, while the third bevel gear BE3 is fixed to the power transmitting member 18. The switching brake B0 is disposed between the second bevel gear BE2 and the gear casing 92, while the switching clutch C0 is disposed between the second bevel gear BE2 and the gear casing 92. When these switching clutch C0 and brake B0 are in the released state, the gear casing 92 and the second and third bevel gears BE2, BE3 are rotatable relative to each other, so that the output of the engine 8 is distributed to the first electric motor M1 and the power transmitting member 18, and a portion of the output of the engine 8 distributed to the first electric motor M1 is converted into an electric energy, which is stored or supplied to the second electric motor M2. Thus, the power distributing mechanism 92 is placed in the so-called continuously-variable shifting state (electric CVT state) in which the speed of the power transmitting member 18 is continuously variable irrespective of the speed of the engine 8. Namely, the switchable transmission portion 11 is placed in the continuously-variable shifting state in which the transmission portion 11 functions as an electrically controlled continuously variable transmission the speed ratio of which (speed of the counter gear pair 96/speed of the power transmitting member 18) is continuously variable from a minimum value γ0min to a maximum value γ0max.

When the switching clutch C0 is engaged during running of the vehicle with the output of the engine 8 in the continuously-variable shifting state of the switchable transmission portion 90, the second bevel gear BE2 and the gear casing 92 are connected to each other, so that the gear casing 92 and the second and third bevel gears BE2, BE3 which are the three elements of the differential gear device 94 are rotated together as a unit, whereby the speed of the engine 8 and the speed of the power transmitting member 18 are made equal to each other. As a result, the switchable transmission portion 90 is placed in the fixed-speed-ratio shifting state in which the transmission portion 90 functions as a transmission having a fixed speed ratio of 1.0. When the switching brake B0 is engaged in place of the switching clutch C0, the second bevel gear BE2 is held stationary, so that the speed of the third bevel gear BE3 is made higher than the speed of the gear casing 92, namely, than the engine speed NE, whereby the switchable transmission portion 90 is placed in the fixed-speed-ratio shifting state in which the transmission portion 90 functions as a speed-increasing transmission having a speed ratio lower than 1.0, for example, about 0.7. Thus, the switching clutch C0 and the switching brake B0 provided in the present embodiment function as a differential-state switching device operable to place the switchable transmission portion 90 selectively in one of the continuously-variable shifting state in which the transmission portion 90 is operable as a continuously variable transmission the speed ratio of which is continuously variable, and the locked state in which the transmission portion 90 is operable as a continuously variable transmission and its speed ratio is held constant at a fixed value, that is, the fixed-speed-ratio shifting state in which the transmission portion 90 is operable as a transmission having a single gear position with one speed ratio or a plurality of gear positions with respective speed ratios.

The switchable transmission portion 90 of the present embodiment also includes the first electric motor M1, the differential mechanism in the form of the power distributing mechanism 92 operable to mechanically distribute the output of the engine 8 transmitted to the input shaft 14 to the first electric motor M1 and the power transmitting member 18, and the second electric motor M2 rotatable with the power transmitting member 18. Therefore, the principle of the present invention is equally advantageously applicable to a vehicular drive system including this switchable transmission portion 90 in place of the switchable transmission portion 11 used in the preceding embodiments.

EMBODIMENT 9

Figure 30:
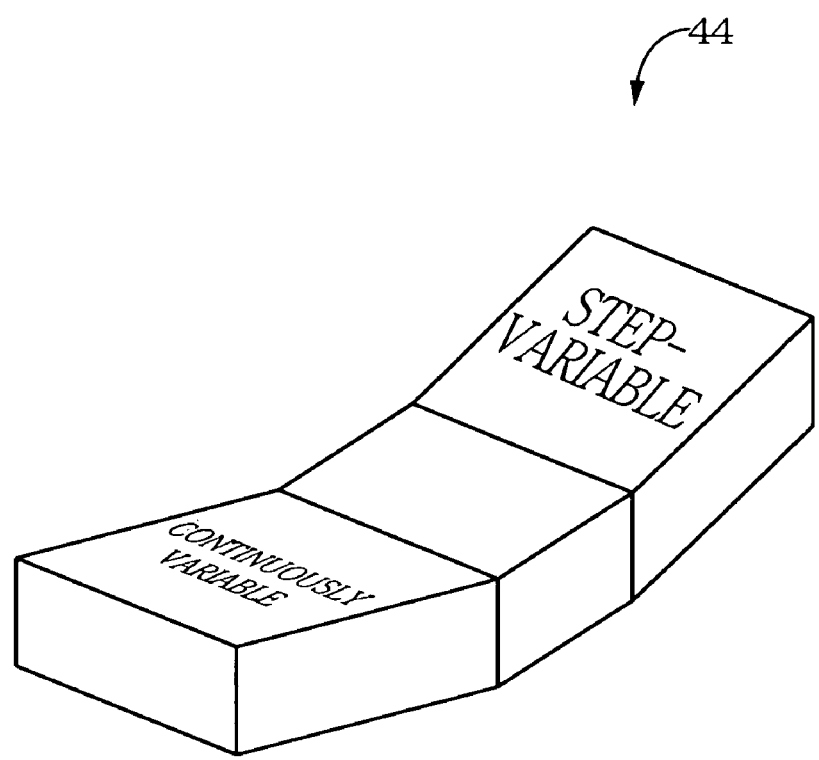
[FIG. 30] This figure is a view showing a manually operable shifting-state selecting device in the form of a seesaw switch 44 provided as a switching device for selecting the shifting state.

FIG. 30 shows an example of a seesaw switch 44 (hereinafter referred to as "switch 44") functioning as a shifting-state selecting device, which is manually operable to select the differential state or non-differential state of the power distributing mechanism 16, that is, to select the continuously-variable shifting state or step-variable shifting state of the transmission mechanism 10. The switch 44 has a first portion labeled "STEP-VARIABLE", and a second potion labeled "CONTINUOUSLY-VARIABLE", as shown in FIG. 30, and is placed in the step-variable shifting position by depressing the switch 44 at its first portion, and in the continuously-variable shifting position by depressing it at its second portion.

In the preceding embodiment, the shifting state of the transmission mechanism 10, 70 is automatically switched on the basis of the detected vehicle condition and according to the switching boundary line map of FIG. 6 or FIG. 18. However, the shifting state of the transmission mechanism 10, 70 may be manually switched by a manual operation of the seesaw switch 44. Namely, the switching control means 50 may be arranged to selectively place the transmission mechanism 10, 70 in the continuously-variable shifting state or the step-variable shifting state, depending upon whether the switch 44 is placed in its continuously-variable shifting position or step-variable shifting position. For instance, the user of the vehicle manually operates the switch 44 to place the transmission mechanism 10, 70 in the continuously-variable shifting state when the user likes the transmission mechanism 10, 70 to operate as a continuously variable transmission or wants to improve the fuel economy of the engine, or alternatively in the step-variable shifting state when the user likes a rhythmical change of the engine speed as a result of a shifting action of the automatic transmission portion 20 operating as a step-variable transmission.

The switch 44 may have a neutral position in addition to the continuously-variable shifting position and the step-variable shifting position. In this case, the switch 44 may be placed in its neutral position when the user has not selected the desired shifting state or likes the transmission mechanism 10, 70 to be automatically placed in one of the continuously-variable and step-variable shifting states.

The control device according to the present invention is applicable to the transmission mechanism 10, even when the shifting state of the transmission mechanism 10 is manually selected by the switch 44.

While the preferred embodiments of the present invention have been described above in detail by reference to the accompanying drawings, it is to be understood that the present invention may be otherwise embodied.

In the preceding embodiments, the electric motor control means 82 is arranged to synchronize the rotating speed of the first sun gear S1 and the engine speed $N_E$. However, the electric motor control means 82 need not be arranged to effect complete synchronization of the speed of the first sun gear S1 and the engine speed $N_E$, but may be arranged to change the speed of the first sun gear S1 toward the engine speed $N_E$. Although the electric motor control means 82 is also arranged to hold the first sun gear S1 stationary, the electric motor control means 82 may be arranged to reduce the speed of the first sun gear S1 toward zero. These modifications also permit reduction of the switching shock and improve the durability of the coupling devices.

In the illustrated embodiments, the transmission mechanism 10, 70 is placed selectively in one of the continuously-variable and step-variable shifting states, when the switchable transmission portion 11 (power distributing portion 16) is placed selectively in its differential state in which the switchable transmission portion 11 is operable as the electrically controlled continuously variable transmission, and in its non-differential state in which the switchable transmission portion 11 is not operable as the electrically controlled continuously variable transmission. However, the transmission mechanism 10, 70 may function as the step-variable transmission while the speed ratio of the switchable transmission portion 11 is variable in steps rather than continuously, while this transmission portion 11 remains in the differential state. In other words, the differential and non-differential states of the switchable transmission portion 11 need not respectively correspond to the continuously-variable and step-variable shifting states of the transmission mechanism 10, 70, and the switchable transmission portion 11 need not be switchable between the continuously-variable and step-variable shifting states. The principle of the present invention is applicable to any transmission mechanism (its switchable transmission portion 11 or power distributing mechanism 16) which is switchable between the differential state and the non-differential state.

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

In the power distributing mechanism 92 in the illustrated embodiment, the gear casing 98 is fixed to the engine 8, and the second bevel gear BE2 is fixed to the first electric motor M1 while the third bevel gear BE3 is fixed to the power transmitting member 18. However, this arrangement is not essential. The engine 8, first electric motor M1 and power transmitting member 18 may be fixed to any other elements selected from the three elements of the differential gear device 94, which consist of the gear casing 92, second bevel gear BE2 and third bevel gear BE3.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18, respectively, through gears or belts.

Although the power distributing mechanism 16 described above is provided with the switching clutch C0 and the switching brake B0, the power distributing mechanism 16 need not be provided with both of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

Although the power distributing mechanism 92 described above is provided with the switching clutch C0 and the switching brake B0, the power distributing mechanism 92 need not be provided with both of the switching clutch C0 and brake B0. While the switching clutch C0 is provided to selectively connect the second bevel gear BE2 and the gear casing 92, the switching clutch C0 may be provided to selectively connect the second bevel gear BE2 and the third bevel gear BE3 to each other, or selectively connect the gear casing 92 and the third bevel gear BE3. Namely, the switching clutch C0 may be arranged to connect any two elements of the three elements of the differential gear device 94.

While the switching clutch C0 is engaged to establish the neutral position N in the transmission mechanism 10, 70 in the illustrated embodiments, the switching clutch C0 need not be engaged to establish the neutral position.

The hydraulically operated frictional coupling devices used as the switching clutch C0, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch.

In the illustrated embodiments, the second electric motor M2 is fixed to the power transmitting member 18. However, the second electric motor M2 may be fixed to the output shaft 22 or to a rotary member of the automatic transmission portion 20, 72.

In the illustrated embodiments, the automatic transmission portion 20, 72 is disposed in the power transmitting path between the drive wheels 38, and the power transmitting member 18 which is the output member of the switchable transmission portion 11, 90 or power distributing mechanism 16, 92. However, the automatic transmission portion 20, 72 may be replaced by any other type of power transmitting device such as a continuously variable transmission (CVP), which is a kind of an automatic transmission, or an automatic transmission which is basically similar in construction to a well-known manual parallel-two-axes type transmission of constant-mesh type but is provided with select cylinders and shift cylinders for automatic shifting actions. Where the continuously variable transmission (CVT) is provided, the transmission mechanism as a whole is placed in the step-variable shifting state when the power distributing mechanism 16 is placed in the fixed-speed-ratio shifting state. The fixed-speed-ratio shifting state is defined as a state in which power is transmitted primarily through a mechanical power transmitting path, without power transmission through an electric path.

In the illustrated embodiments, the transmission mechanism 10, 70 is used for a hybrid vehicle wherein the drive wheels 38 can be driven by not only the engine 8 but also the torque of the first or second electric motor M1, M2. However, the principle of the present invention is applicable to a non-hybrid vehicular drive system wherein the switchable transmission portion 11, 90 or power distributing mechanism 16, 92 of the transmission mechanism 10, 70 is operable only as a continuously variable transmission which has an electrical CVT function.

While the automatic transmission portion 20, 72 is connected in series to the switchable transmission portion 11 through the power transmitting member 18 in the illustrated embodiments, the automatic transmission portion 20, 72 may be mounted on and disposed coaxially with a counter shaft which is parallel to the input shaft 14. In this case, the switchable transmission portion 11 and the automatic transmission portion 20, 72 are operatively connected to each other through the power transmitting member 18 in the form of a set of two power transmitting members such as a pair of counter gears or a combination of a sprocket wheel and a chain.

Although the power distributing mechanism 16 is constituted by one planetary gear set in the illustrated embodiments, the power distributing mechanism 16 may be constituted by two or more planetary gear sets and arranged to be operable as a transmission having three or more gear positions when placed in its fixed-speed-ratio shifting state.

While the switch 44 described above is of a seesaw type, the switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). The switch 44 may or may not have a neutral position. Where the switch 44 does not have the neutral position, an additional switch may be provided to enable and disable the seesaw switch 44. The function of this additional switch corresponds to the neutral position of the seesaw switch 44. The switch 44 may be replaced or supplemented by any other device operable to select one of the continuously-variable shifting state (differential state) and the step-variable shifting state (non-differential state), such as a device responsive to a voice of the vehicle operator, or a device controllable by a foot of the vehicle operator.

While the preferred embodiments of the present invention have been described above for illustrative purpose only, it is to be understood that the invention may be embodied with various changes and modifications which may occur to those skilled in the art.

The invention claimed is:

1. A control device for a vehicular drive system which is arranged to transmit an output of an engine to a drive wheel of a vehicle and which comprises a switchable transmission mechanism including a power distributing mechanism which has a first element fixed to said engine, a second element fixed to a first electric motor, and a third element fixed to a second electric motor and a power transmitting member, and a coupling device operable to connect any two of said first through third elements to each other and/or fix said second element to a stationary member, said switchable transmission mechanism being switchable between a continuously-variable shifting state in which the switchable transmission mechanism is operable as an electrically controlled continuously variable transmission, and a step-variable shifting state in which the switchable transmission mechanism is operable as a step-variable transmission, said control device comprising:

switching control means for selectively releasing and engaging said coupling device, on the basis of a condition of the vehicle, to place said switchable transmission mechanism selectively in one of said continuously-variable shifting state and said step-variable shifting state; and electric motor control means for controlling said first electric motor so as to generate a reaction torque upon releasing of said coupling device, and/or so as to reduce speed differences among said first element, said second element and said third element or a speed difference between said second element and said stationary member, upon engaging of said coupling device.

2. The control device according to claim 1, wherein said switching control means is operable to release said coupling device to place said switchable transmission mechanism in said continuously-variable shifting state in which said first, second and third elements are rotatable relative to each other, and operable to engage said coupling device to place the switchable transmission mechanism in said step-variable shifting state in which any two of said first, second and third elements are connected to each other or said second element is held stationary.

3. The control device according to claim 1, wherein said switching control means releases said coupling device to switch said switchable transmission mechanism from said step-variable shifting state to said continuously-variable shifting state, said switching control means initiating a releasing action of said coupling device after generation of the reaction torque by said first electric motor under the control of said electric motor control means.

4. The control device according to claim 1, wherein said switching control means releases said coupling device to switch said switchable transmission mechanism from said step-variable shifting state to said continuously-variable shifting state, and said electric motor control means controls said first electric motor in the process of a releasing action of said coupling device under the control of said switching control means such that the reaction torque of the first electric motor is increased as the coupling device is released.

5. The control device according to claim 4, wherein said electric motor control means feedback-controls a speed of said first electric motor, so as to reduce the speed differences among said first, second and third elements or the speed difference between said second element and said stationary member.

6. The control device according to claim 3, wherein said electric control means controls a speed of said first electric motor such that the speed differences among said first, second and third elements or the speed difference between said second element and said stationary member is maintained at a value before initiation of the releasing action of said coupling device, until said releasing action controlled by said switching control means is completed.

7. The control device according to claim 1, wherein said switching control means engages said coupling device to switch said switchable transmission mechanism from said continuously-variable shifting state to said step-variable shifting state, said switching control means initiating an engaging action of said coupling device after a speed of said first electric motor has been controlled by said electric motor control means so as to reduce the speed differences among said first, second and third elements or the speed difference between said second element and said stationary member.

8. The control device according to claim 1, wherein said switching control means engages said coupling device to switch said switchable transmission mechanism from said continuously-variable shifting state to said step-variable shifting state, said switching control means effecting an engaging action of said coupling device in the process of control of a speed of said first electric motor by said electric motor control means so as to reduce the speed differences among said first, second and third elements or the speed difference between said second element and said stationary member.

9. The control device according to claim 7, further comprising engine output control means for controlling a torque or output of said engine, and wherein said engine output control means limits the torque or output of said engine, so as to prevent the torque or output of the engine from exceeding an upper limit determined by a nominal rating of said first electric motor, until the engaging action of said coupling device controlled by said switching control means is completed.

10. The control device according to claim 1, wherein said switching control means includes high-speed-running determining means for determining that the vehicle is in a high-speed running state when an actual value of a running speed of the vehicle is higher than a predetermined upper limit value, said switching control means controlling said coupling device to place said switchable transmission mechanism in said step-variable shifting state when said high-speed-running determining means has determined that the vehicle is in said high-speed running state.

11. The control device according to claim 1, wherein said switching control means includes high-output-running determining means for determining that the vehicle is in a high-output running state when a drive-force related value of the vehicle is higher than a predetermined upper limit value said switching control means controlling said coupling device to place said switchable transmission mechanism in said step-variable shifting state when said high-output-running determining means has determined that the vehicle is in said high-output running state.

12. The control device according to claim 1, wherein said switching control means controls said coupling device to place said switchable transmission mechanism in one of said continuously-variable and step-variable shifting states, on the basis of an actual value of a running speed of the vehicle and an actual value of a drive-force-related value of the vehicle and according to a stored switching boundary line map including a high-speed-running boundary line and a high-output-running boundary line which are defined by parameters in the form of said running speed of the vehicle and said drive-force-related value.

13. The control device according to claim 1, wherein said switching control means includes electric-path-function diagnosing means for determining whether a function of any one of control components for placing said switchable transmission mechanism said continuously-variable shifting state is deteriorated, said switching control means controlling said coupling device to place said switchable transmission mechanism in said step-variable shifting state when said electric-path-function diagnosing means has determined that the function of said any one of the control components is deteriorated.

14. The control device according to claim 1, wherein said power distributing mechanism is a planetary gear set, including a carrier functioning as said first element, a sun gear functioning as said second element and a ring gear functioning as said third element,
and wherein said coupling device includes a clutch operable to connect any two of said carrier, sun gear and ring gear to each other, and/or a brake operable to fix said sun gear to said stationary member.

15. The control device according to claim 14, wherein said planetary gear set is a single-pinion.

16. The control device according to claim 1, wherein said power distributing mechanism is a differential gear device, and said coupling device includes a clutch operable to connect any two of said first, second and third elements, and/or a brake operable to fix said second element to said stationary member.

17. The control device according to claim 16, wherein said differential gear device is a bevel-gear.

18. The control device according to claim 14, wherein said switching control means engages said clutch to enable said power distributing mechanism to operate as a transmission having a speed ratio of 1, or engages said brake to enable said power distributing mechanism to operate as a speed-increasing transmission having a speed ratio lower than 1.

19. The control device according to claim 1, wherein said switchable transmission mechanism includes an automatic transmission disposed between said power transmitting member and said drive wheel and connected in series to said power distributing mechanism, and has a speed ratio determined by a speed ratio of said automatic transmission.

20. The control device according to claim 19, wherein said switchable transmission mechanism has an overall speed ratio defined by a speed ratio of the power distributing mechanism and the speed ratio of said automatic transmission.

21. The control device according to claim 19, wherein said automatic transmission is a step-variable automatic transmission which is shifted according to a stored shifting boundary line map.

22. A control device for a vehicular drive system including a differential portion which is operable as an electrically controlled differential device and which includes a differential mechanism operable to distribute an output of an engine to a first electric motor and a power transmitting member and having a plurality of rotary elements, and a second electric motor disposed in a power transmitting path between said power transmitting member and a drive wheel of a vehicle,
said differential mechanism including a coupling device operable to switch said differential portion between a differential state in
which said differential portion is operable as the electrically controlled differential device and is capable of performing a differential function, and a locked state in which said differential portion is not capable of performing said differential function, said control device comprising:
switching control means for selectively releasing and engaging said coupling device, on the basis of a condition of the vehicle, to place said differential portion selectively in one of said differential state and said locked state; and
electric motor control means for controlling said first electric motor so as to generate a reaction torque upon releasing of said coupling device, and/or so as to reduce speed differences among said plurality of rotary elements or a speed difference between one of said plurality of rotary elements to which said first electric motor is fixed, and a stationary member, upon engaging of said coupling device.

23. The control device according to claim 22, wherein said plurality of rotary elements of said differential mechanism consist of a first element fixed to said engine, a second element fixed to said first electric motor, and a third element fixed to said power transmitting member, and said coupling device is operable to connect any two of said first through third elements, and/or fix said second element to said stationary member.

24. The control device according to claim 23, wherein said switching control means is operable to release said coupling device to place said differential portion in said differential state in which said first, second and third elements are rotatable relative to each other, and operable to engage said coupling device to place said differential portion in said locked state in which said first, second and third elements are rotated as a unit or said second element is held stationary.

25. The control device according to claim 23, wherein said switching control means releases said coupling device to switch said differential portion from said locked state to said differential state, said switching control means initiating a releasing action of said coupling device after generation of the reaction torque by said first electric motor under the control of said electric motor control means.

26. The control device according to claim 23, wherein said switching control means releases said coupling device to switch said differential portion from said locked state to said differential state, and said electric motor control means controls said first electric motor in the process of a releasing action of said coupling device under the control of said switching control means such that the reaction torque of the first electric motor is increased as the coupling device is released.

27. The control device according to claim 26, wherein said electric motor control means feedback-controls a speed of said first electric motor, so as to reduce the speed differences among said first, second and third elements or the speed difference between said second element and said stationary member.

28. The control device according to claim 25, wherein said switching control means controls a speed of said first electric motor such that the speed difference among said first, second and third elements or the speed difference between said second element and said stationary member is maintained at a value before initiation of the releasing action of said coupling device, until said releasing action controlled by said switching control means is completed.

29. The control device according to claim 23, wherein said switching control means engages said coupling device to switch said differential portion from said differential state to said locked state, said switching control means initiating an engaging action of said coupling device after a speed of said first electric motor has been controlled by said electric motor control means so as to reduce the speed differences among said first, second and third elements or the speed difference between said second element and said stationary member.

30. The control device according to claim 23, wherein said switching control means engages said coupling device to switch said differential portion from said differential state to said locked state, said switching control means effecting an engaging action of said coupling device in the process of control of a speed of said first electric motor by said electric motor control means so as to reduce the speed differences among said first, second and third elements or the speed difference between said second element and said stationary member.

31. The control device according to claim 29, further comprising engine output control means for controlling a torque or output of said engine, and wherein said engine output control means limits the torque or output of the engine, so as to prevent the torque or output of the engine from exceeding an upper limit determined by a nominal rating of said first electric motor, until the engaging action of said coupling device controlled by said switching control means is completed.

32. The control device according to claim 23, wherein said switching control means includes high-speed-running determining means for determining that the vehicle is in a high-speed running state when an actual value of a running speed of the vehicle is higher than a predetermined upper limit value, said switching control means controlling said coupling device to place said differential portion in said locked state when said high-speed-running determining means has determined that the vehicle is in said high-speed running state.

33. The control device according to claim 23, wherein said switching control means includes high-output-running determining means for determining that the vehicle is in a high-output running state when a drive-force-related value of the vehicle is higher than a predetermined upper limit value, said switching control means controlling said coupling device to place said differential portion in said locked state when said high-output-running determining means has determined that the vehicle is in said high-output running state.

34. The control device according to claim 23, wherein said switching control means controls said coupling device to place said differential portion in one of said differential state and locked states, on the basis of an actual value of a running speed of the vehicle and an actual value of a drive-force-related value of the vehicle and according to a stored switching boundary line map including a high-speed-running boundary line and a high-output-running boundary line which are defined by parameters in the form of said running speed of the vehicle and said drive-force-related value.

35. The control device according to claim 23, wherein said switching control means includes electric-path-function diagnosing means for determining whether a function of any one of control components for enabling said differential portion to operate as said electrically controlled differential device is deteriorated, said switching control means controlling said coupling device to place said differential portion in said locked state when said electric-path-function diagnosing means has determined that the function of said any one of the control components is deteriorated.

36. The control device according to claim 23, wherein said differential mechanism is a planetary gear set, including a carrier functioning as said first element, a sun gear functioning as said second element and a ring gear functioning as said third element,
and wherein said coupling device includes a clutch operable to connect any two of said carrier, sun gear and ring gear to each other, and/or a brake operable to fix said sun gear to said stationary member.

37. The control device according to claim 36, wherein said planetary gear set is a single-pinion.

38. The control device according to claim 23, wherein said differential mechanism is a differential gear device, and said coupling device includes a clutch operable to connect any two of said first, second and third elements, and/or a brake operable to fix said second element to said stationary member.

39. The control device according to claim 38, wherein said differential gear device is a bevel-gear.

40. The control device according to claim 36, wherein said switching control means engages said clutch to enable said differential mechanism to operate as a transmission having a speed ratio of 1, or engages said brake to enable said differential mechanism to operate as a speed-increasing transmission having a speed ratio lower than 1.

41. The control device according to claim 23, wherein said power transmitting path includes an automatic transmission portion, and said vehicular drive system has an overall speed ratio defined by a speed ratio of said automatic transmission portion and a speed ratio of said differential portion.

42. The control device according to claim 41, wherein said automatic transmission portion is a step-variable automatic transmission which is shifted according to a stored shifting boundary line map.

43. The control device according to claim 4, wherein said electric control means controls a speed of said first electric motor such that the speed differences among said first, second and third elements or the speed difference between said second element and third elements or the speed difference between said second element and said stationary member is maintained at a value before initiation of the releasing action of said coupling device, until said releasing action controlled by said switching control means is completed.

44. The control device according to claim 8, further comprising engine output control means for controlling a torque or output of said engine, and wherein said engine output control means limits the torque or output of said engine, so as to prevent the torque or output of the engine from exceeding an upper limit determined by a nominal rating of said first electric motor, until the engaging action of said coupling device controlled by said switching control means is completed.

45. The control device according to claim 16, wherein said switching control means engages said clutch to enable said power distributing mechanism to operate as a transmission having a speed ratio of 1, or engages said brake to enable said power distributing mechanism to operate as a speed-increasing transmission having a speed ratio lower than 1.

46. The control device according to claim 26, wherein said switching control means controls a speed of said first electric motor such that the speed difference among said first, second and third elements or the speed difference between said second element and said stationary member is maintained at a value before initiation of the releasing action of said coupling device, until said releasing action controlled by said switching control means is completed.

47. The control device according to claim 30, further comprising engine output control means for controlling a torque or output of said engine, and wherein said engine output control means limits the torque or output of the engine, so as to prevent the torque or output of the engine from exceeding an upper limit determined by a nominal rating of said first electric motor, until the engaging action of said coupling device controlled by said switching control means is completed.

48. The control device according to claim 38, wherein said switching control means engages said clutch to enable said differential mechanism to operate as a transmission having a speed ratio of 1, or engages said brake to enable said differential mechanism to operate as a speed-increasing transmission having a speed ratio lower than 1.

49. A control device for a vehicular drive system including a differential portion which is operable as an electrically controlled differential device and which includes a differential mechanism operable to distribute an output of an engine to a first electric motor and a power transmitting member and having a plurality of rotary elements, and a second electric motor connected with the power transmitting member in a power transmittable manner, the differential mechanism including a coupling device operable to switch the differential portion between a differential state in which the differential portion is operable as the electrically controlled differential device and is capable of performing a differential function, and a locked state in which the differential portion is not capable of performing the differential function, the control device comprising:

switching control means for selectively releasing and engaging the coupling device, on the basis of a condition of the vehicle, to place the differential portion selectively in one of the differential state and the locked state; and electric motor control means for controlling the first electric motor so as to generate a reaction torque upon releasing of the coupling device, and/or so as to reduce speed differences among the plurality of rotary elements or a speed difference between one of the plurality of rotary elements to which the first electric motor is fixed, and a stationary member, upon engaging of the coupling device.

* * * * *